(12) United States Patent
Shigenaga et al.

(10) Patent No.: US 7,343,068 B2
(45) Date of Patent: Mar. 11, 2008

(54) OPTICAL MODULE

(75) Inventors: Takashi Shigenaga, Tokyo (JP);
Katsuki Suematsu, Tokyo (JP);
Hiroshi Matsuura, Tokyo (JP);
Renichi Yuguchi, Tokyo (JP); Takashi Shigematsu, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/803,249

(22) Filed: May 14, 2007

(65) Prior Publication Data
US 2007/0217741 A1  Sep. 20, 2007

Related U.S. Application Data

(62) Division of application No. 10/337,015, filed on Jan. 6, 2003, now Pat. No. 7,218,811.

(30) Foreign Application Priority Data

| Jan. 10, 2002 | (JP) | ............ 2002-3555 |
| Apr. 17, 2002 | (JP) | ............ 2002-114696 |
| Apr. 19, 2002 | (JP) | ............ 2002-118162 |
| Jul. 10, 2002 | (JP) | ............ 2002-201677 |
| Aug. 6, 2002 | (JP) | ............ 2002-229189 |
| Aug. 6, 2002 | (JP) | ............ 2002-229190 |
| Aug. 29, 2002 | (JP) | ............ 2002-250755 |
| Oct. 22, 2002 | (JP) | ............ 2002-307228 |

(51) Int. Cl.
*G02B 6/32* (2006.01)

(52) U.S. Cl. .......................... 385/33; 385/35

(58) Field of Classification Search ............ 385/33–35
See application file for complete search history.

(56) References Cited

U.S. PATENT DOCUMENTS

| 5,210,815 A * | 5/1993 | Alexander et al. .......... 385/138 |
| 5,778,124 A | 7/1998 | Nedstedt |
| 6,012,852 A | 1/2000 | Kadar-Kallen et al. |
| 6,823,109 B2 | 11/2004 | Sasaki et al. |
| 6,862,383 B2 * | 3/2005 | Kikuchi et al. ............ 385/33 |
| 2002/0136504 A1 | 9/2002 | Boscha |
| 2002/0159693 A1 | 10/2002 | Wolak et al. |
| 2004/0161220 A1 | 8/2004 | Treptau et al. |
| 2006/0140544 A1 * | 6/2006 | Morimoto et al. ............ 385/59 |

FOREIGN PATENT DOCUMENTS

| JP | 08-114724 | 5/1996 |
| JP | 2004144836 A * | 5/2004 |

* cited by examiner

*Primary Examiner*—Sarah Song
(74) *Attorney, Agent, or Firm*—Cohen Pontani Lieberman & Pavane LLP

(57) ABSTRACT

An optical module including first and second lens housings that individually receive first and second lenses; first and second optical fiber housings that individually receive end portions of optical fibers; first and second guide pins for positioning the first and second lens housings and the first and second optical fiber housings, with the first and second lens housings abutted against each other at their inner end faces and disposed between the first and second optical fiber units so as to be abutted thereto; two first positioning members provided between the first optical fiber housing and the first lens and between the second optical fiber housing and the second lens, respectively; and a second positioning member disposed between the first and second lenses.

8 Claims, 45 Drawing Sheets

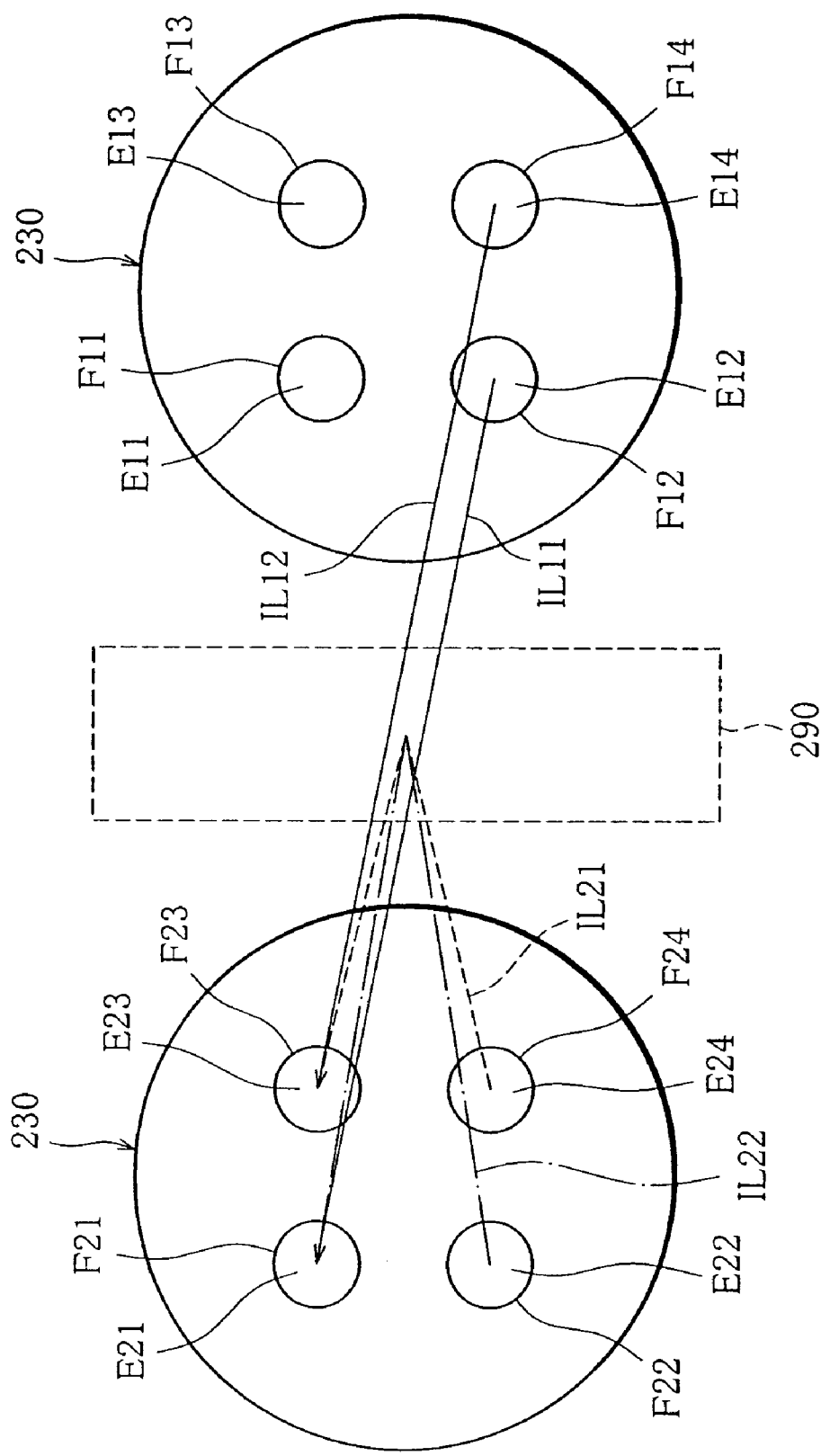

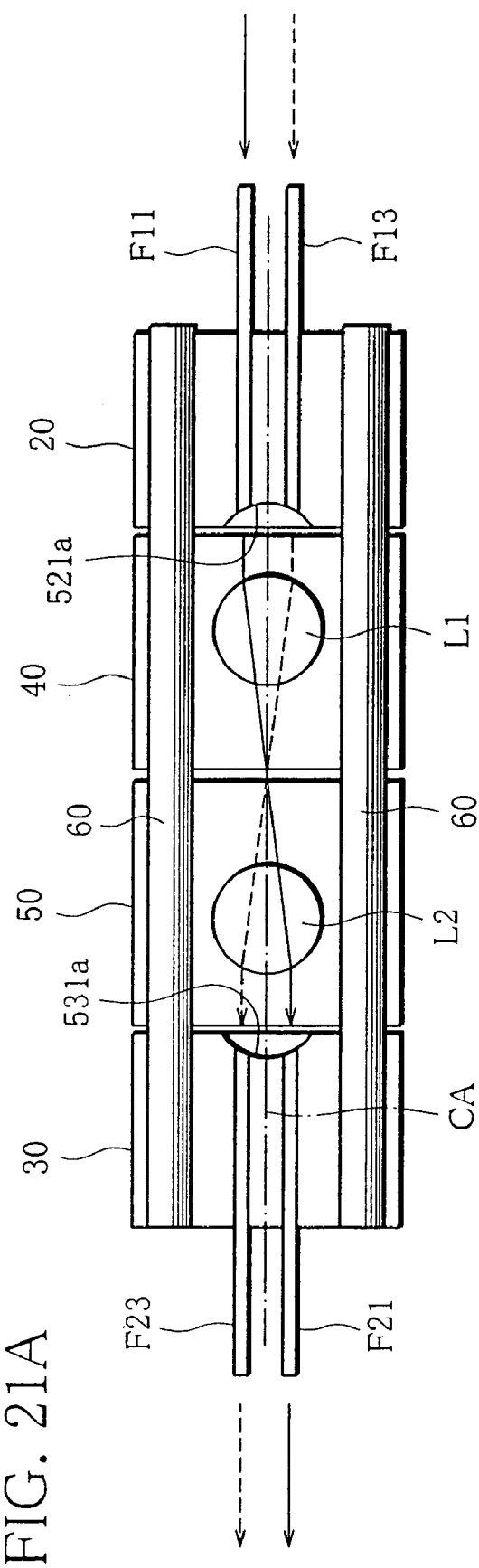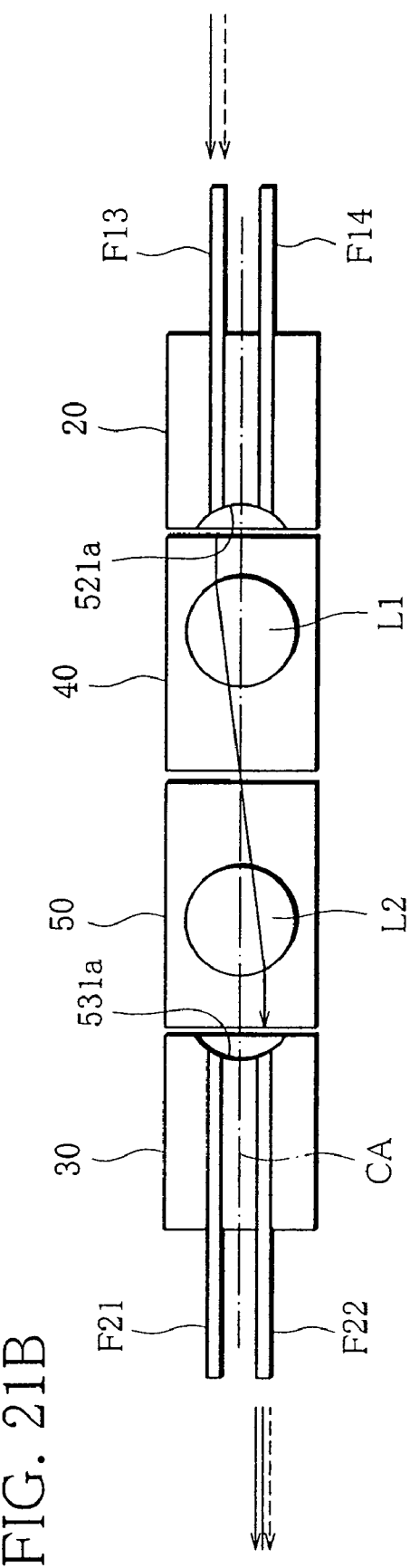

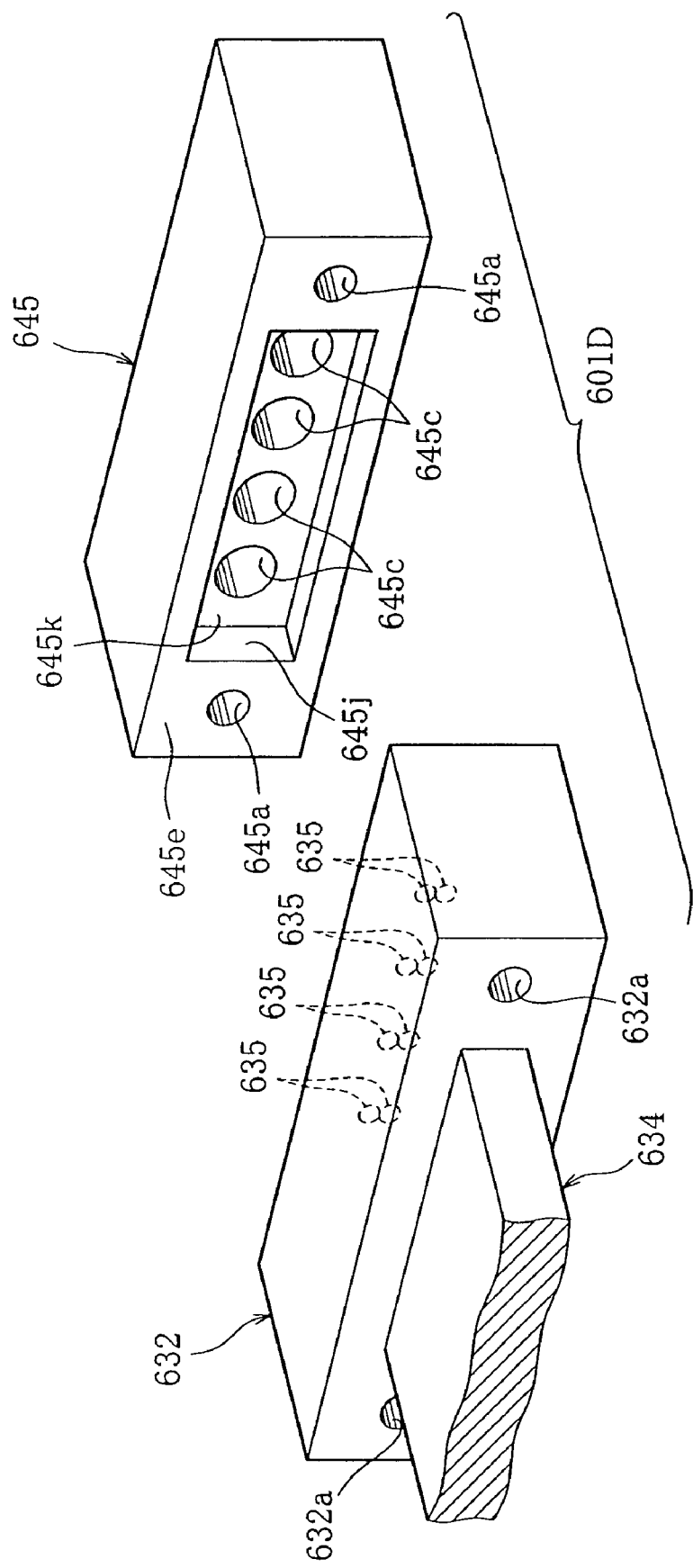

OPTICAL MODULE

CROSS-REFERENCE TO RELATED APPLICATIONS

This is a divisional of application Ser. No. 10/337,015, filed on Jan. 6, 2003, now U.S. Pat. No. 7,218,811 the entire content of which is incorporated herein by reference. Priority is claimed on the following Japanese Patent Applications:
Application No. 2002-3555, filed on Jan. 10, 2002;
Application No. 2002-114696, filed on Apr. 17, 2002;
Application No. 2002-118162, filed on Apr. 19, 2002;
Application No. 2002-201677, filed on Jul. 10, 2002;
Application No. 2002-229189, filed on Aug. 6, 2002;
Application No. 2002-229190, filed on Aug. 6, 2002;
Application No. 2002-250755, filed on Aug. 29, 2002; and
Application No. 2002-307228, filed on Oct. 22, 2002.

BACKGROUND OF THE INVENTION

1. Field of the Invention

The present invention relates to an optical module for use in the field of optical communication and optical measurement, and more particularly, to an optical module for connecting optical fibers so as to realize functions of optical switch, optical branching, optical coupling, etc., and relates to an optical collimator and a lens housing that are used to constitute such an optical module.

2. Description of the Related Art

In optical communication systems and optical measuring systems, a variety of optical connectors and optical modules for connecting optical fibers are utilized. For instance, JP-A-8-114724 discloses an MT (Mechanically Transferable) type optical connector that is adapted to be detachably joined to another optical connector of the same construction by means of guide pins. The two joined optical connectors connect multi-core optical fibers together, which are held by these connectors positioned by the guide pins inserted into guide pin holes formed in the connectors. Distal ends of the multi-core optical fibers extending through the optical connectors are exposed to connecting faces of the connectors, and hence no optical function component part can be placed between opposed end faces of the connectors. Thus, optical transmission alone is permitted between the optical fibers. In other words, the optical connector having the just-mentioned structure can provide neither the optical branching function nor the optical multiplexing function. Besides, the exposed end faces of the multi-core optical fibers can be in contact with each other during operation of connecting the two optical connectors, causing mechanical damages to the fiber end faces.

As for the optical module, it typically comprises two units each of which is adapted to receive end portions of optical fibers for optical transmission between corresponding optical fibers. It is conceivable to construct these units so as to be positioned by means of guide pins as in the MT type optical connector.

FIG. 1 shows such an MT type optical module 1 that comprises two units each comprised of an optical fiber housing (MT ferrule) 2 and a lens housing 3. The optical fiber housing 2 receives distal end portions of two optical fibers 4, and is formed with a pair of guide pin holes 2a. The lens housing 3 is formed with a pair of guide pin holes 3a and a lens hole 3b, with a spherical lens 5 fixed by adhesive at a predetermined position in the lens hole 3b. Each unit has a collimator function for collimating outgoing light beams from the optical fibers by means of the lens 5. The optical fiber housings 2 and the lens housings 3 of the two units are positioned, with the lens housing 3 arranged between the optical fiber units 2, by means of guide pins 6 inserted through guide pin holes 2a and 3a, whereby the optical module 1 is constructed.

For the MT type optical module, the focal distance S from the end face of the optical fiber 4 to the center of the lens 5 and the distance between the centers of the two lenses 5 are important factors affecting on optical characteristics. In order to obtain a proper focal distance S and a proper lens-to-lens distance D, the fiber housing 2 and lens housing 3 must be positioned with submicron accuracy and the lens 5 must be fixed at a predetermined longitudinal position in the lens housing 3 with several-micron accuracy.

In the module 1 using adhesive to fix the lens 5 to the lens housing 3, an error in lens position tends to occur since it is extremely difficult to always constantly apply a minute amount of adhesive to the lens 5 which is extremely small in size. As a result, an applied amount of adhesive varies between lenses 5, causing variations in shrinkage of adhesive and in lens position.

Besides, the optical module 1 does not permit the lens position to change after the lens 5 being fixed. Specifically, the lens-to-lens distance D is kept small if the lens position is deviated in the direction of increasing the focal distance S, whereas the distance D is kept large if the lens position is deviated in the opposite direction. Thus, the dislocated lens position caused by an error in applied amount of adhesive results in inaccuracy of focal distance S and lens-to-lens distance D, producing a large optical coupling loss. Usage of adhesive in fixing the lens 5 entails operations of preparing the adhesive, applying the adhesive to the lens housing 3, and curing the adhesive. This results in an increased number of assembling man-hours to increase assembling costs.

Upon assemblage of the optical module 1, two optical fiber housings 2 are depressed by hands toward two lens housings 3 disposed between the fiber housings, with guide pins 6 inserted through guide pin holes 2a and 3a, whereby these housings 2 and 3 are joined together at their opposed end faces. Since the guide pin holes 2a, 3a have their inner diameters about 0.5 μm larger than the outer diameter of the guide pins 6 to produce clearances between the guide pin holes and the guide pins, it is difficult to stably maintain the joined state (positioned state) of the housings 2, 3. As a result, the focal distance S and the lens-to-lens distance D become unstable between individual optical modules, producing a large variation in their optical coupling characteristics. Besides, the unstable positional relation between optical module components, such as between the lens 5 and the optical fiber 4, can produce a positional deviation that causes a large insertion loss. In particular, when impact is applied to the optical module 1, the lens-to-lens distance D and the focal distance S greatly deviate from design values, causing a large coupling loss and a large insertion loss.

As for an optical module having two optical fiber housings and two lens housings interposed therebetween that are positioned by means of guide pins, it is conceivable to dispose an optical function component, such as a filter, between the lens housings.

To attain a desired optical coupling efficiency in such an optical module, the optical function component must be disposed in accurate position with respect to the lens and at accurate angle with respect to the optical axis. In a case where the optical function component is fixedly positioned by means of the entire end faces of the two lens housings, there is a fear that a desired optical coupling efficiency cannot be attained for the reason that it is practically difficult to machine the entire end face of the lens housing flat enough to attain the desired coupling efficiency from the viewpoints of machining accuracy and machining cost.

Microscopically, the end face of the lens housing, which is not completely flat, has a large number of support points. When the optical function component is fixedly-positioned by means of the entire end faces of the lens housings, the end face of each lens housing abuts against the opposed end face of the optical function component at three supporting points out of a number of support points thereof, and accordingly, the optical function component is positioned from both sides by means of six support points in total. When the optical function component once released from the positioned state is positioned again by means of the same lens housings, it is positioned by six support points that are different from six support points for previous positioning.

Accordingly, with such an arrangement having an optical function component positioned by means of the entire end faces of lens housings that are not completely flat, it is difficult to always position the optical function component at the same position with the same angle. In other words, the position and angle of the positioned optical function component vary between individual optical modules, and hence it is quite difficult to stably manufacture optical modules having a desired optical coupling efficiency.

It is conceivable to construct an MT type optical module as shown in FIG. 2. The optical module 1' shown in FIG. 2, which is constructed basically the same manner as the optical module 1 shown in FIG. 1, is different therefrom in that a filter 8 is detachably mounted in a spacer 7 disposed between two units, so that the optical module 1' serves as an optical switch. In FIG. 2, reference numeral 7a denotes a guide pin hole formed in the spacer 7. To permit outgoing light from an optical fiber 4 to propagate along a predetermined optical path, optical fiber housings 2 and lens housings 3 must be positioned with submicron accuracy and a lens 5 must be fixed at a predetermined longitudinal position in the lens housing 3 with several-micron accuracy.

The lens housing for optical module is required to be small in size and low in price, and further requested to satisfy the following requirements:

1) Low insertion loss;

2) Lens face free from being damaged during handling;

3) High optical coupling efficiency between optical fiber and lens;

4) Suppressed reflection loss; and

5) Reduced number of optical module components and manufacturing cost, with improved optical-module assembling efficiency.

SUMMARY OF THE INVENTION

An object of the present invention is to provide an optical module which is capable of achieving various functions such as optical branching or optical multiplexing function, in addition to a function of connecting multi-core fibers.

Another object of the present invention is to provide a multi-core optical collimator capable of realizing an optical module that achieves dense optical transmission and various functions such as optical branching function or optical multiplexing function.

Still another object of the present invention is to provide an optical module capable of reducing insertion loss in connecting multi-core collimators.

A further object of the present invention is to provide a multi-core collimator capable of realizing an optical module for connecting multi-core fibers contactlessly and optically precisely.

Another object of the present invention is to provide an optical module capable of easily preventing a positional deviation of multi-core fibers supported by fiber housings and capable of reducing the insertion loss.

Another object of the present invention is to provide an optical module capable of improving optical coupling characteristics, with a lens accurately positioned in a lens housing without using adhesive.

Another object of the present invention is to provide an optical module having an optical function component stably held between lens housings in an accurate position with respect to a lens at accurate angle with respect to an optical axis, thereby improving optical coupling efficiency.

A still further object of the present invention is to provide an optical module having a lens face free from being damaged during handling, and a lens housing therefor.

Still another object of the present invention is to provide an optical module capable of reducing influence of reflection as small as possible, and a lens housing therefor.

A further object of the present invention is to provide an optical module capable of reducing the number of component parts and manufacturing cost, and a lens housing therefor.

According to one aspect of the present invention, there is provided a multi-core collimator which comprises a fiber unit for holding respective end portions of optical fibers in parallel to a predetermined direction, with respective end faces of the optical fibers fixedly arranged on at least one imaginary circumference perpendicular to the predetermined direction; and a collimator lens disposed to face the fiber unit.

In the multi-core collimator, the end faces of the optical fibers are disposed on the same imaginary circumference. This makes it possible to equally arrange the fiber end faces with respect to the center axis of the at least one imaginary circumference, even if a large number of optical fibers must be arranged in the fiber unit. Since the symmetry of arrangement of the optical fibers is improved, thereby equalizing characteristics of light to be collimated, an optical module comprised of two multi-core optical collimators is enabled to achieve various functions such as optical branching function or optical multiplexing function precisely with reduced loss.

According to another aspect of the present invention, there is provided an optical module which comprises a first fiber unit having a first abutting face; a second fiber unit having a second abutting face; a lens unit, disposed between the first and second fiber units, for holding a lens; coupling means for fixedly positioning the first and second fiber units and the lens unit by urging them close to one another, with the lens unit held between the first and second fiber units. The first fiber unit supports respective end portions of first optical fibers in a first arrangement plane obliquely extending through the first fiber unit at a first angle with respect to a longitudinal axis of the optical module, and respective end faces of the first optical fibers are exposed to the first abutting face. The second fiber unit supports respective end portion of second optical fibers in a second arrangement plane obliquely extending through the second fiber unit at a second angle equal to the first angle with respect to the longitudinal axis of the optical module, and respective end faces of second optical fibers are exposed to the second abutting face. The lens unit has both end faces thereof abutting against the first and second abutting faces, respectively, and extending in parallel to each other. The first and second fiber units and the lens unit are fixedly positioned by means of the coupling means such that an optical axis section and first and second central sections are coincide with one another, the optical axis section including an optical axis of the lens and extending through the lens unit in a direction perpendicular to the opposite end faces, the first central section including a first center axis parallel to optical axes of the first optical fibers and extending through the first fiber unit in a direction perpendicular to the first abutting face, and the second central section including a second center axis parallel to optical axes of the second optical fibers and extending through the second fiber unit in a direction perpendicular to the second abutting face.

In the above optical module, the lens unit arranged between the first and second fiber units holds the lens, and therefore, it is possible to establish contactless optical connection between the first and second optical fibers that are held by the first and second fiber units, respectively. The first and second fiber units can be easily separated from each other by detaching the coupling means. In this optical module, the first and second optical fibers (i.e., reference planes perpendicular to the first and second optical fibers) obliquely extend at a predetermined angle with respect to the abutting faces of the first and second fiber units. In other words, the abutting face of each fiber unit is slanted with respect to the axes of the optical fibers. This makes it possible to prevent deterioration of a light source and increased insertion loss that are attributable to return light at the fiber end face. Since the opposite end faces of the lens unit are formed in parallel to each other, urging forces can be applied that act only in a direction perpendicular to outer end faces of the first and second fiber units and to the opposed end faces of the lens unit, when the lens unit is fixed between the first and second fiber units by means of the coupling means. This makes it possible to prevent positional deviations from being caused between the first and second fiber units and the lens unit during assemblage of the optical module, thereby suppressing insertion loss. Since the optical axis section of the lens unit and the central sections of the first and second fiber units are coincide with one another, it is possible to dispose the ends of the first and second optical fibers held by the first and second fiber units at conjugate positions with respect to the lens held by the lens unit, making it possible to establish efficient optical coupling between the first and second optical fibers.

According to still another aspect of the present invention, there is provided an optical module in which first and second lens housings that individually receive first and second lenses and first and second optical fiber housings that individually receive end portions of optical fibers are positioned by means of first and second guide pins, with the first and second lens housings abutted against each other at their inner end faces and disposed between the first and second optical fiber units so as to be abutted thereto. This optical module comprises two first positioning members provided between the first optical fiber housing and the first lens and between the second optical fiber housing and the second lens, respectively, the first positioning members having their outer ends (on the side away from the center of the optical module) and their inner ends (on the side close to the center of the optical module) individually abutted against inner end faces of the first and second optical fiber housings and peripheral portions of outer end faces of the first and second lenses; and a second positioning member disposed between the first and second lenses, the second positioning member having opposite ends thereof individually abutted against peripheral portions of inner end faces of the first and second lenses. With the above construction, the two lenses are fixedly positioned with accuracy, thereby improving optical coupling characteristics.

According to still another aspect of the present invention, there is provided an optical module in which first and second optical fiber housings that individually receive end portions of optical fibers and first and second lens housings that are disposed between the first and second optical fiber housings and individually receive lenses are positioned by means of guide pins. This optical module comprises an optical function component disposed between the first and second lens housings, and at least one of inner end faces of the first and second lens housings is formed with three support points that abut against an end face of the optical function component, whereby the optical function component is stably held between the lens housings, thus improving optical coupling efficiency.

Still another aspect of the present invention, there is provided a lens housing formed with a pin hole, a lens hole that opens to one end face of the lens housing and receives a lens, and an optical path hole communicating with the lens hole. The lens hole of the lens housing has a diameter DLH (μm) ranging from a value obtained by subtracting 0.5 μm from a diameter DL (μm) of the lens to a value obtained by adding 0.5 μm to the diameter DL of the lens.

According to a further aspect of the present invention, there is provided an optical module comprising a lens housing formed with a first pin hole, a lens hole opening to a first end face of the lens housing, and an optical path hole communicating with the lens hole; a lens received in the lens hole; an optical fiber housing disposed to face the lens housing and formed with a second pin hole and an optical fiber hole; an optical fiber inserted into the optical fiber hole so as to be optically coupled to the lens; and a guide pin inserted into the first and second pin holes for coupling the lens housing and the optical fiber housing. The lens hole of the optical module has a diameter DLH (μm) ranging from a value obtained by subtracting 0.5 μm from a diameter DL (μm) of the lens to a value obtained by adding 0.5 μm to the diameter DL of the lens.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 11 is a view for explaining an operation of the optical module shown in FIG. 9;

FIG. 21A is a schematic view of the optical module of the sixth embodiment as viewed in longitudinal horizontal section;

FIG. 21B is a schematic view of the optical module as viewed in longitudinal vertical section;

FIG. 65 is a perspective view showing a collimator array according to a twenty-third embodiment of the present invention.

DETAILED DESCRIPTION OF THE PREFERRED EMBODIMENTS

Figure 3A:
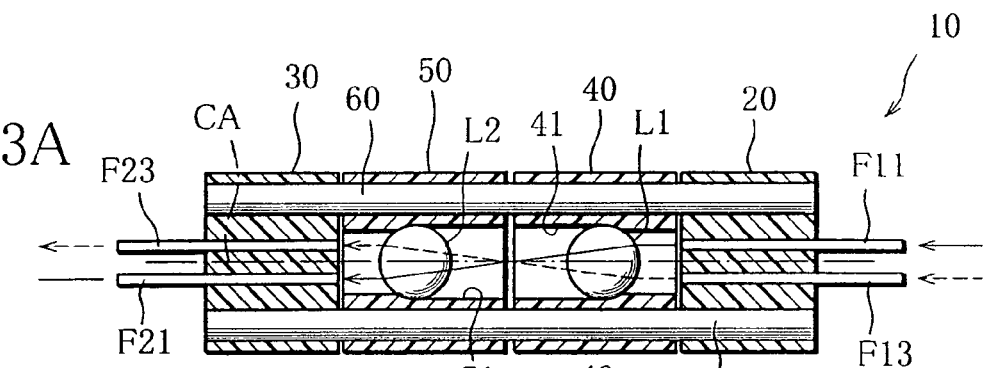
FIG. 3A is a longitudinal horizontal section view of an optical module according to a first embodiment of the present invention.
Figure 3B:
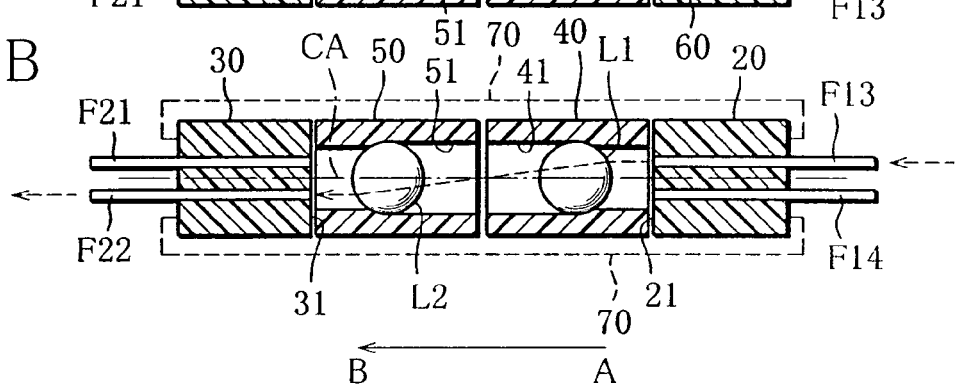
FIG. 3B is a longitudinal vertical section view of the optical module shown in FIG. 3A.
Figure 4A:
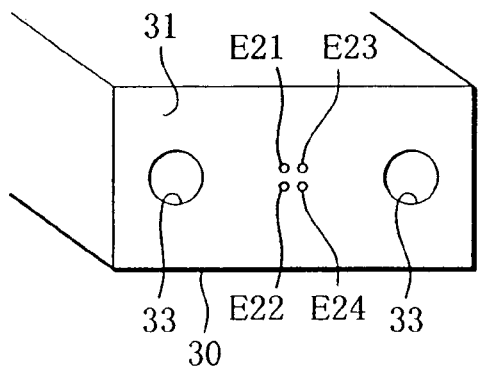
FIG. 4A is a fragmentary perspective view showing an abutting face of a first fiber unit of the optical module shown in FIGS. 3A and 3B.
Figure 4B:
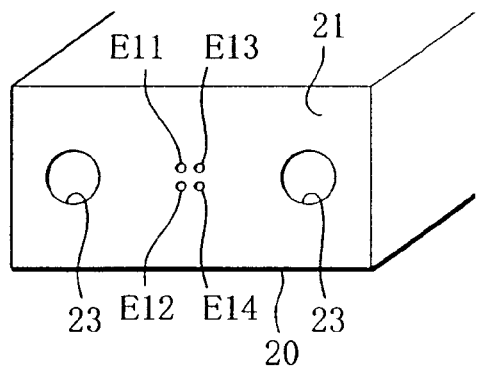
FIG. 4B is a fragmentary perspective view showing an abutting face of a second fiber unit shown in FIGS. 3A and 3B.
Figure 5:
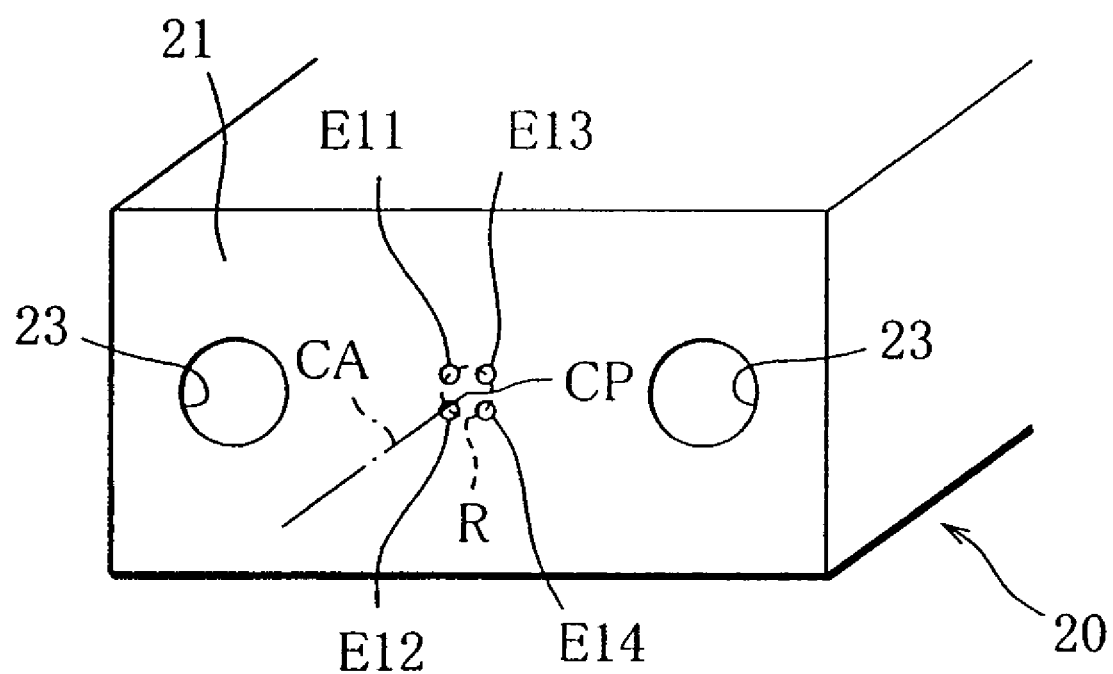
FIG. 5 is a fragmentary perspective view showing an abutting face of the first fiber unit.

With reference to FIGS. 3-5, an optical module according to a first embodiment of the present invention will be explained in detail.

This optical module 10 comprises a first fiber unit 20 in which distal end portions of two pairs of optical fibers F11-F14 are fixedly arranged in parallel to the longitudinal direction (AB direction) of the optical module 10; a second fiber unit 30 in which distal end portions of two pair of optical fibers 21-24 are fixedly arranged in parallel to the AB direction; a first collimator unit 40 having a lens Ls for collimating outgoing light beams from the optical fibers F11-F14 of the first fiber unit 20; a second collimator unit 50 having a lens L2 for collimating outgoing light beams from the optical fibers F21-24 of the second fiber unit 30; a pair of guide pins 60 for positioning the units 20, 30, 40 and 50 to one another; clips 70 for fixedly holding these units 20, 30, 40 and 50. The first fiber unit 20 and the first collimator unit 40 constitute a first multi-core collimator, whereas the second fiber unit 30 and the second collimator unit 50 constitute a second multi-core collimator. Each of the units 20, 30, 40 and 50 is molded from engineering plastic such as thermoplastic resin (e.g., PPS (polyphenylene sulfide)) or thermoplastic resin mixed with filler or thermosetting resin (e.g., epoxy-base resin or the like). The fiber units 20, 30 are formed with optical fiber insertion holes to which two pairs of optical fibers F11-F14 are inserted and fixed with use of adhesive or the like.

As shown in FIG. 4A, the first fiber unit 20 has an abutting face 21 to which end faces E11-E14 of the optical fibers F11-F14 are exposed. The first fiber unit 20 is formed with a pair of guide holes 23 that permit the pair of guide pins 60 to pass therethrough and that open to the abutting face 21. Each guide hole 23, which is formed into a circular shape in cross section, has the diameter nearly equal to the diameter of the guide pin 60 which has a circular section.

As shown in FIG. 5, the fiber end faces E11-E14 are disposed at equal interval on the circumference R of an imaginary circle on the abutting face 21. Thus, the end faces E11 and E14 are symmetric to each other with respect to the center CP of the imaginary circle (hereinafter referred to as the center CP of the circumference R), and the end faces E12 and E13 are symmetric to each other with respect to the center CP of the circumference R. The circumference R has the center axis CA common to that of the first fiber unit 20 and extending perpendicular to the abutting face 21 to pass through the center CP of the circumference R.

As in the case of the abutting face 21 of the first fiber unit 20, fiber end faces E21-E24 are disposed at equal interval on an imaginary circumference that is centered at the center axis CA on an abutting face 31 of the second fiber unit 30.

Referring to FIGS. 3A and 3B again, the first collimator unit 40 is formed with a lens hole 41 for fixedly receiving a lens L1 which is fixed by adhesive or the like at the center of the lens hole 41. Thus, the lens L1 is fixed at a position away from the opposite end faces of the first collimator unit 40 by the focal distance f.

The second collimator unit 50 has the same construction as the first collimator unit 40. Thus, a lens L2 is fixedly received at the center of a lens hole 51.

Each of guide pins 60 passes through and is fitted to a guide hole 23 formed in the first fiber unit 20, guide holes formed in the first and second collimator units 40, 50, and a guide hole 33 formed in the second fiber unit 30 in this order, whereby the units 20, 30, 40 and 50 are coupled to one another, with their center axes CA aligned to one another. The guide pins 60 and the guide holes 23, 33 constitute guide means.

Although detailed illustrations will be omitted, each clip 70 is comprised of a plate member adapted to abut against upper or lower faces of the units 20, 30, 40 and 50, and a plate spring adapted to be engaged with outer end faces of the first and second fiber units 20, 30. The units 20, 30, 40 and 50 are juxtaposed and clamped together by the clips 70, with the guide pins 60 inserted into these units.

In the following, an example of operation of the optical module shown in FIGS. 3A and 3B will be explained.

Outgoing laser light beams diverge from the end face E11 of the optical fiber F11 in the first fiber unit 20, and are collimated by the first lens L1 to pass through the vicinity of the center axis CA of the optical module 10 at the boundary between the first and second collimator units 40, 50. The laser light beams propagate straight to enter the second lens L2, and are focused by the lens to enter the end face E22 of the optical fiber F22 in the second fiber unit 30. The fiber end faces E11 and E22 are positioned diametrically opposite to each other with respect to the center axis CA. Thus, laser light beams from the optical fiber F11 are contactlessly optically coupled to the optical fiber F22 which is disposed diametrically opposite the optical fiber F11 with respect to the center axis CA. That is, the optical fibers F11 and F12 are optically coupled to each other. Similarly, the optical fibers F12 and F21, having end faces E12, E21 diametrically opposite to each other with respect to the center axis CA, are contactlessly optically coupled together. The optical fibers F13 and F24 having end faces E13 and E24 located at diametrically opposite places are contactlessly optically coupled together. Further, the optical fibers F14 and F23 having end faces E14 and E23 at diametrically opposite places are contactlessly optically coupled to each other.

Since the units 20, 30, 40 and 50 are separable as mentioned above, the first fiber unit 20, for instance, may be coupled to a fiber unit, other than the second fiber unit 30, having the same construction as the second fiber unit.

FIGS. 6A-6D show modifications of the first fiber unit 20.

Figure 6A:
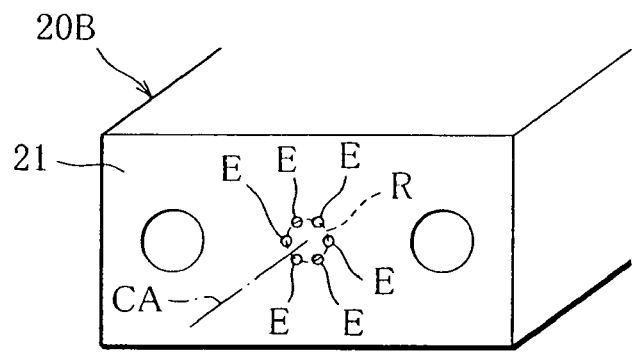
FIG. 6A is a fragmentary perspective view showing a modification of the first fiber unit of the first embodiment.

In a fiber unit 20B according to a first modification shown in FIG. 6A, six fiber end faces E are exposed to an abutting face 21 of the fiber unit. These end faces E are disposed at equal interval on an imaginary circumference that is placed on the abutting face 21 and centered on the center axis CA. Although illustrations are omitted, on an abutting face of the second fiber unit (not shown) facing the first fiber unit when assembled to form an optical module, fiber end faces are arranged in the same manner as in the abutting face 21 of the first fiber unit 20B. Thus, optical signal coupling can be achieved between any one of the fiber end faces arranged on the first fiber unit 20B and a corresponding fiber end face on the second fiber unit (not shown) that is disposed diametrically opposite the just-mentioned fiber end face on the first fiber unit with respect to the center axis CA.

Figure 6B:
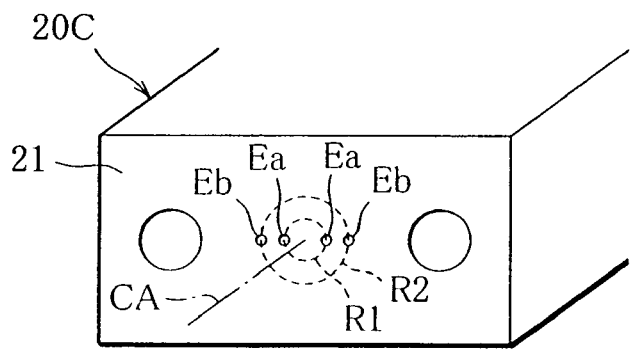
FIG. 6B is a fragmentary perspective view showing another modification of the first fiber unit.

In a fiber unit 20C according to a second modification shown in FIG. 6B, a pair of fiber end faces Ea are disposed on an inner imaginary circumference R1 on an abutting face 21 so as to be diametrically opposite each other, and another pair of fiber end faces are disposed on an outer imaginary circumference R2 to be diametrically opposite each other. The inner and outer circumferences R1, R2 have their common center axis CA, and the four fiber end faces Ea and Eb are arranged in a line. On an abutting face of the second fiber unit, though illustrations are omitted, fiber end faces are disposed in the same manner as in the abutting face 21 of the first fiber unit 20 that faces the second fiber unit when assembled to form an optical module. Thus, optical signal coupling can be achieved between any one of the fiber end faces Ea, Eb on the first fiber unit 20C and a corresponding fiber end face on the second fiber unit (not shown) which is disposed diametrically opposite the fiber end face on the first fiber unit.

Figure 6C:
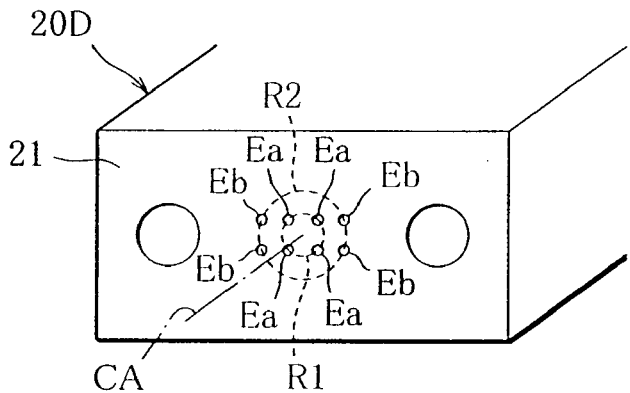
FIG. 6C is a fragmentary perspective view showing still another modification of the first fiber unit.

In a fiber unit 20D according to a third modification shown in FIG. 6C, two pairs of fiber end faces Ea are disposed on an inner circumference R1 on an abutting face 21, and two pairs of fiber end faces Eb are disposed on an outer circumference R2 so as to face to one another. Although illustrations are omitted, on an abutting face of a second fiber unit, fiber end faces are arranged in the same manner as in the abutting face 21 of the first fiber unit 20D, to which the second fiber unit faces when assembled to form an optical module, thereby permitting optical signal coupling to be achieved between any one of the fiber end faces Ea, Eb of the first fiber unit 20D and a corresponding fiber end face on the second fiber unit (not shown) which is disposed diametrically opposite the fiber end face on the first fiber unit with respect to the center axis CA.

Figure 6D:
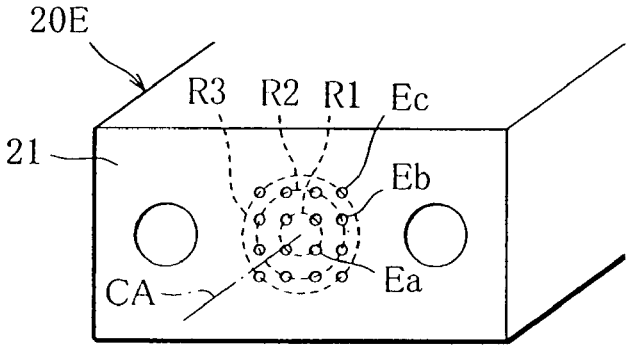
FIG. 6D is a fragmentary perspective view showing still another modification of the first fiber unit.

In a fiber unit 20E according to a fourth modification shown in FIG. 6D, two pairs of fiber end faces Ea are disposed on an inner circumference R1 on an abutting face 21 such that paired fiber end faces oppose each other, four pairs of fiber end faces Eb are disposed on an intermediate circumference R2 such that paired fiber end faces oppose each other, and two pairs of fiber end faces Ec are disposed on an outer circumference R3 such that paired fiber end faces oppose each other. The inner circumference R1, the intermediate circumference R2, and the outer circumference R3 have their common center axis CA about which paired fiber end faces Ea-Ec are disposed to be opposite. Thus, optical signal coupling can be achieved between any one of the fiber end faces Ea, Eb and Ec on the first fiber unit 20D and a corresponding fiber end face on a second fiber unit (not shown), which is disposed so as to be diametrically opposite the fiber end face on the first fiber unit with respect to the center axis CA.

In the following, an optical module according to a second embodiment of this invention will be explained, which is a modification of the optical module of the first embodiment, so that explanations on like elements denoted by like numerals will be omitted.

Figure 7A:
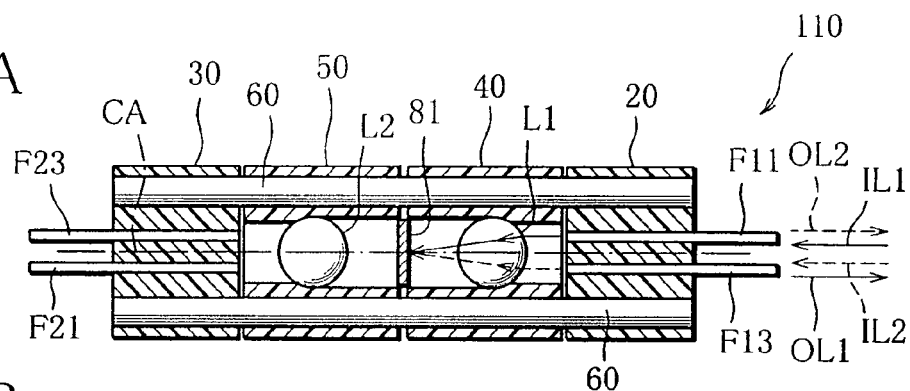
FIG. 7A is a longitudinal horizontal section view showing an optical module according to a second embodiment of the present invention.
Figure 7B:
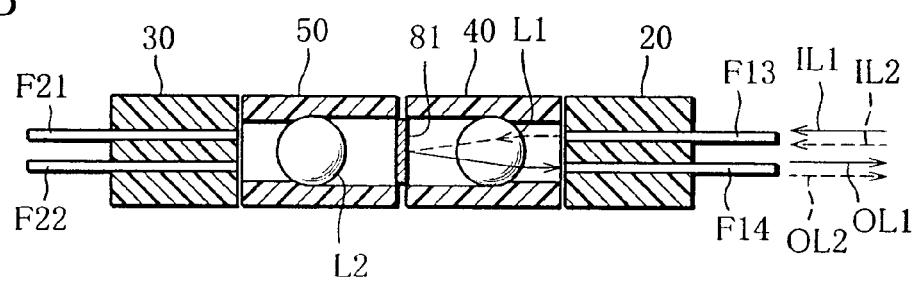
FIG. 7B is a longitudinal vertical section view of the optical module shown in FIG. 7A.

As shown in FIGS. 7A and 7B, the optical module 110 of this embodiment comprises a mirror 81 serving as a flat-plate like optical element, which is detachably arranged between first and second collimator units 40, 50. The first and second collimator units 40, 50 may be formed with a space for receiving the mirror 81, so that they are joined directly to each other. Alternatively, the second collimator unit 50 may be shortened in length by the thickness of the mirror 81, so that the optical module 110 has the same length as the optical module 10 of the first embodiment.

Figure 8:
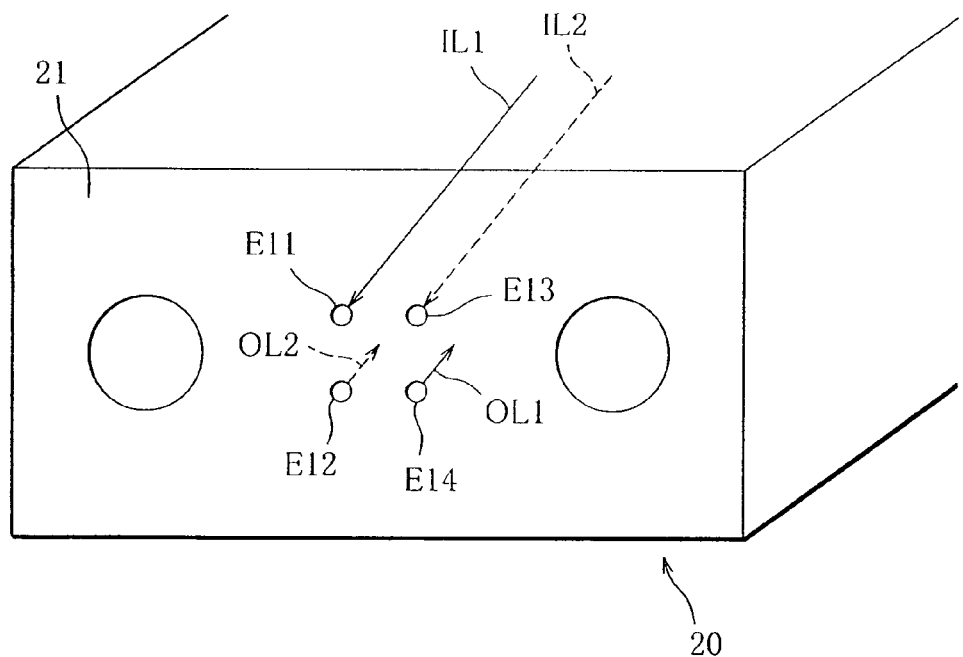
FIG. 8 is a fragmentary enlarged perspective view of the optical module shown in FIGS. 7A and 7B.

Referring to FIG. 8, an operation of the optical module 110 shown in FIGS. 7A and 7B will be explained.

Outgoing light beams IL1 diverging from the end face E11 of the optical fiber F11 provided in the first fiber unit 20 are collimated by the first lens Ls, and then reflected by the mirror 81 located between the first and second collimator units 40, 50. The reflected laser light beams OL1 return to and are focused by the first lens L1 to enter the end face E14 of the optical fiber F14 provided in the first fiber unit 20, which face is located diametrically opposite the fiber end face E11 with respect to the center axis CA. Thus, the laser light beams IL1 from the optical fiber F11 are contactlessly optically coupled to the optical fiber F14 placed diametrically opposite the optical fiber F11, to be emitted as laser light beams OL1 therefrom. Similarly, the fiber end faces E13, E12 are at diametrically opposite places with respect to the center axis CA, and laser light beams IL2 from the optical fiber F13 are optically coupled contactlessly to the optical fiber F12 disposed diametrically opposite the optical fiber F13, to be emitted as laser light beams OL2 therefrom.

Figure 1:
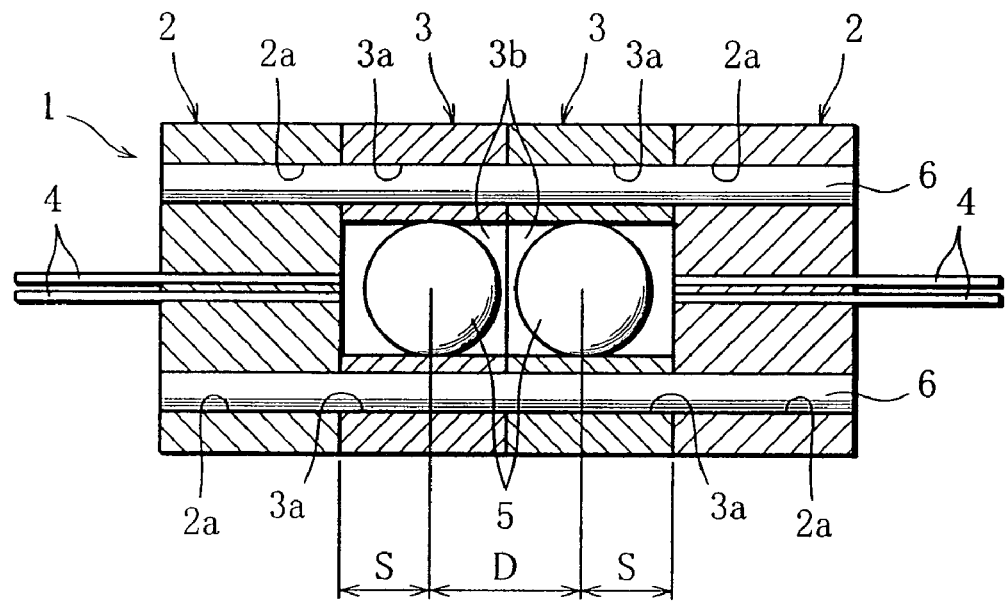
FIG. 1 is a section view showing an example of an MT type optical module.

When the mirror 81 is removed from between the collimator units 40 and 50, the optical module 110 has the same construction as the optical module 10 shown in FIG. 1, so that the same optical coupling as in the first embodiment is achieved between the optical fibers F11-F14 and the optical fibers F21-F24. A spacer or the like may be disposed instead of the mirror 81, thereby maintaining the distance between the units 40, 50 unchanged.

In a case where the mirror 81 is disposed in abutment against the first collimator unit 40 as shown in FIGS. 7A and 7B, the second collimator unit 50 and the second fiber unit 30 are unnecessary, so that a member for fixing the mirror 81 to the first collimator unit 40 may be provided instead of these units 50, 30.

Further, the mirror 81 may be replaced by a band pass filter. As for an optical module having a band pass filter that reflects light beams in a band of wavelength λ1 and transmits light beams in a band of wavelength λ2, the optical module operates as shown in FIG. 8 for incident light of wavelength λ1, whereas it operates as shown in FIGS. 3A, 3B and 4 for incident light of wavelength λ2.

In the following, an optical module according to a third embodiment will be explained.

Figure 9:
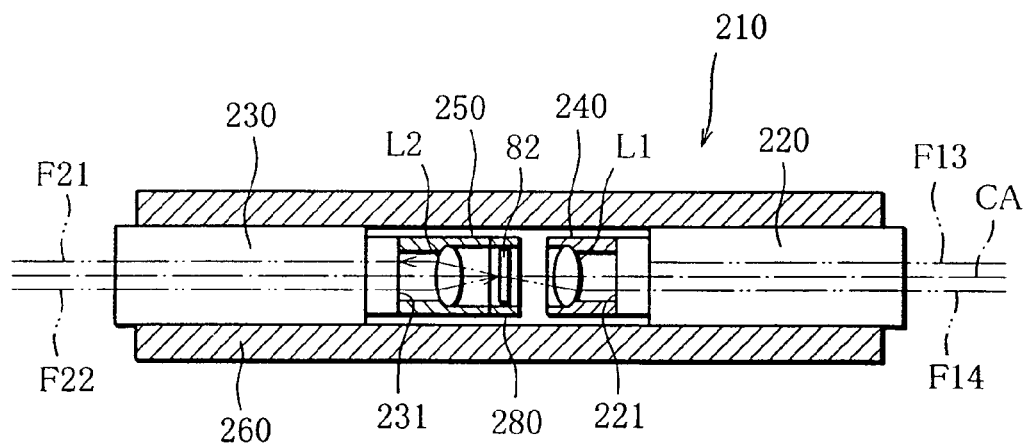
FIG. 9 is a longitudinal vertical section view showing an optical module according to a third embodiment of the present invention.

As shown in FIG. 9, this optical module 210 comprises a first ferrule 220 serving as a fiber unit in which two pairs of optical fibers F11-F14 (FIG. 11) are fixed in parallel to the optical axis; a second ferrule 230 serving as another fiber unit in which two pairs of optical fibers F21-F24 (FIG. 11) are fixed in parallel to the optical axis; a first lens section 240 having a first lens L1 for collimating outgoing light beams from the optical fibers F11-F14 of the first ferrule 220; a second lens section 250 having a second lens for collimating outgoing light beams from the optical fibers F21-F24 of the second ferrule 230; a holder 280, disposed between the first and second lens sections 240, 250, for holding a band pass filter 282; and a casing 260 for receiving the elements 220, 230, 240, 250 and 280. The first ferrule 220 and the first lens section 240 constitute a first multi-core collimator, whereas the second ferrule 230 and the second lens section 250 constitute a second multi-core collimator. The first ferrule 220 whose outer periphery is composed of metal and the first lens section 240 made of metal are fixed, by YAG welding, to each other and to the casing 260 made of metal. The second ferrule 230 having outer periphery made of metal, the second lens section 250 made of metal, and the holder 280 made of metal are fixed to one another and to the casing 260 by means of YAG welding.

Figure 10A:
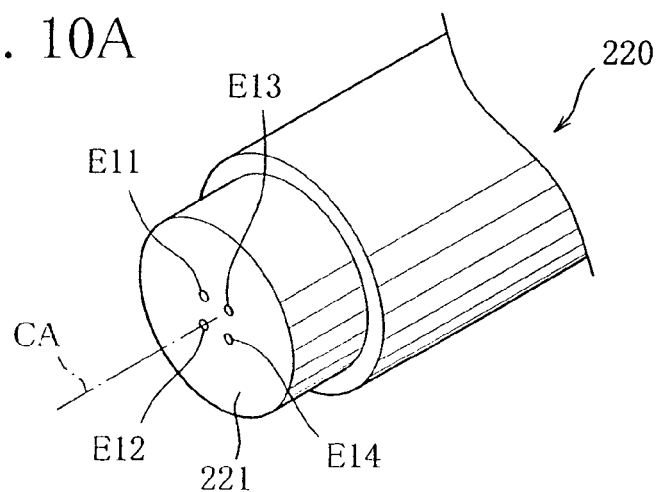
FIG. 10A is an enlarged perspective view of an end portion of a first ferrule shown in FIG. 9.
Figure 10B:
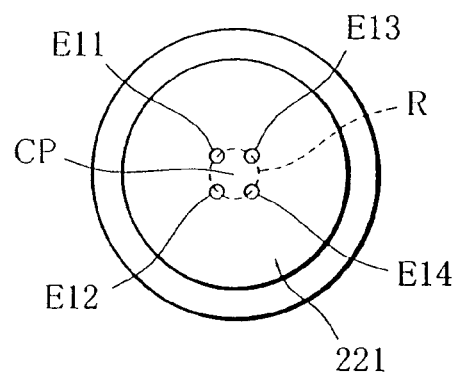
FIG. 10B is an end view of the first ferrule.

As shown in FIGS. 10A and 10B, end faces E11-E14 of optical fibers F11-F14 are disposed at equal interval on an imaginary circumference R on an end face 221 of the first ferrule 221. The fiber end faces E11 and E14 are symmetric with each other about the center CP of the circumference R, and the fiber end faces E12 and E13 are symmetric with respect to the center of the circumference R. The circumference R has its center axis CA which is common to that of the first fiber unit 220.

On an end face 231 of the second ferrule 230, fiber end faces E21-E24 are spaced at equal interval on an imaginary circumference placed on the end face 231 and centered on the center axis CA, as in the end face 221 of the first ferrule 220.

Next, an operation of the optical module 210 will be explained with reference to FIG. 11 in which reference numeral 290 denotes the lens sections 240, 250 and the holder 280.

The fiber end faces E12, E21 are disposed at diametrically opposite places with respect to the center axis. A laser light beam L11 of wavelength λ2 from the optical fiber F12, which is within a transmission wavelength band of the band pass filter 282, is coupled to the optical fiber F21. Similarly, a laser light beam L12 of wavelength λ2 from the optical fiber F14 is coupled to the optical fiber F23. On the other hand, a laser light beam L21 of wavelength λ1 from the optical fiber F24, which is within a reflection wavelength band of the band pass filter 282 is coupled to the optical fiber F21. Similarly, a laser light beam L22 of wavelength λ1 from the optical fiber F22 is coupled to the optical fiber F23. Thus, the laser light beam IL11 of wavelength λ1 and the laser light beam IL12 of wavelength λ2 are multiplexed and emitted to the optical fiber F23.

For a laser light beam of wavelength λ2, the optical module 210 of the third embodiment operates in the same manner as the optical module 10 of the first embodiment, so that the optical fiber F11 is coupled to the optical fiber F22, whereas the optical fiber F13 is coupled to the optical fiber F24.

FIGS. 12A-12D show modifications of the first ferrule 220.

Figure 12A:
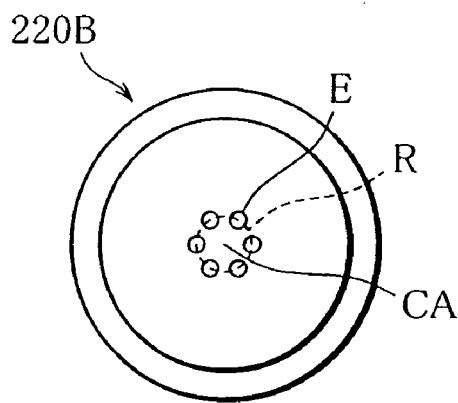
FIG. 12A is an end view showing a modification of the first ferrule shown in FIG. 9.

In a first ferrule 220B according to a first modification shown in FIG. 12A, six fiber end faces E are disposed as in the case shown in FIG. 6A. These fiber end faces E are spaced at equal interval on the imaginary circumference R placed on a ferrule end face coaxially with the center axis CA. Although illustrations are omitted, fiber end faces on a second ferrule are disposed in the same manner as in the first ferrule to which the first ferrule faces when assembled to form an optical module, so that optical signal coupling is achieved between any one of the fiber end faces E on the first ferrule 220B and a corresponding fiber end face on the second ferrule (not shown) which is at a diametrically opposite place to the fiber end face on the first ferrule.

Figure 12B:
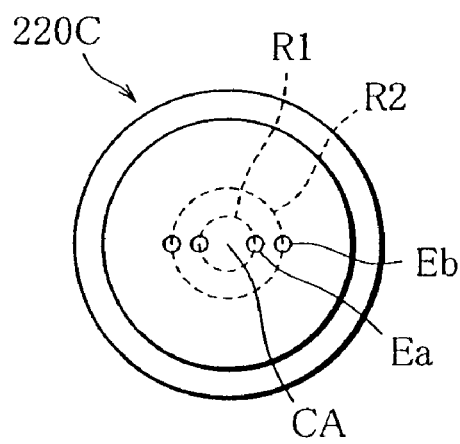
FIG. 12B is an end view showing another modification of the first ferrule.

In a first ferrule 220C according to a second modification shown in FIG. 12B, a pair of fiber end faces Ea are disposed on an inner circumference R1 and a pair of fiber end faces Eb are disposed on an outer circumference R2 such that paired fiber end faces are opposite to each other and these four fiber end faces Ea, Eb are arranged in a line, as in the case of FIG. 6B. Although illustrations are omitted, the arrangement of fiber end faces on a second ferrule, facing the first ferrule when assembled to form an optical module, is the same as in the first ferrule, and accordingly, optical signal coupling is achieved between any one of the fiber end faces Ea, Eb and a corresponding fiber end face on the second ferrule (not shown) which is disposed to be diametrically opposite the fiber end face on the first ferrule with respect to the center axis CA.

Figure 12C:
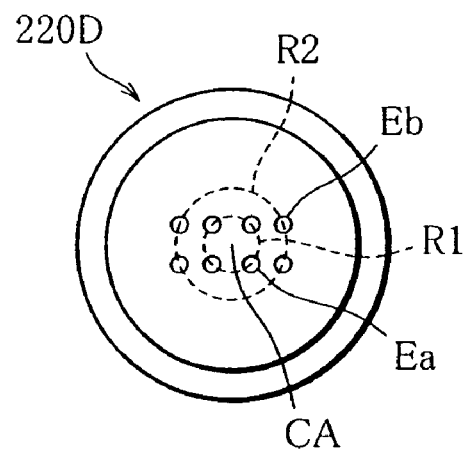
FIG. 12C is an end view showing another modification of the first ferrule.

In a first ferrule 220D according to a third modification shown in FIG. 12C, two pairs of fiber end faces Ea are arranged on an inner circumference R1 and two pairs of fiber end faces Eb are arranged on an outer circumference R2, such that paired end faces face to each other, as in the case of FIG. 6C. This applies to fiber end faces arranged on a second ferrule although illustrations are omitted. Thus, it is possible to achieve optical signal coupling between any one of the fiber end faces Ea, Eb on the first ferrule 220C and a corresponding fiber end face on the second ferrule (not shown) arranged diametrically opposite the fiber end face on the first ferrule with respect to the center axis CA.

Figure 12D:
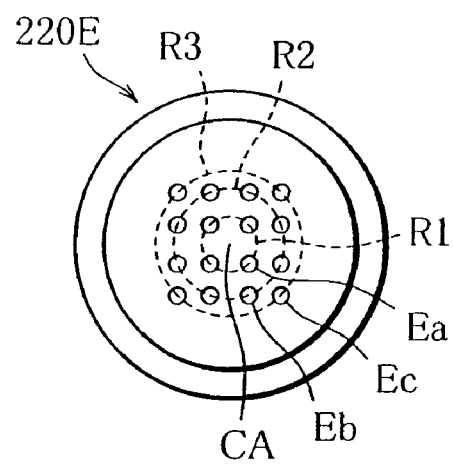
FIG. 12D is an end view showing still another modification of the first ferrule.

In a first ferrule 220E according to a fourth modification shown in FIG. 12D, two pairs of fiber end faces Ea are arranged on an inner circumference R1, four pairs of fiber end faces Eb are arranged on an intermediate circumference R2, and two pairs of fiber end faces Ec are arranged on an outer circumference R3, such that paired fiber end faces are opposite each other, as in the case of FIG. 6D. The inner, intermediate and outer circumferences R1, R2 and R3 have their common center axis CA, and paired fiber end faces Ea, Eb, Ec are opposite each other with respect to the center axis CA. This applies to fiber end faces on a second ferrule that faces the first ferrule when assembled to form an optical module. Thus, optical signal coupling is enabled between any one of the fiber end faces Ea, Eb, Ec on the first ferrule 220D and a corresponding fiber end face on the second ferrule (not shown) diametrically opposite the fiber end face on the first ferrule with respect to the center axis CA.

In the following, an optical module according to a fourth embodiment of the present invention will be explained, which module is a modification of the optical module (in particularly, the one shown in FIG. 6B) of the first embodiment.

Figure 13:
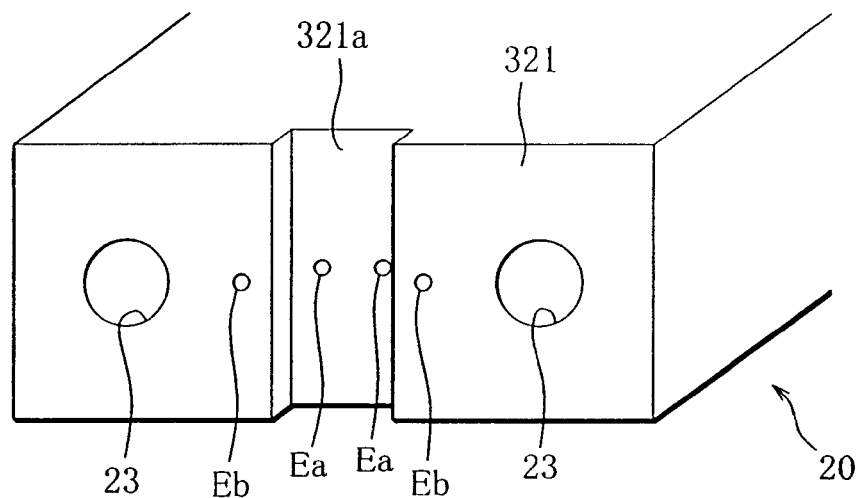
FIG. 13 is a fragmentary perspective view showing an essential part of an optical module according to a fourth embodiment of the present invention.

As shown in FIG. 13, this optical module is formed with a stepped groove like recess 321a at an abutting face 321 of a first fiber unit 20, to which recess four fiber end faces Ea, Eb are exposed. The positions of a first pair of fiber end faces Ea (i.e., the position of the circumference R1 shown in FIG. 6B) are deeper than those of a second pair of fiber end faces Eb (i.e., the position of the circumference R2 show in FIG. 6B). That is, the latter fiber end faces Eb are located closer to a first lens L1 of a first collimator unit 40 than the fiber end faces Ea. The reason why the fiber end faces Ea, Eb are placed at different positions in the direction of the center axis CA is to compensate for spherical aberration, i.e., phenomenon such that image formation takes place at a position closer to the lens with the increase in the distance measured from the optical axis in the direction perpendicular thereto.

Figure 14A:
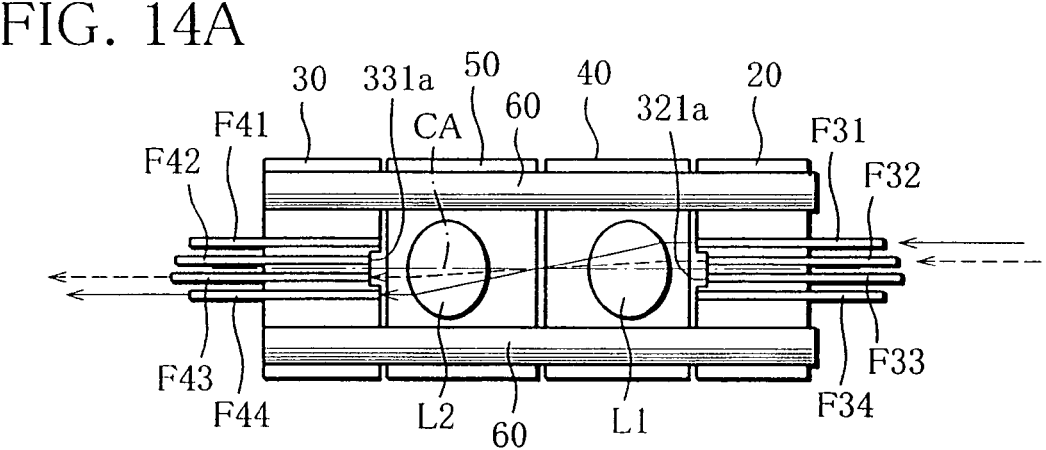
FIG. 14A is a schematic view of the optical module of the fourth embodiment as viewed in longitudinal horizontal section.
Figure 14B:
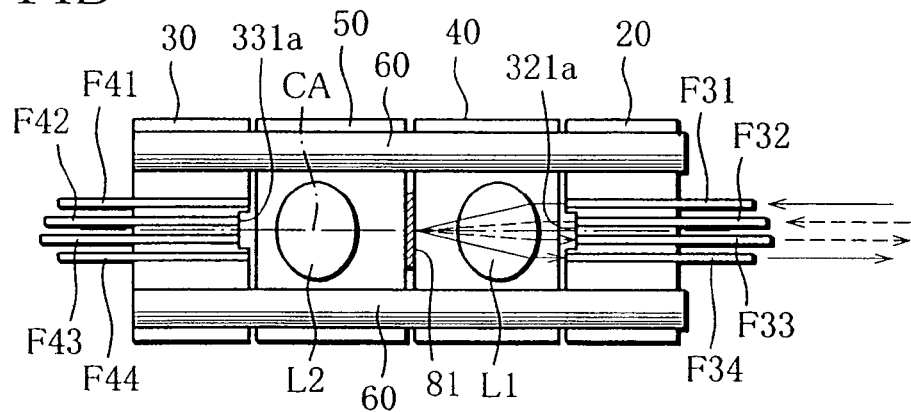
FIG. 14B is a schematic view of the optical module as viewed in longitudinal vertical section.

Although a detailed explanation is omitted, the second fiber unit 30 is formed at its abutting face with a groove like recess 331a for compensating spherical aberration of a second lens L2 (refer to FIGS. 14A and 14B).

Next, with reference to FIGS. 14A and 14B, an operation of the optical module according to the fourth embodiment will be explained.

In a case where a mirror 81 is not inserted between collimator units 40, 50 as shown in FIG. 14A, a laser light beam from an outer optical fiber F31 in the first fiber unit 20 is coupled to an outer optical fiber F44 in the second fiber unit 30, which fiber is disposed diametrically opposite the optical fiber F31, whereas a laser light beam from an inner optical fiber F32 is coupled to an inner optical fiber F43 disposed diametrically opposite the optical fiber F32. The laser light beams from the optical fibers F31, F32 are accurately collimated through the first lens L1, cross the center axis CA, and are accurately focused to end faces of optical fibers F44, F43 through the second lens L2. On the other hand, in a case where the mirror 81 is inserted between the collimator units 40, 50 as shown in FIG. 14B, a laser light beam from the outer optical fiber F31 of the first fiber unit 20 is coupled to the outer optical fiber F34 of the first fiber unit 20, which is diametrically opposite the optical fiber F31, whereas a laser light beam from the inner optical fiber F32 is coupled to the inner optical fiber F33. The laser light beams from the optical fibers F31, F32 are accurately collimated through the first lens L1, and are reflected by the mirror 81 so as to cross the center axis CA, and are then accurately focused by the first lens L1 to the end faces of the optical fibers F44, F43.

With the optical module according to the fourth embodiment, by inserting or removing the mirror 81, signal light beams from a pair of optical fibers F31, F32 are selectively coupled to a pair of optical fibers F44, F43 or a pair of optical fibers F34, F33. Since the light beams are accurately focused onto the end faces of these optical fibers F44, F43, F34 and F33, insertion loss in the optical module can be reduced.

Figure 15A:
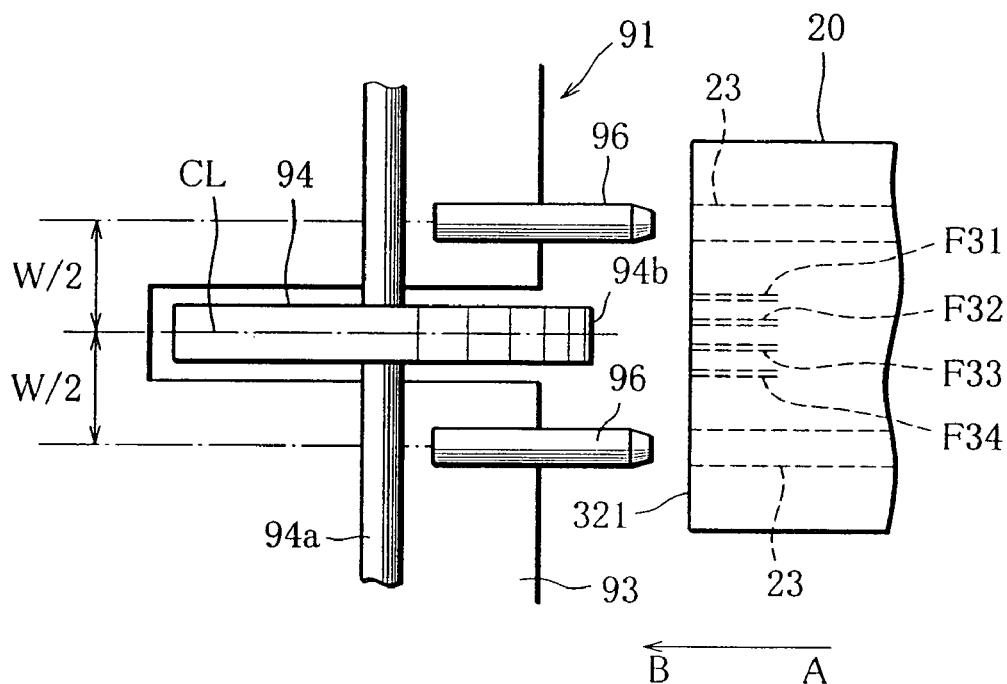
FIG. 15A is a schematic plan view of an end face machining apparatus used for fabrication of the optical module of the fourth embodiment.
Figure 15B:
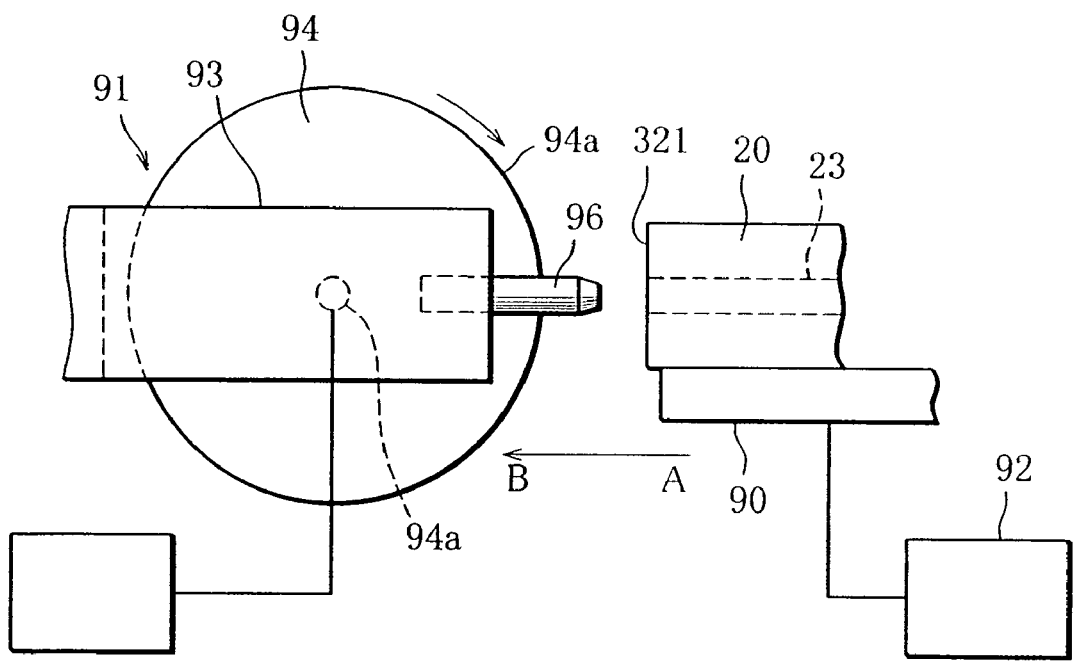
FIG. 15B is a schematic side view of the end face machining apparatus.

FIGS. 15A and 15B are a plan view and a side view for explaining an end face machining apparatus used for fabrication of the optical module according to the fourth embodiment shown in FIG. 13. This end face machining apparatus comprises a slide stage 90 movable together with the fiber unit 20 (or 30) which is fixed to the slide stage, and a polishing head 91, disposed to face the slide stage 90, for polishing the abutting face 321 (or 331) of the fiber unit. The fiber unit to be mounted to the slide stage 90 is molded from engineering plastic, so that it is formed with a pair of guide pins 23 (or 33) on the both sides of four optical fibers F31-F34 (or F41-F44), with the abutting face 321 (or 331) polished into a flat smooth face extending perpendicular to the optical axes of the optical fibers F31-F34 (or F41-F44).

The slide stage 90 is driven by a stage driving apparatus 92 to horizontally move at a predetermined speed in AB direction in which the guide pins 23 (or 33) formed in the fiber unit 20 (or 30) extend. The polishing head 91 comprises a circular polishing board rotatably supported by a head body 93, a rotary drive unit, coupled to a rotary shaft 94a of the polishing board 94, for rotating the polishing board 94, and a pair of guide pins 96 for guiding the polishing head 91 relative to the fiber unit 20 (or 30).

The guide pins 96 each have the outer diameter corresponding to the inner diameter of the guide hole 23 (or 33) and are spaced at a distance W which is equal to the distance between the guide holes 23 (or 33). Further, the guide pins 96 are positioned such that the center line CL between the axes of the guide pins 96 passes through the center of the polishing board 94 as viewed in the thickness direction of the polishing board. The center line CL and the axis of the rotary shaft 94a of the polishing board 94 are in the same plane, and the center line LC extends perpendicular to that plane. With the above construction, when the slide stage 90 is moved in the AB direction and the fiber unit 20 (or 30) is moved toward the polishing head 91, the guide pins 96 are inserted into the guide holes 23 (or 33), whereby the polishing head 91 is precisely aligned to the fiber unit. When the fiber unit 20 (or 30) is moved closer to the polishing head 91, a portion of the fiber unit is partly grinded and polished into an abutting face 321 (or 331) by means of a polishing face 94b of the rotating polishing board 94. Since the center line CL between the axes of the guide pins 96 passes through the thickwise center of the polishing board 94, that part of the abutting face 321 (or 331) to which inner optical fibers F32, F33 (or F42, F43) are exposed is grinded and polished, whereas another part thereof to which outer optical fibers f31, F34 (or F41, F44) are exposed is not grinded. As a result, a stepped groove like recess 321a is formed as shown in FIG. 13 to which recess the end faces Ea of the optical fibers F32, F33 (or F42, F43) are exposed. During the course of machining the fiber unit 20 (or 30), replacement of the polishing board 94 is made several times. The polishing face 94b of the polishing board 94 used for a later polishing stage should carry diamond paste having finer particle size, to achieve mirror-finish on the optical fibers F32, F33 (or F42, F43).

In the machining, the distance between the paired optical fibers F32, F33 may be about 250 μm, and the polishing board 94 may be about 500 μm or less in thickness and about 2 cm in radius.

In the following, an optical module according to a fifth embodiment of the present invention will be explained, which module is a modification of the optical module of the fourth embodiment.

Figure 16:
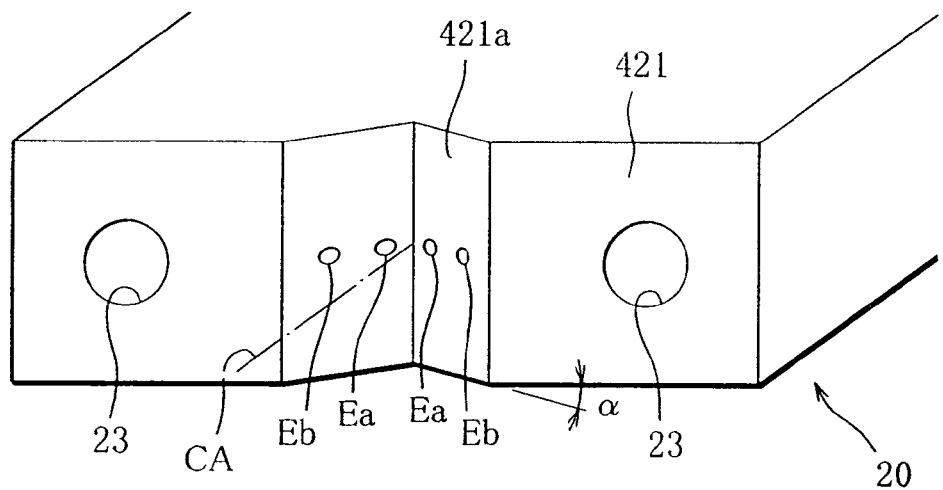
FIG. 16 is a fragmentary perspective view showing an essential part of an optical module according to a fifth embodiment of the present invention.

As shown in FIG. 16, this optical module is formed at an abutting face 421 of a first fiber unit 20 with a recess 421 which is V-shape in cross section and to which four fiber end faces Ea, Eb are exposed. The end faces Ea of inner fibers are disposed toward the back than the end faces Eb of outer fibers. By differentiating the positions of fiber end faces Ea, Eb, spherical aberration of a first lens L1 can be compensated. Moreover, these fiber end faces Ea, Eb are each formed into a slanted face corresponding to an angle of inclination of the recess 421a. The slanted fiber end faces Ea, Eb make it possible to prevent propagating light from being subject to fresnel-reflection at the fiber end faces Ea and Eb to return back to an light source. This makes it possible to prevent deteriorated light source and increased insertion loss, which would otherwise be caused by reflected light. For optical fibers whose refractive index ranges from 1.4 to 1.5 and whose cores have a 0.2%-0.3% greater refractive index, providing the critical total reflection angle of 4-5 degrees, the inclination angle of the fiber end faces Ea, Eb may be determined to be about 8 degrees, thereby preventing propagation of return light.

Figure 17A:
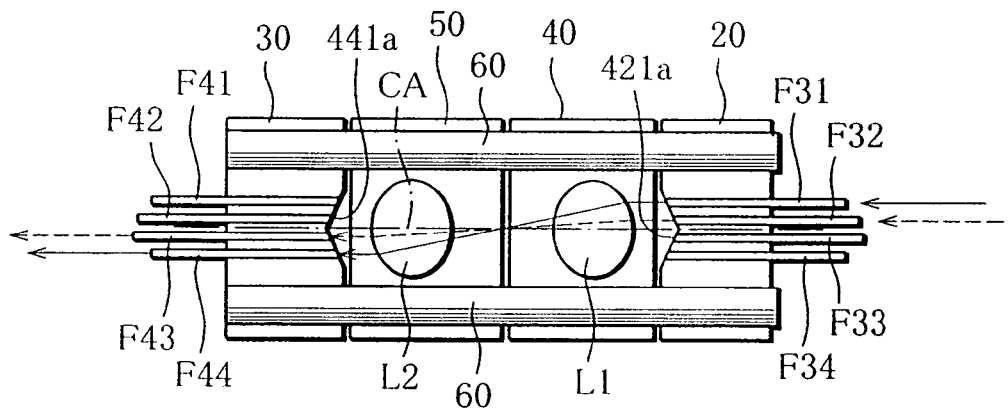
FIG. 17A is a schematic view of the optical module of the fifth embodiment as viewed in longitudinal horizontal section.
Figure 17B:
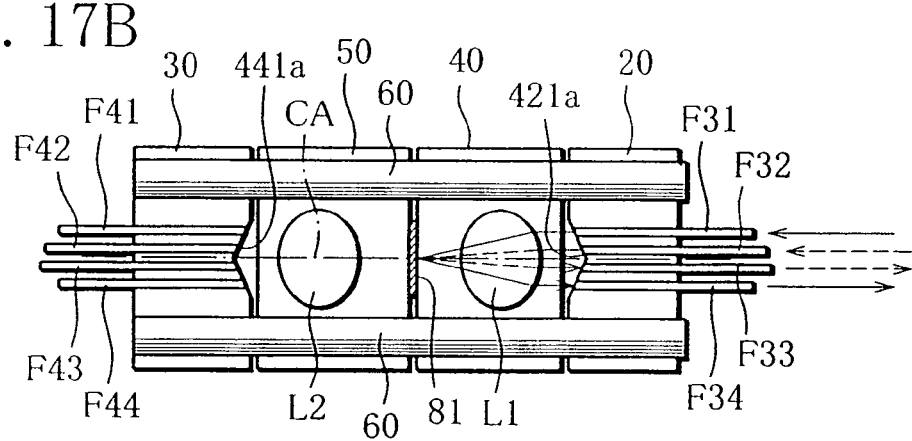
FIG. 17B is a schematic view of the optical module as viewed in longitudinal vertical section.

Although a detailed explanation will be omitted, an abutting face of the second fiber unit 30 is formed with a recess 431a, which is V-shape in cross section, for compensating for spherical aberration of a second lens L2 (refer to FIGS. 17A and 17B). The recess 431a has a similar slanted face, thereby preventing propagating light from being reflected at a fiber end face to return back to the light source.

In a case where no mirror 81 is inserted between collimator units 40, 50 as shown in FIG. 7A, laser light beams from the optical fibers F31, F32 of the first fiber unit 20 are coupled to optical fibers F44, F43 in the second fiber unit 30 which are disposed diametrically opposite the optical fibers F31, F32 with respect to the center axis CA, so that the light beams are accurately focused onto end faces of the optical fibers F44, F43 by way of first and second lenses L1, L2. On the other hand, in a case where the mirror 81 is inserted between the collimator units 40, 50 as shown in FIG. 17B, laser light beams from optical fibers F31, F32 of the first fiber unit 20 are coupled to optical fibers F34, F33 of the first fiber unit 20 which are disposed diametrically opposite to the fibers F31, F32 with respect to the center axis CA, such that the laser light beams are accurately focused onto end faces of the optical fibers F34, F33 by way of the first lens L1 and the like.

With the optical module according to the fifth embodiment, accurately focusing light beams onto the end faces of the optical fibers F44, F43, F34, F33 can be achieved, thereby reducing the insertion loss of the optical module. In addition, return light can be prevented, thereby improving characteristics of the optical module.

Figure 18A:
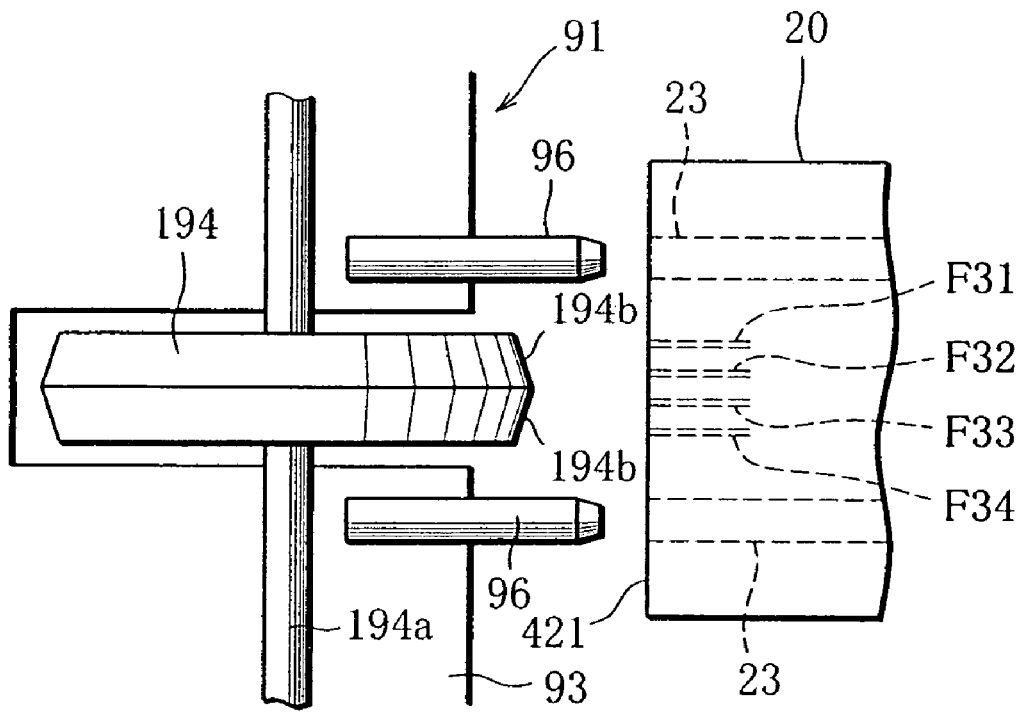
FIG. 18A is a plan view showing an end face machining apparatus used for fabrication of the optical module of the fifth embodiment.
Figure 18B:
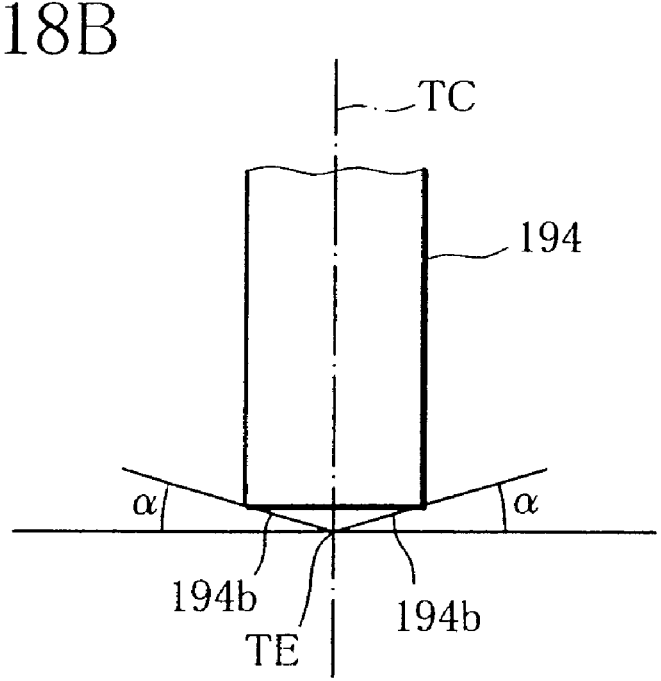
FIG. 18B is an enlarged view showing an essential part of the end face machining apparatus.

Next, with reference to FIGS. 18A and 18B, an end face machining apparatus used for fabrication of the optical module according to the fifth embodiment shown in FIG. 16 will be explained.

This end face machining apparatus, which is a modification of the apparatus shown in FIGS. 15A and 15B, comprises a polishing board 194 rotatable around a rotary shaft 194a and having a polishing face thereof comprised of two slanted face portions 194b that cross to form the boundary TE at the thickwise center TC. The slanted face portion 194b extends at an angle of about 8 degrees relative to a plane extending perpendicular to the direction of the thickwise center TC, corresponding to the inclination angle a of the recess 421a shown in FIG. 16.

In the illustrated end face machining apparatus, when the fiber unit 20 (or 30) is moved toward a polishing head 91, the polishing head 91 is aligned with the fiber unit by means of guide pins 96 and guide holes 23 (or 33), and then a semifinished abutting face 321 (or 331) of the fiber unit is grinded and polished by the polishing board 194. Thus, a V-shaped groove like recess 421a as shown in FIG. 16 is formed in the abutting face 321 (or 331) by means of the polishing face 194b having a V-shaped cross section. In the course of machining the semifinished fiber unit, replacement of the polishing board 194 is made several times. The polishing face 194b of the polishing board 194 used for a later polishing stage should carry diamond paste having finer particle size, to achieve mirror-finish on the optical fibers F31-F34 (or F41-F44).

In the following, an optical module according to a sixth embodiment of the present invention will be explained, which module is a modification of the optical module of the first embodiment.

Figure 19:
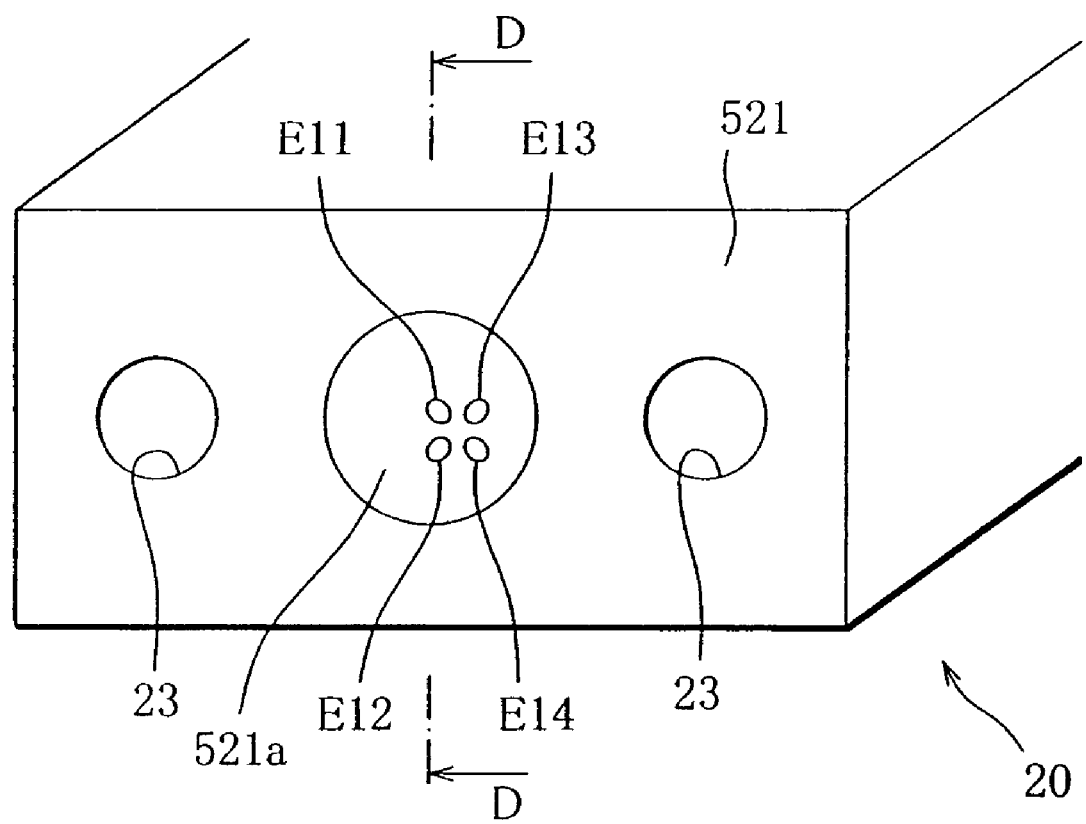
FIG. 19 is a fragmentary perspective view showing an essential part of an optical module according to a sixth embodiment of the present invention.
Figure 20A:
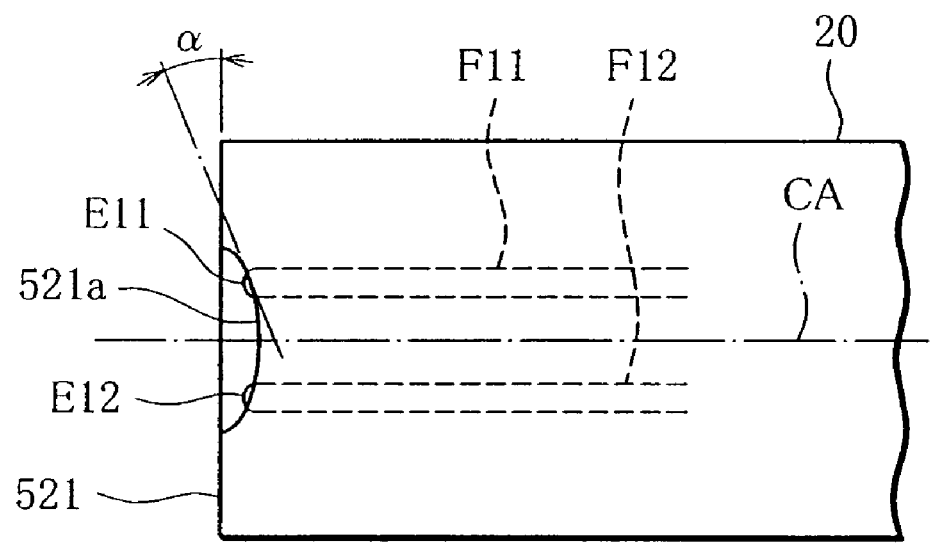
FIG. 20A is a fragmentary schematic view showing an example of the shape of an abutting face of a first fiber unit shown in FIG. 19.
Figure 20B:
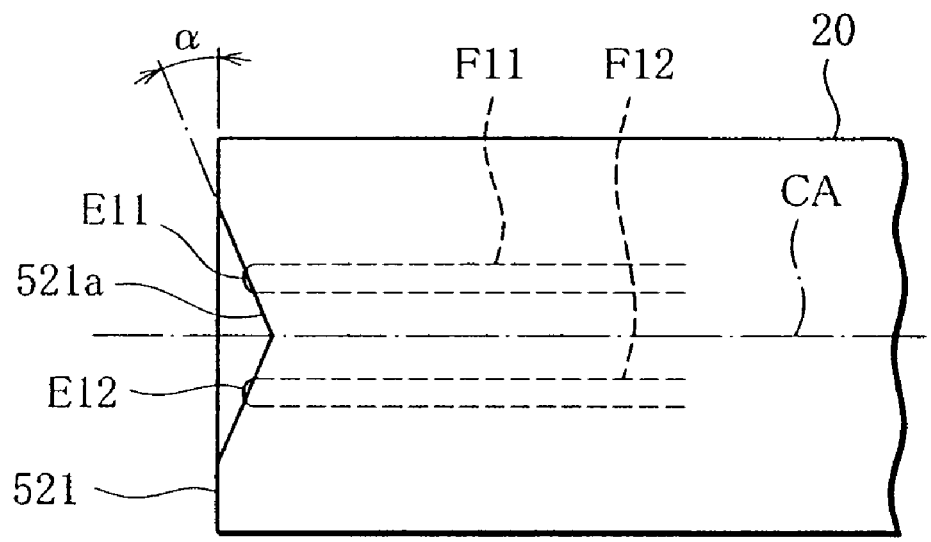
FIG. 20B is a fragmentary view showing an abutting face having a shape different from the one shown in FIG. 20A.

As shown in FIG. 19, this optical module has a first fiber unit 20 whose abutting face 521 is formed with a concave or conical recess 521a. FIG. 20A shows an example formed with a concave recess 521a, whereas FIG. 20B shows an example formed with a conical recess 521a. Four fiber end faces E11-E14 exposed to the recess 521a are formed into a slanted face extending at an inclination angle a toward the center axis CA. The slanted fiber end faces prevent propagating light from being reflected at the fiber end faces E11-E14 to return back to a light source.

Although a detailed explanation will be omitted, an abutting face of the second fiber unit 30 is formed with a concave or conical recess for compensating for spherical aberration of a second lens L2. The recess has an inclination for preventing propagating light from being reflected at fiber end faces to return back to a light source.

Next, with reference to FIGS. 21A and 21B, an exemplified operation of the optical module according to the sixth embodiment will be explained.

Laser light beams from the paired optical fibers F11, F13 are coupled to optical fibers F22, F24 (only F22 is shown in FIG. 21B) that are located symmetric to the fibers F11, F13 with respect to the center axis CA. The light beams are accurately focused onto end faces of the optical fibers F22, F24, which are exposed to the recess 531a, by way of the first and second lenses L1, L2.

In a case where a mirror is inserted between first and second collimator units 40, 50, laser light beams from paired optical fiber F11, F13 are efficiently coupled to optical fibers F14, F12 (only F14 is shown in FIG. 21B) disposed symmetric to the fibers F11, F13 with respect to the center axis CA.

Figure 22:
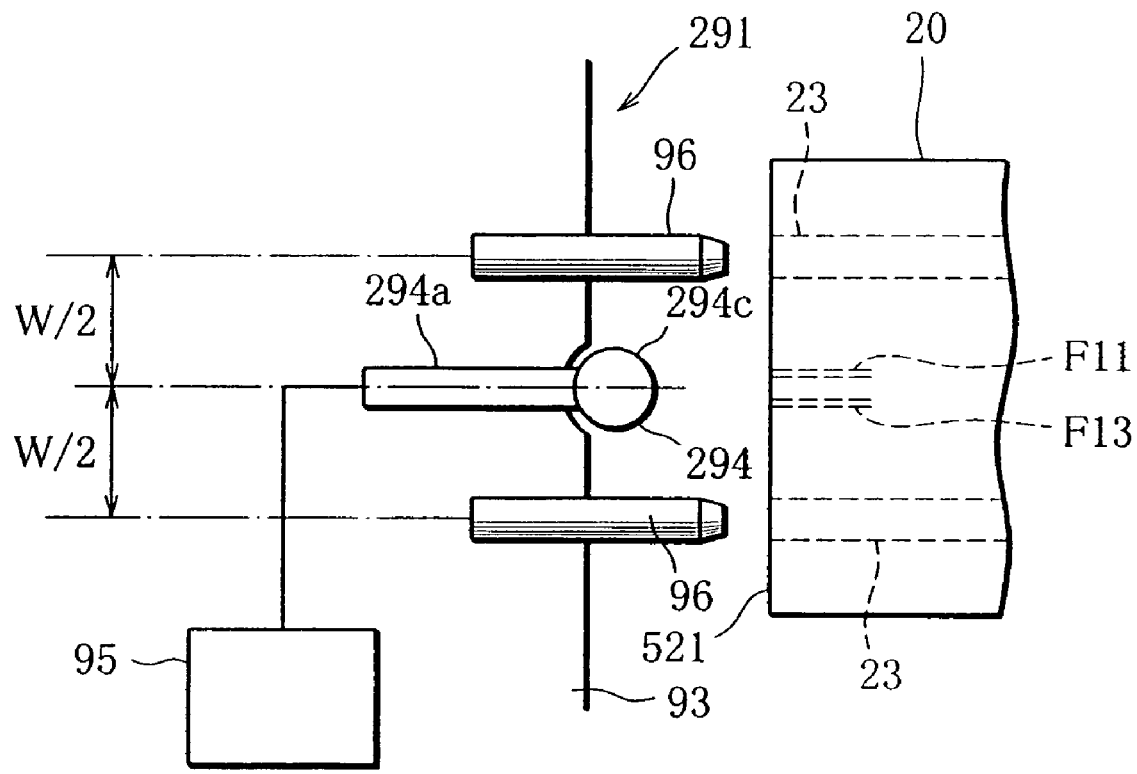
FIG. 22 is a schematic plan view of an end face machining apparatus used for fabrication of the optical module shown in FIG. 20A.

Next, with reference to FIG. 22, an end face machining apparatus used for fabrication of the optical module according to the sixth embodiment shown in FIGS. 19 and 20A will be explained.

This end face machining apparatus comprises a polishing head 291 which is a modification of the polishing head 91 of the end face machining apparatus shown in FIGS. 15A and 15B. The polishing head 291 comprises a spherical polishing member 294 rotatably supported by a head body 93, a rotary drive apparatus 95, coupled to a rotary shaft 294a of the polishing member 294, for rotating the polishing member 294, and a pair of guide pins 96 for guiding the polishing head 291 relative to the fiber unit 20.

The rotary shaft 294a of the polishing member 294 extends perpendicular to the abutting face 521 of the fiber unit 20, and is aligned with a center line CL between the axes of guide pins 96 that are spaced at a distance W from each other. A spherical tip 294c provided in the polishing member 294 is centered on the center line CL. When the polishing head 291 is moved toward the fiber unit 20, a semifinished abutting face 521 of the fiber unit 20 is grinded and polished by means of the spherical tip 294c of the rotating polishing member 294. Since the fibers F11-F14 are located at the same distance from the center line CL between the axes of the guide pins 96, a central part of the semifinished abutting face 521 is subject to machining, so that a spherical recess 521a as shown in FIG. 20A is formed in the abutting face 521 to which the end faces E11-E14 of the optical fibers F11-F14 are exposed. In the course of machining of the fiber unit 20, the recess 521a is gradually finished, while making replacement of the polishing member 294 several times.

Figure 23:
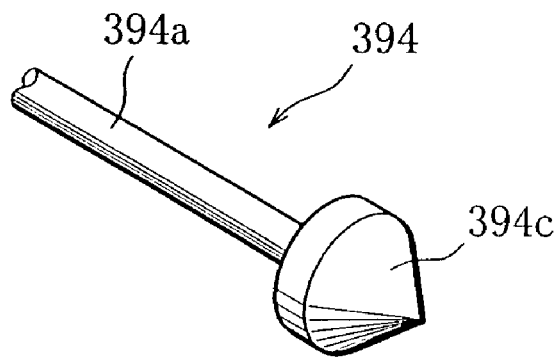
FIG. 23 is a fragmentary perspective view showing a polishing member of an end face machining apparatus used for fabrication of the optical module shown in FIG. 20B.

Next, with reference to FIG. 23, another end face machining apparatus used for fabrication of the optical module shown in FIGS. 19 and 20B will be explained.

This apparatus comprises a polishing member 394 having a rotary shaft 394a and a conical tip 394c attached to a distal end of the rotary shaft, with the axis of the conical tip 394c being aligned with the axis of the rotary shaft 394a. The conical tip 394c is used instead of the tip 294c shown in FIG. 22.

Next, modifications of the polishing members 294, 394 shown in FIGS. 22, 23 will be explained.

Figure 24A:
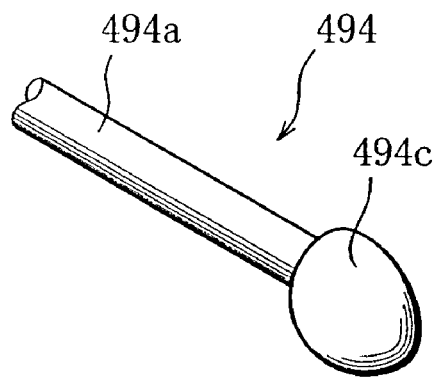
FIG. 24A is a fragmentary perspective view showing a modification of the polishing member.

A polishing member 494 shown in FIG. 24A comprises a semispherical tip 494c attached to a distal end of a rotary shaft 494a. When rotated, the polishing member 494 can provide a spherical polishing face, and hence can form a recess 521a similar to the recess shown in FIG. 20A, as with the case of the polishing member 294 shown in FIG. 22.

Figure 24B:
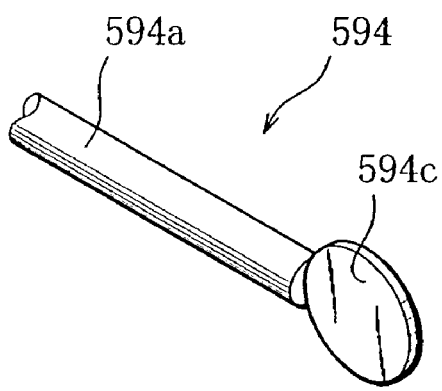
FIG. 24B is a fragmentary perspective view showing another modification of the polishing member.

A polishing member 594 shown in FIG. 24B comprises a tip 594c which is formed into a circular disk and which is attached to a distal end of a rotary shaft 594a. When rotated, the polishing member 594 provides a spherical polishing face, whereby a recess 521a similar to that of FIG. 20A can be formed as with the polishing member 294 shown in FIG. 22.

Figure 24C:
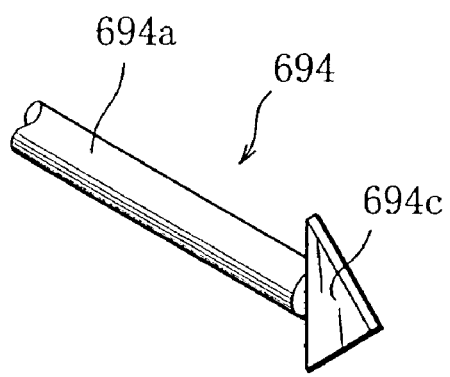
FIG. 24C is a fragmentary perspective view showing still another modification of the polishing member.

A polishing member 694 shown in FIG. 24C comprises a rotary shaft 694a having a distal end thereof to which a tip 694c formed into a triangular plate is attached. When rotated, the polishing member 694 provides a conical polishing face, and can form a recess 521a similar to that shown in FIG. 20B as with the polishing member 394 shown in FIG. 23.

In the following, an optical module according to a seventh embodiment of the present invention will be explained, which module is a modification of the optical module according to the sixth embodiment.

Figure 25:
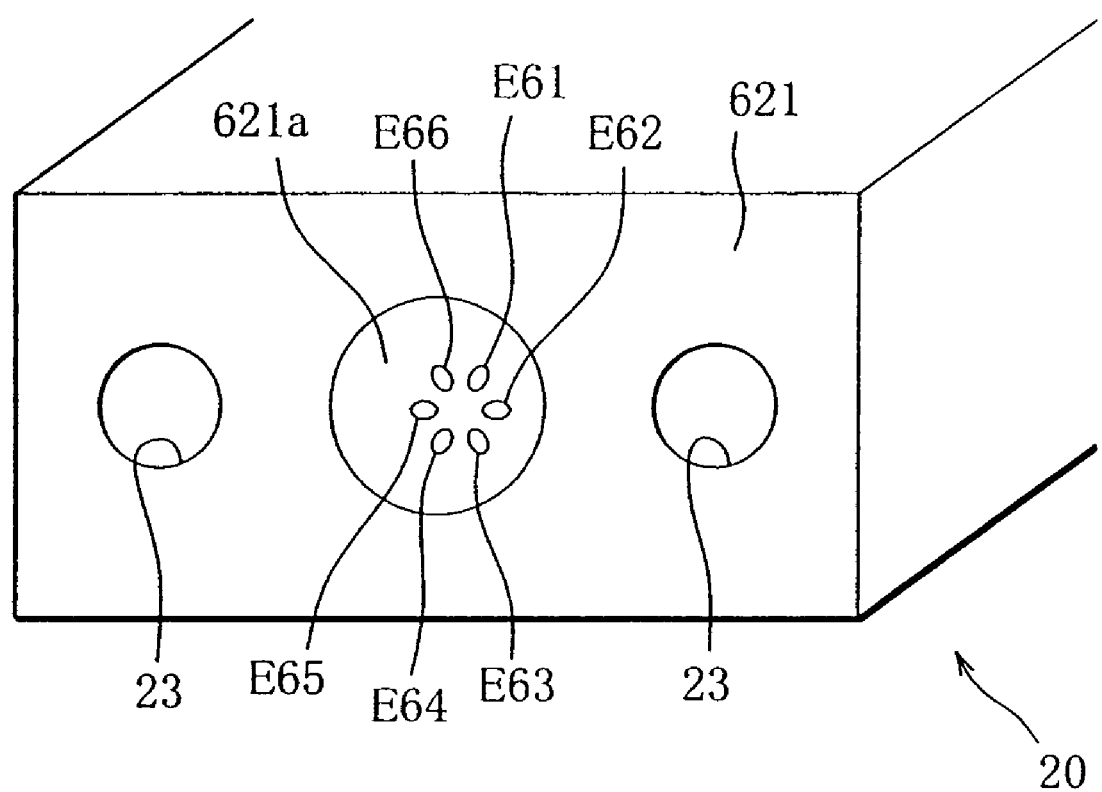
FIG. 25 is a fragmentary perspective view showing an essential part of an optical module according to a seventh embodiment of the present invention.
Figure 26A:
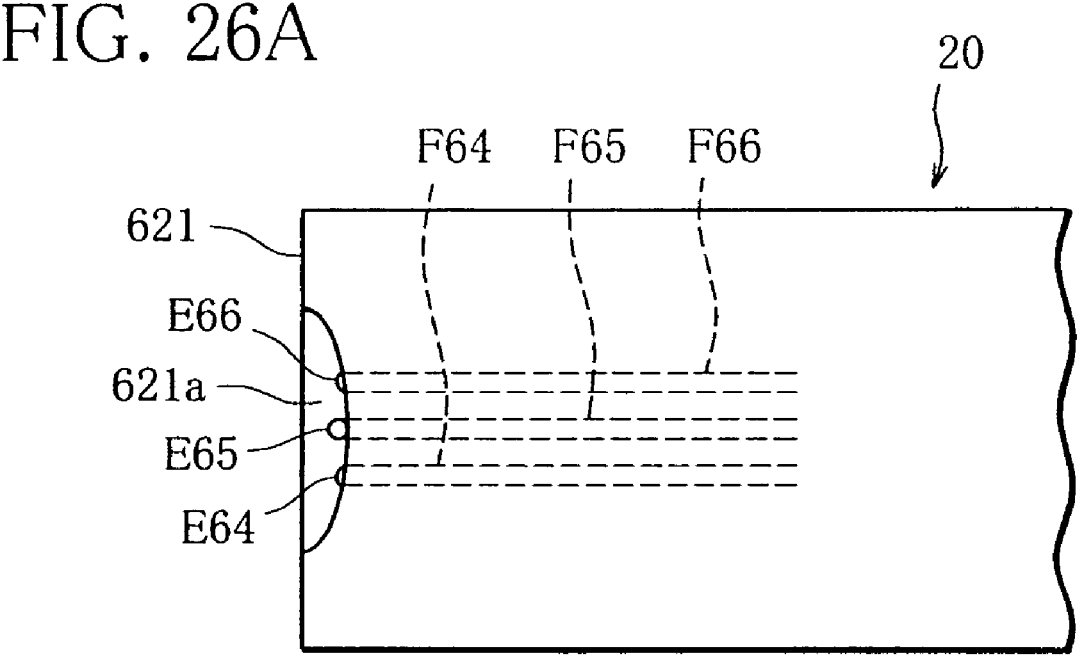
FIG. 26A is a fragmentary perspective view of an example of the shape of an abutting face of the first fiber unit shown in FIG. 25, as viewed in longitudinal horizontal section.
Figure 26B:
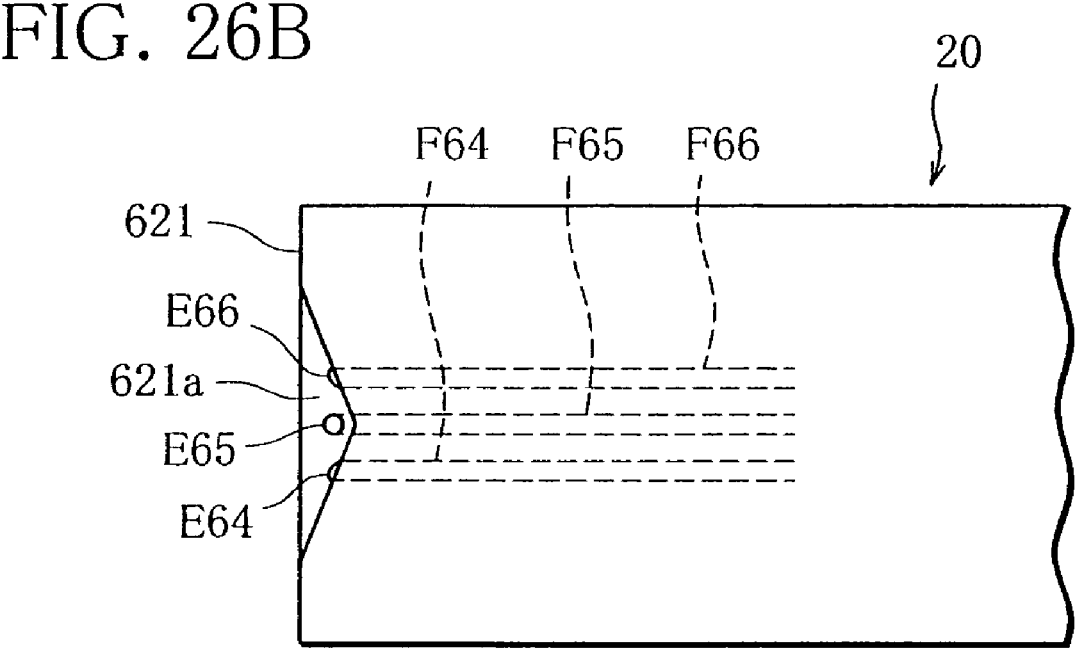
FIG. 26B is a fragmentary schematic view showing another shape of the abutting face of the first fiber unit.

As shown in FIG. 25, this optical module has a first fiber unit 20 having an abutting face 621 thereof formed with a recess 621a to which six fiber end faces E61-E66 arranged on the same circumference are exposed. In an example shown in FIG. 26A, the fiber end faces E61-E66 on the same circumference are exposed to a concave recess 621a. In an example shown in FIG. 26B, the six fiber end faces E61-E66 on the same circumference are exposed to a conical recess 621B. In FIGS. 26A and 26B, only the fiber end faces E64-E66 and corresponding optical fibers F64-F66 on one side are shown.

Figure 27:
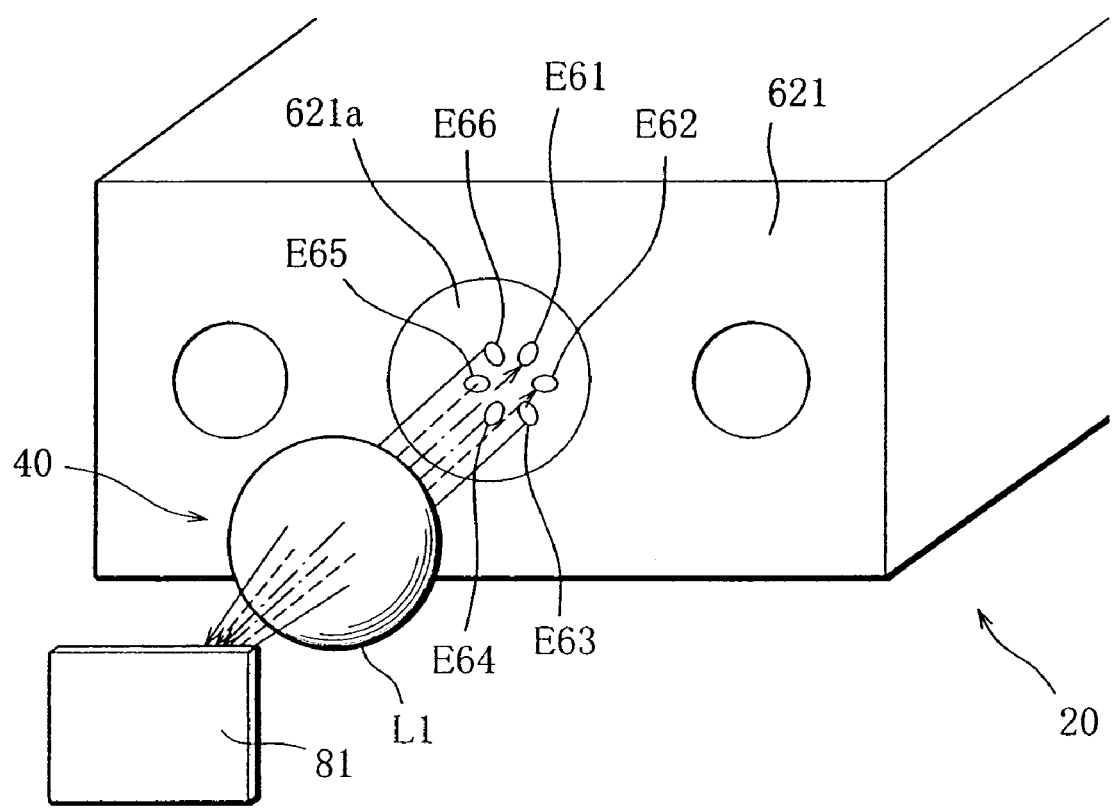
FIG. 27 is a fragmentary perspective view for explaining an operation of the optical module of the seventh embodiment.

With reference to FIG. 27, an operation of the optical module of the seventh embodiment will be explained.

In a case where a mirror 81 is placed to face an end face of the first collimator unit 40 as shown in FIG. 27, a laser light beam from the fiber end face E66 on the first fiber unit 20 enters, by way of a lens L1 and the mirror 81, the fiber end face E63 of the first fiber unit 20, which end face is disposed diametrically opposite the fiber end face E66. Similarly, a laser light beam from the fiber end face E65 enters the fiber end face E62, and a laser light beam from the fiber end face E64 enters the fiber end face E61. The laser light beams from the fiber end faces E64-E66 are accurately focused onto the fiber end faces E61-E63 that are located symmetrical to the fiber end faces E64-E66.

In the following, an optical module according to an eighth embodiment of the present invention will be explained, which module is a modification of the optical module according to the seventh embodiment.

Figure 28:
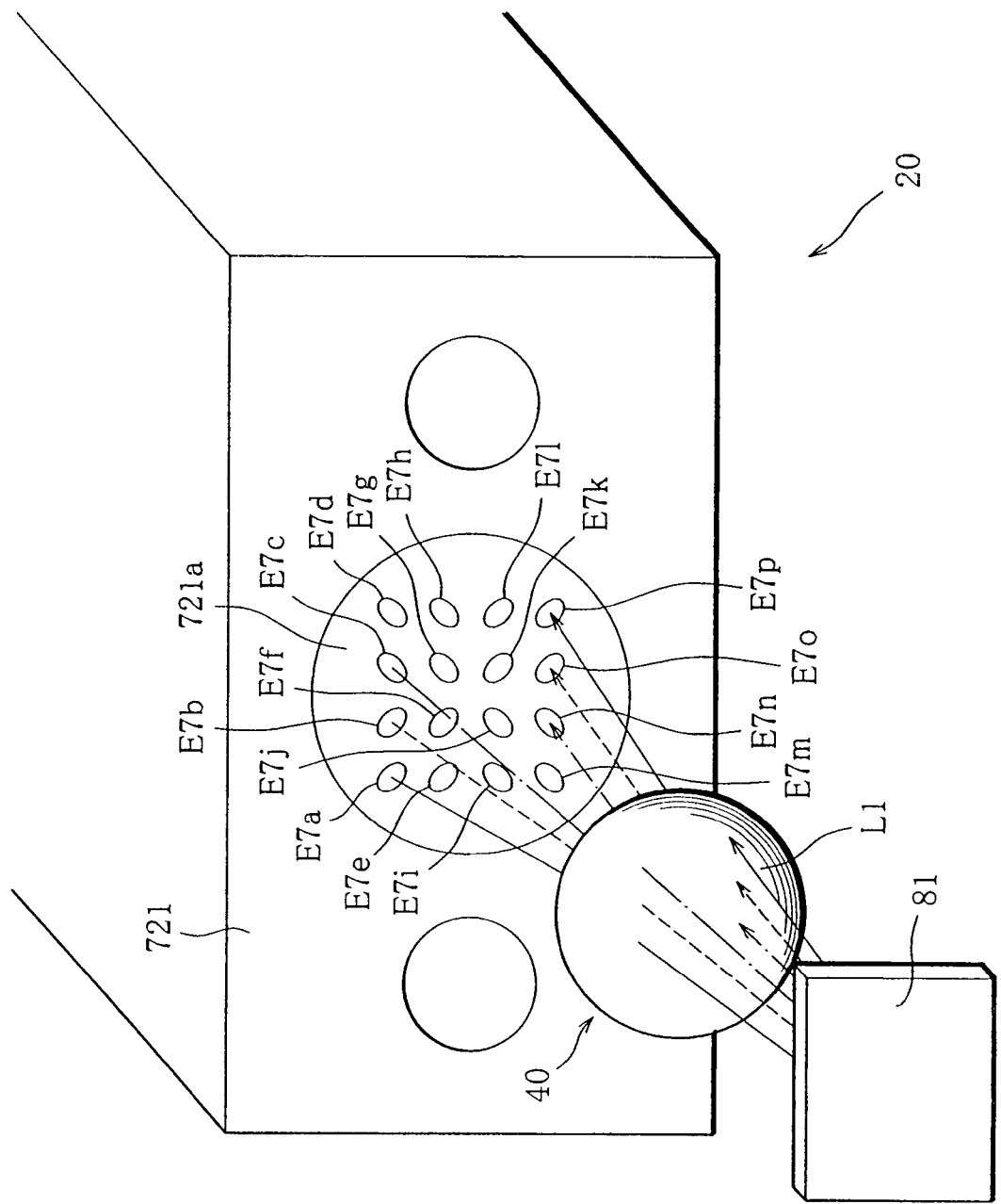
FIG. 28 is a fragmentary perspective view for explaining an essential part of an optical module according to an eighth embodiment of the present invention.

As shown in FIG. 28, this optical module has a first fiber unit 20 having an abutting face 721 thereof formed with a concave or conical recess 721a to which are exposed fiber end faces E7a-E7p that are 16 in number and disposed on three circumferences. In a case where a mirror 81 is disposed to face the end face of the first collimator unit 40 as illustrated, a laser light beam from the fiber end face E7a enters, by way of the lens L1 and the mirror 81, the fiber end face E7o, and a laser light beam from the fiber end face E7c enters the fiber end face E7n. Laser light beams from the other fiber end faces E7d-E7h enter a corresponding one of the remaining fiber end faces E7i-E7m that is disposed diametrically opposite the concerned fiber end face. The laser light beams from the fiber end faces E7a-E7h are accurately focused onto the symmetrically disposed fiber end faces E7i-E7p.

In the following, an optical module according to a ninth embodiment of the present invention will be explained, which module is a modification of the optical module according to the eighth embodiment.

Figure 29:
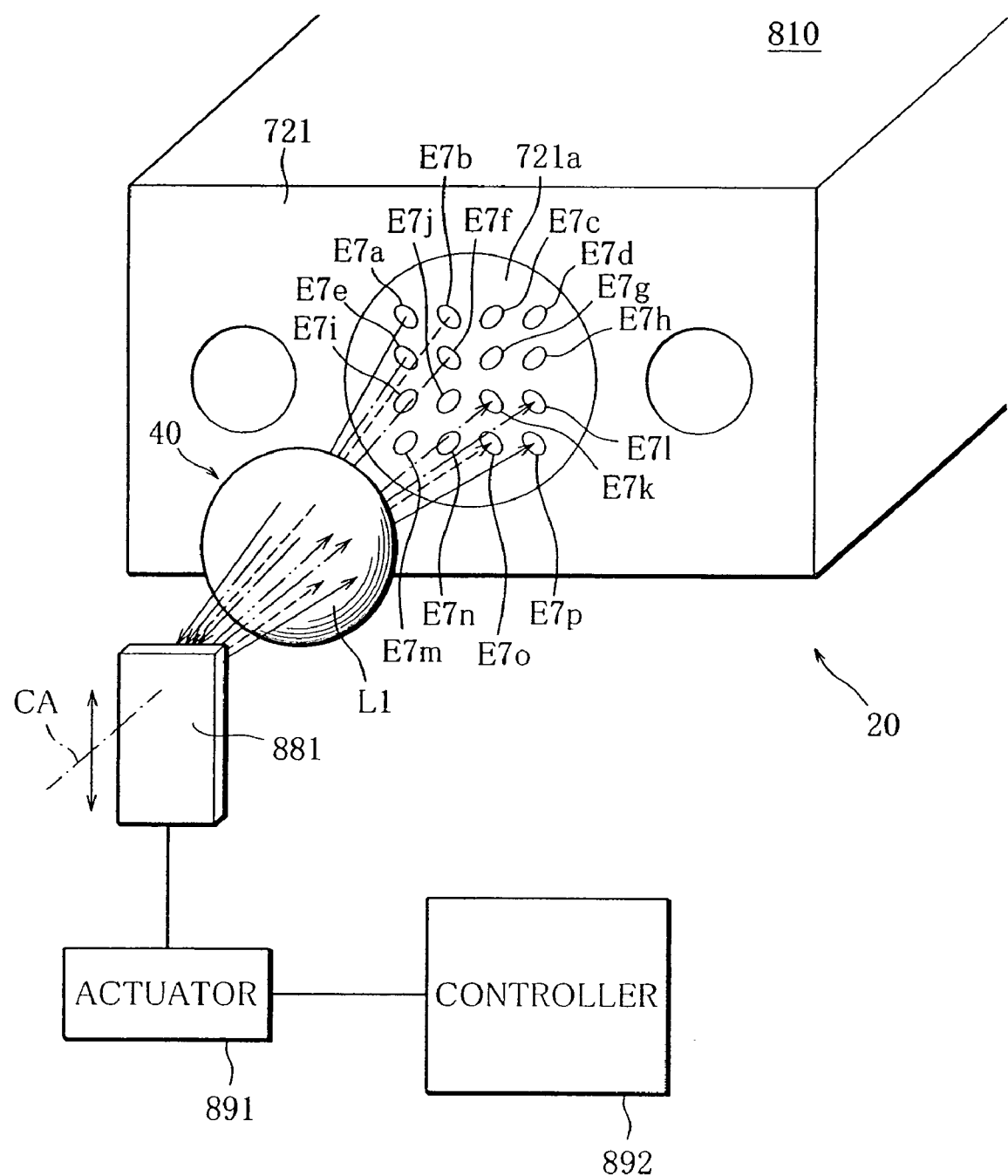
FIG. 29 is a fragmentary perspective view showing an optical module according to a ninth embodiment of the present invention.

In this optical module, a mirror 881 is vertically movable as shown in FIG. 29. The optical module comprises an actuator 891 for vertically moving the mirror 881, and a controller for controlling the drive of the actuator 891. The actuator may be constituted by a stepping motor, piezo element, MEMS, or the like, which is adapted to vertically move the mirror 881 at a desired timing for a desired amount.

Figure 30:
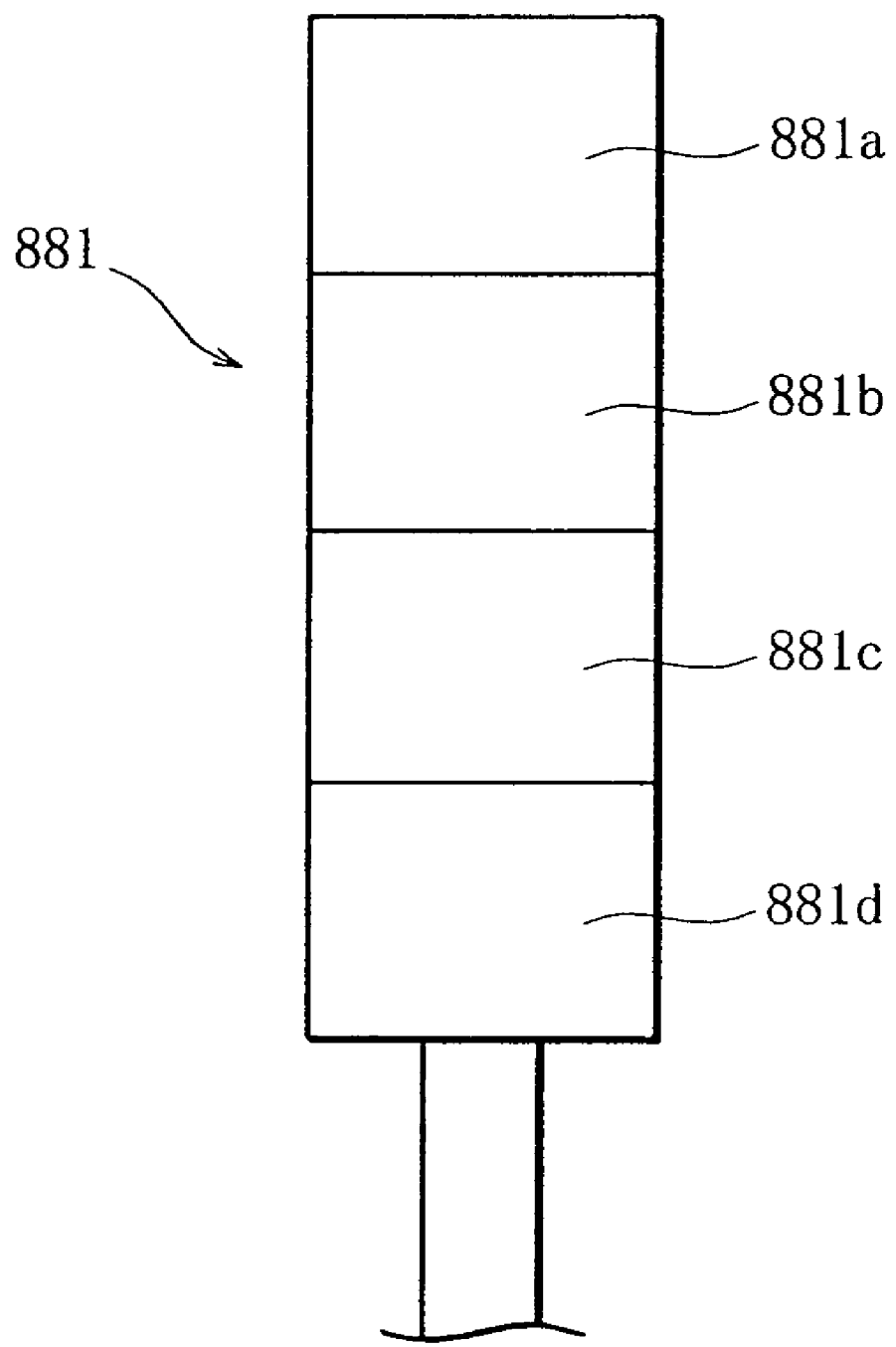
FIG. 30 is a fragmentary view for explaining the construction of a mirror shown in FIG. 29.

With reference to FIG. 30, the construction of the mirror 881 will be explained. There are minute inclination differences between four reflection faces 881a-881d, so as to change, in four steps, an angle of reflection for signal light beams from the fiber end faces E7a, E7b, E7e and E7f shown in FIG. 29. For instance, by placing the reflection face 881a on the center axis CA shown in FIG. 29, it is possible to cause signal light beams from the fiber end faces E7a, E7b, E7e and E7f to enter the fiber end faces E7p, E7o, E71 and E7k, respectively, as usual. By placing the reflection face 881b on the center axis CA, signal light beams from the fiber end faces E7a, E7b, E7e and E7f can be caused to enter the fiber end faces E7h, E7g, E7d and E7c, respectively. Furthermore, by placing the reflection face 881c on the center axis CA, signal light beams from the fiber end faces E7a, E7b, E7e and E7f can be caused to enter the fiber end faces E7n, E7m, E7j and E7i, respectively. By placing the reflection face 881d on the center axis CA, signal light beams from the fiber end faces E7a, E7b, E7e and E7f can be caused to enter the fiber end faces E7f, E7e, E7b and E7a, respectively.

It is possible to control the position of the mirror 891 by supplying the actuator 891 with an appropriate control signal from the controller 892, whereby signal light beams from a first group of fiber end faces E7a, E7b, E7e and E7f selectively enter the first group of fiber end faces E7f, E7e, E7b and E7a; a second group of fiber end faces E7p, E7o, E71, and E7k; a third group of fiber end faces E7h, E7g, E7d and E7c; or a fourth group of fiber end faces E7n, E7m, E7j and E7i.

The four fiber end faces constituting each fiber end face group can be positioned at apexes of a square by appropriately determining the radii of the first, second and third circumferences on which the inner end faces E7f, E7g, E7j and E7k, the intermediate end faces E7b, E7c, E7e, E7h, E7i, E7l, E7n and E7o, and the outer end faces E7a, E7d, E7m and E7p are arranged, respectively. This makes it possible to realize low-loss optical coupling between corresponding ones of fiber end faces that constitute paired groups irrespective of the position of the mirror 881.

As understood from the explanations of the first to ninth embodiments, a multi-core optical collimator of this invention, having a fiber unit in which fiber end faces are arranged on at least one imaginary circumference placed perpendicular to a predetermined direction, is improved in symmetry of fiber arrangement to thereby permit collimated light beams to have characteristics close to one another. Thus, an optical module constituted by two such multi-core optical collimators is enabled to accurately operate, with reduced loss, to realize functions such as optical branching function or optical multiplexing function.

Preferably, the at least one circumference has its central axis coincide with an optical axis of a collimator lens. This preferred construction permits the fiber end faces to be arranged symmetric with respect to the optical axis of the collimator lens, so that light beams emitted from the end faces of optical fibers and collimated by the collimator lens are equalized in their optical characteristics, improving operational characteristics of a multi-core collimator and of an optical module constituted by such collimators.

Preferably, the fiber unit holds end portions of pairs of optical fibers in parallel to the above-mentioned predetermined direction and fixedly arranges end faces of the pairs of optical fibers on the at least one circumference. This preferred construction makes it possible to provide a high density, high performance optical module capable of simultaneously processing multi-channel optical signals.

Preferably, the end faces of pared optical fibers are disposed symmetric with respect to the center of the at least one circumference. With this preferred construction, an optical module having various functions such as optical branching function or optical multiplexing function can be provided by symmetrically arranging paired multi-core optical collimators of the same structure with respect to their joining faces.

Preferably, the fiber unit holds end portions of pairs of optical fibers in parallel to the predetermined direction, and fixedly arranges end faces of at least one first optical fiber pair, constituted by part of the pairs of optical fibers, on a first imaginary circumference and end faces of at least one second optical fiber pair, constituted by the remaining of the pairs of optical fibers, on a second imaginary circumference which is coaxial with and large in radius than the first imaginary circumference. This preferred arrangement makes it possible to easily increase the density or the number of channels of optical fibers.

More preferably, the end faces of optical fibers constituting the first optical fiber pair are arranged symmetrical to each other about the center of the first imaginary circumference, and the end faces of optical fibers constituting the second optical fiber pair are arranged symmetrical about the center of the second imaginary circumference. This preferred arrangement can provide an optical module having various functions such as optical branching function or optical multiplexing function.

Preferably, the first imaginary circumference is arranged such that its center axis coincides with the optical axis of the collimator lens, and the second imaginary circumference is arranged to be closer to the collimator lens than the first circumference. This makes it possible to correct image formation characteristics of the collimator lens and to improve operation characteristics of the optical module.

Preferably, the end faces of the optical fibers are formed into slanted faces extending at a predetermined inclination angle with respect to the center axis of the imaginary circumference. By appropriately determining the predetermined inclination angle, return light beams are prevented from occurring at the end faces of the optical fibers. More preferably, the predetermined inclination angle is larger than half the critical total reflection angle of light beams propagating through the optical fibers.

Preferably, an inner end face of the fiber unit, on which the end faces of the optical fibers are arranged, is formed into a concave shape, a conical shape, a V-shape in cross section, or a stepped groove shape in cross section. This makes it possible to prevent return light beams from occurring at the end faces of the optical fibers and correct image formation characteristics of the collimator lens.

The concave or conical shaped inner end face of the fiber unit usually constitutes an abutting face of the fiber unit. The fiber end faces exposed to the concave or conical abutting face of the fiber unit can be formed simultaneously, by grinding and polishing an appropriate portion of the abutting face by means of a polishing member having a spherical or conical shaped tip adapted to be depressed onto the abutting face portion. As for the abutting face of the fiber unit which is a V-shape or a stepped groove shape in cross section, such an abutting face can be formed by grinding and polishing an appropriate portion of the abutting face by means of a disk-shaped polishing board adapted to be depressed onto the abutting face portion. For formation of the abutting face having a V-shape cross section, a polishing member is used which is comprised of a pair of polishing faces obliquely extending so as to be symmetric to each other about a thickwise center axis of the polishing member. A machining apparatus used for the formation of abutting face comprises a stage for supporting the fiber unit, which stage is preferably adapted to move the fiber unit in a direction parallel to the optical fiber fixed to the fiber unit. For the fiber unit formed with guide holes for alignment, a polishing head of the machining apparatus for driving a polishing member or a polishing board is preferably provided with guide pins adapted to be fitted to the guide holes, so as to improve machining accuracy with ease.

An optical module of this invention may comprise first and second multi-core optical collimators having the aforementioned construction, and guide means for aligning and holding the first and second multi-core optical collimators in such a manner that the center axes of imaginary circumferences respectively associated with the first and second multi-core optical collimators are coincident with each other. Preferably, collimator lenses for the first and second multi-core optical collimators have the same focal distance and are separated at a distance which is two times as long as the focal distance, whereby the first and second multi-core optical collimators having the same construction can be connected together efficiently.

Preferably, the optical module further comprises a flat plate like optical element which is detachably mounted between the first and second multi-core optical collimators. The optical element may be constituted by a mirror, extinguish filter, band pass filter or the like.

In the following, an optical module according to a tenth embodiment of this invention will be explained.

Figure 31A:
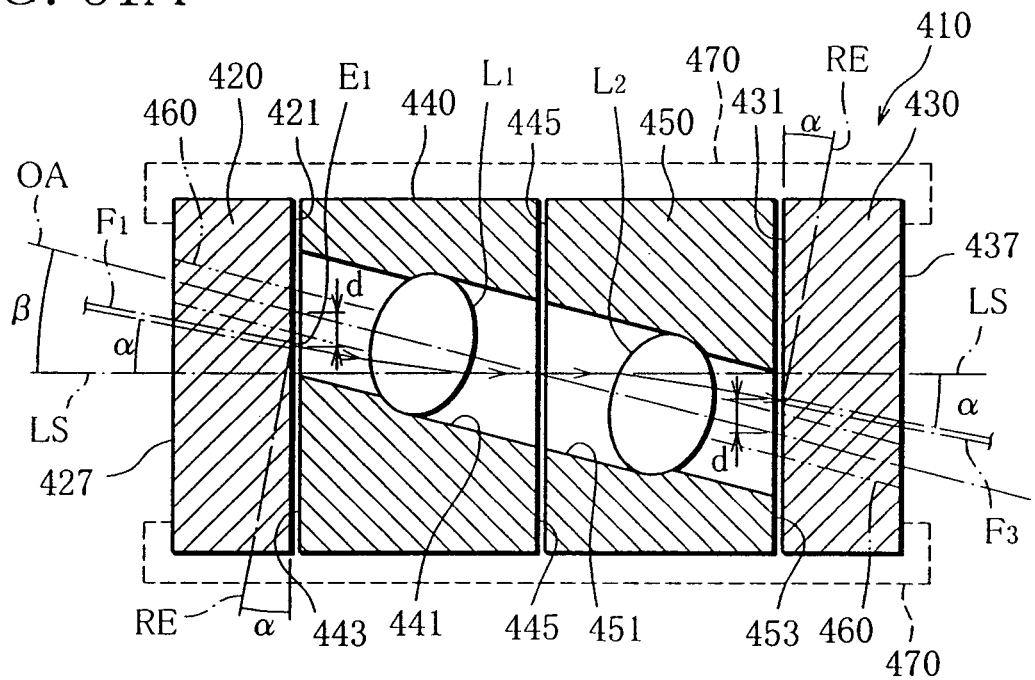
FIG. 31A is a longitudinal vertical section view showing an optical module according to a tenth embodiment of the present invention.
Figure 31B:
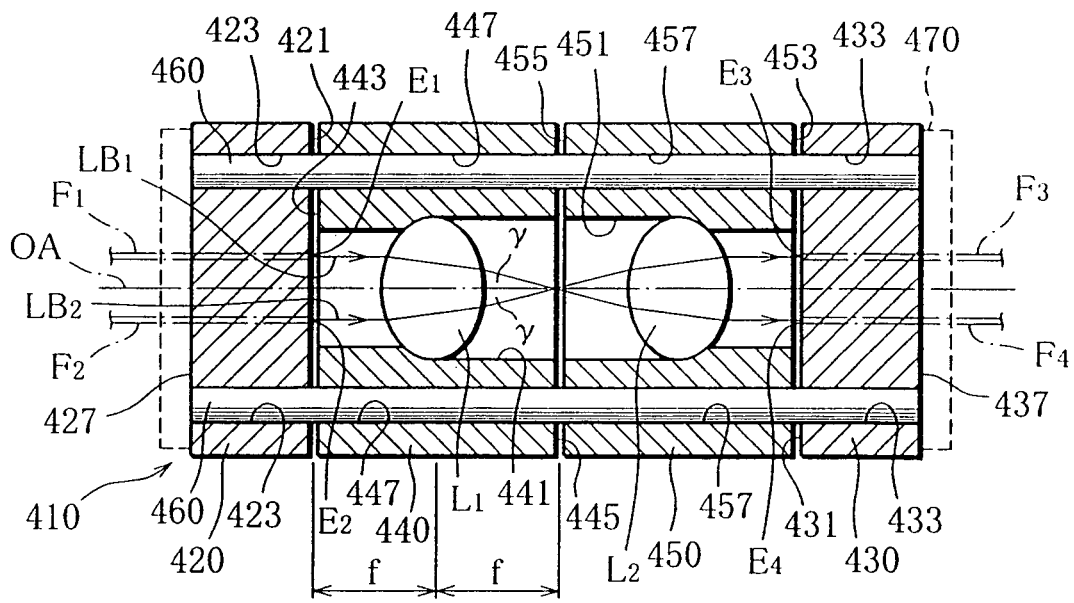
FIG. 31B is a longitudinal horizontal section view of the optical module shown in FIG. 31A.

As shown in FIGS. 31A and 31B, this optical module 410 comprises a first fiber unit 420 for fixedly arranging a pair of optical fibers F1, F2 in parallel to each other in a first arrangement plane obliquely extending through the optical module; a second fiber unit 430 for fixedly arranging a pair of optical fibers F3, F4 in parallel to each other in a second arrangement plane obliquely extending through the optical module; a first collimator unit 440 having a lens L1 for collimating outgoing light beams from the optical fibers F1, F2; and a second collimator unit 450 having a lens L2 for collimating outgoing light beams from the optical fibers F3, F4; a pair of guide pins 460 for positioning the units 420, 430, 440 and 450 to one another; and clips 470 serving as urging means for fixedly holding these units 420, 430, 440 and 450. The first and second collimator units 440, 450 constitute a lens unit, and the guide pins 460 and the clips 470 constitute coupling means. The units 420, 430, 440 and 450 are die-molded from engineering plastic resin materials such as thermoplastic resin (e.g., PPS (polyphenylene sulfide)) or thermoplastic resin mixed with filler, or from thermosetting resin (e.g., epoxy-base resin or the like).

The first fiber unit 420 has a first abutting face 421 utilized for positioning ends E1, E2 of the optical fibers F1, F2 with respect to the lens L1 of the first collimator unit 440. The paired optical fibers F1, F2 adhesively fixed in the first fiber unit 420 obliquely extend at an angle α with respect to a longitudinal transverse section LS of the optical module which extends perpendicular to and transversely along the first abutting face 421. In other words, the abutting face 421 obliquely extends at an angle α with respect to a reference plane RE perpendicular to the optical fibers F1, F2. By providing such an inclination, fresnel reflection of propagating light beams at the fiber ends E1, E2 is prevented, whereby the propagating light beams are prevented from returning back to a light source. Such return light beams can deteriorate the light source and increase insertion loss. For a case where the optical fibers F1, F2 have their refractive index of 1.4-1.5 with the core refractive index 0.2-0.3% larger than that index, the critical total reflection angle is 4-5 degrees, and hence the inclination angle α of the fiber ends E1, E2 may be set at 8 degrees, for instance, thereby preventing the light beams from returning back to the light source.

The optical fibers F1, F2 are offset downward with respect to the optical axis of the first and second collimator units 440, 450 along a vertical center section of the first fiber unit 420. Such an offset fiber arrangement permits a light beam to propagate in the direction parallel to the transverse section LS between the lenses L1, L2 provided in the first and second collimator units 440, 450.

The first fiber unit 420 is formed with a pair of guide holes 423 through which a pair of guide pins 460 pass and which are circular in cross section and have their diameter substantially equal to that of the guide pins 460.

The second fiber unit 430 has the same construction as the first fiber unit 420. That is, paired optical fibers F3, F4 adhesively fixed in the second fiber unit 430 obliquely extend at an angle α with respect to the transverse section LS, and an abutting face 431 obliquely extends at an angle a with respect to the reference plane RE perpendicular to the optical fibers F3, F4. The second fiber unit 430 is formed with a pair of guide holes 433 permitting a pair of guide pins 460 to pass therethrough and having the diameter equal to that of the guide pins.

The first collimator unit 440 is formed with a lens hole in which the lens L1 is received and fixed. The Lens L1 is fixed by adhesive, for instance, at the center of the lens hole 441. That is, the lens L1 is fixed at a position away from opposite end faces 443, 445 of the first collimator unit 440 by the focal distance f. The optical axis OA of the lens L1 obliquely extends at an angle β with respect to the transverse section LS extending perpendicular to and transversely along the end faces 443, 445. The angle β is set to be equal to an angle at which central outgoing light beams are emitted from the optical fibers F1, F2, so that these light beams are permitted to be incident on the optical axis OA through the lens L1.

The second collimator unit 450 is the same in construction as the first collimator unit 440. Thus, the lens L2 is received in and fixed to the center of the lens hole 451, with the optical axis OA of the lens L2 obliquely extending at an angle β with respect to the transverse section LS.

The guide pins 460 are each inserted into the guide hole 423 formed in the first fiber unit 420, the guide hole 447 formed in the first collimator unit 440, the guide hole 457 formed in the second collimator unit 450, and the guide hole 433 formed in the second fiber unit 430 in this order, to be fitted to these guide holes 423, 447, 457 and 433 which extend in parallel to the optical axis OA and at an angle β with respect to the transverse section LS. The collimator units 440, 450 are arranged such that optical axis sections (refer to FIG. 31A) of the collimator units are coincident with each other, these optical axis sections including the optical axis OA and extending perpendicular to end faces 443, 445, 453 and 455 of the collimator units. The first fiber unit 420 is positioned such that its vertical center section is coincident with the optical axis sections of the collimator units 440, 450. The vertical center section of the first fiber unit 420 extends in parallel to the center axes of the optical fibers F1, F2 and perpendicular to the abutting face 421 between the center axes of the optical fibers F1, F2. The second fiber unit 430 is positioned such that its vertical center section is coincident with the optical axis sections of the collimator units 440, 450.

Although a detailed explanation will be omitted, the clips 470 each comprises a plate member adapted to abut against upper or lower faces of the units 420, 430, 440 and 450, and a plate spring adapted to be engaged with outer end faces

427, 430 of the first and second fiber units 420, 430. The units 420, 430, 440 and 450 aligned by means of the guide pins 460 inserted thereinto are fixed by the clips 470 that hold these units.

Figure 32:
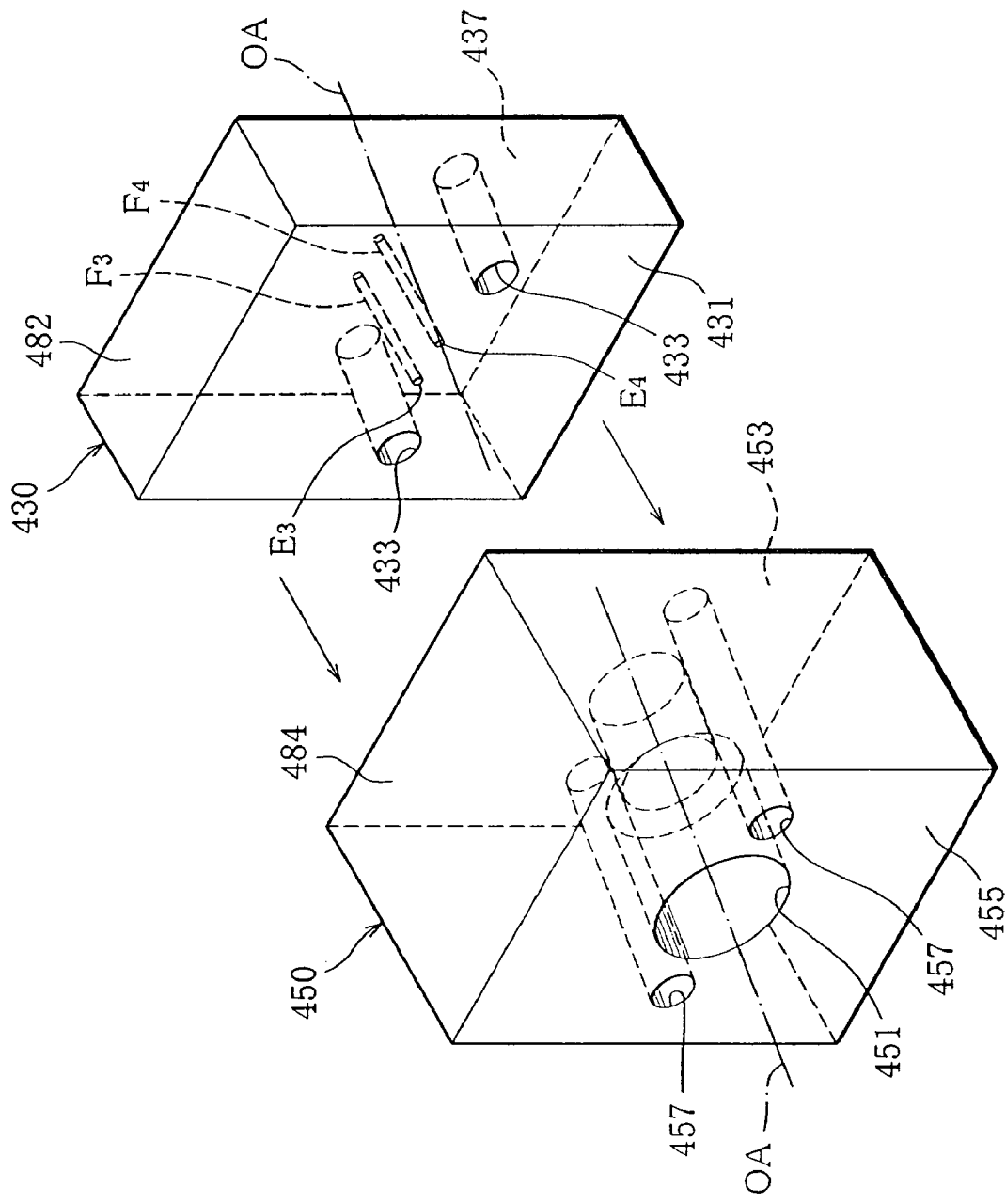
FIG. 32 is an exploded perspective view showing part of the optical module shown in FIGS. 31A and 31B.

As shown in FIG. 32, the holder 482 constituting the second fiber unit 430 is comprised of a flat plate member. As for the second fiber unit 430, fiber ends E3, E4 must be polished after the optical fibers F3, F4 are fixed by adhesive to the holder 482. Since the holder 482 has its abutting face 431 and outer end face 437 which are parallel to each other, the machining accuracy can be improved as compared to a case where the abutting face 431 is not in parallel to the outer end face 437 so that the fiber ends must be polished obliquely. In addition, machining time can be shortened and machining members are less consumed, resulting in reduced machining costs.

A holder 484 constituting the second collimator unit 450 is comprised of a flat plate member, and has end faces 453, 455 thereof extending in parallel to each other. Accordingly, the holder is advantageous in that the machining accuracy and the like are improved.

In the following, an example of operation of the optical module 410 shown in FIGS. 31A and 31B will be explained.

Laser beam LB1 is emitted from the end E1 of the optical fiber F1 while diverging, and is collimated by the lens L1 so as to pass through the boundary between the first and second collimator units 440, 450 at an angle $\gamma$ with respect to a vertical line of the end faces 445, 455 of the collimator units. The laser light beam propagates straight to enter the second lens L2 where it is focused to enter the end E4 of the fourth optical fiber F4.

Laser beam LB2 emitted from the end E2 of the optical fiber F2 while diverging is collimated by the lens L1 and passes through the boundary between the collimator units 440, 450 at an angle $\gamma$ with respect to the vertical line of the collimator unit end faces 445, 455. The laser light beam propagates straight to enter the second lens L2, and is focused by the second lens to enter the end E3 of the third optical fiber F3.

In short, according to the optical module 410, contactless optical coupling can be achieved between the first and second fiber units 420, 430 serving as a pair of multi-core fiber housings.

In the following, an explanation will be given as to how the optical module 410 shown in FIGS. 31A and 31B is assembled.

The first fiber unit 420, first collimator unit 440, second collimator unit 450 and second fiber unit 430 are juxtaposed in this order. Next, the guide pins 460 are inserted into the guide holes 423, 447, 457 and 433 formed in the units 420, 430, 440 and 450, whereby these units are positioned and coupled together. Then, a pair of clips 470 are attached to the coupled units 429, 430, 440 and 450, so as to sandwich these units therebetween from above and below and to exert urging forces for causing the first and second fiber units 420, 430 to move closer to each other. As a result, the units 420, 430, 440 and 450 are disposed in close contact with one another, completing the alignment and coupling of these units. Since the end faces 427, 437 of the fiber units 420, 430 are parallel to each other and since the abutting faces 421, 431 of these units and the end faces 443, 445, 453 and 455 of the collimator units 440, 450 are in parallel to the fiber unit end faces 427, 437, only vertical urging forces can be applied to the end faces 443, 445, 453 and 455. This makes it possible to easily prevent a positional deviation of the units 420, 430, 440 and 450 from occurring upon assembly of the optical module 410, whereby insertion loss caused by the coupled units can be reduced. In addition, a stable coupling can be achieved with the above-mentioned construction, making it possible to decrease variations in optical characteristics which would otherwise be caused by contraction and expansion of the units 420, 430, 440 and 450 due to environmental changes such as temperature change.

In a case where any one of the abutting faces 421, 431 of the fiber units and the end faces 443, 445, 453, 455 is not in parallel to the end faces of the fiber units, a positional deviation in the lateral direction, i.e., a deviation in optical propagation path, is caused due to clearances between the guide pins 460 and the guide holes 423, 447, 457, 433, resulting in unstable optical characteristics of the optical module 410.

It is important that the optical fibers F1, F2 fixed in the first fiber unit 420 are offset downward with respect to the optical axis OA, whereas the optical fibers F3, F4 fixed in the second fiber unit 430 are offset upward with respect to the optical axis OA. In an arrangement where no such offset is provided, when the abutting faces 421, 431 of the first and second collimator units 440, 450 are slanted in the same direction with respect to the reference plane RE and disposed in parallel to each other, it is impossible to efficiently couple light beams from the optical fibers F1, F2 to the optical fibers F3, F4 due to refraction at the fiber ends E1, E2. In an arrangement having no offset, if the abutting faces 421, 431 of the collimator units 440, 450 are slanted in opposite directions with respect to the reference plane RE and are not in parallel with each other, then urging forces to cause the collimator units 440, 450 to move closer to each other are applied obliquely to the abutting faces 421, 431 that are slanted in opposite directions. As a result, the units 420, 430, 440 and 450 are deviated in the direction perpendicular to the optical axis OA by an amount corresponding to clearances between the guide pins 460 and the guide holes 423, 447, 457 and 433, whereby a coupling state of optical propagation paths can be worsened, causing increased insertion loss.

Figure 33A:
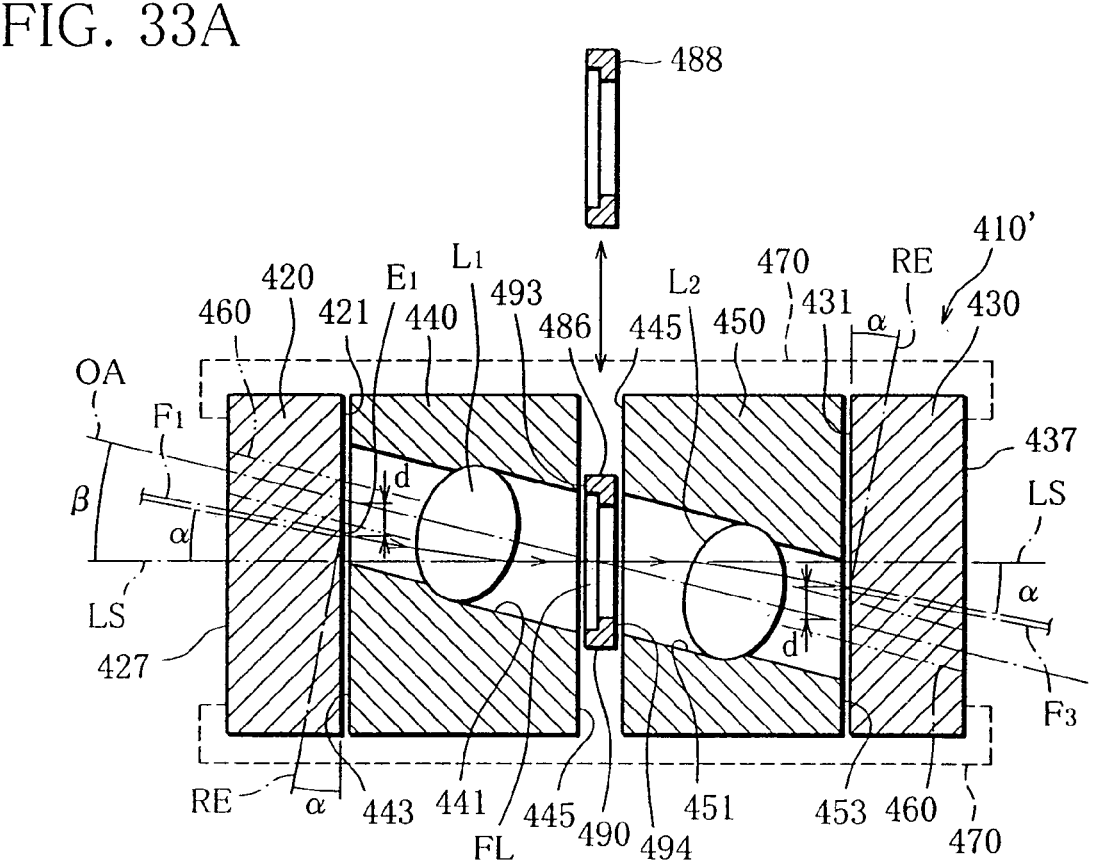
FIG. 33A is a longitudinal vertical section view of an optical module according to an eleventh embodiment of the present invention.
Figure 33B:
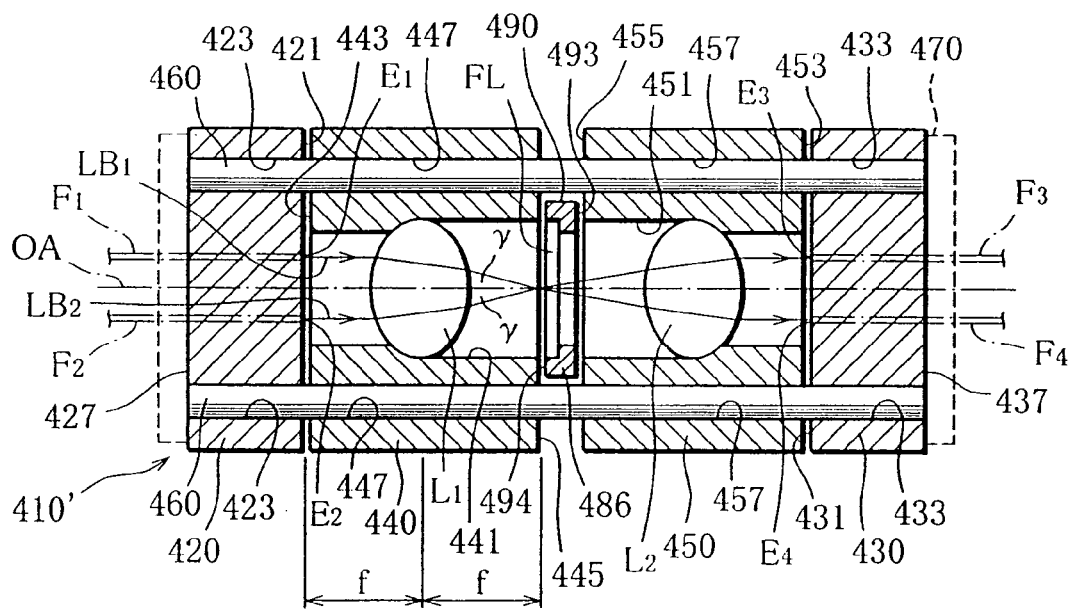
FIG. 33B is a longitudinal horizontal section view of the optical module shown in FIG. 33A.

With reference to FIGS. 33A and 33B, an optical module according to an eleventh embodiment of the present invention will be explained. The optical module 410' of the eleventh embodiment is obtainable by partly modifying the optical module 410 of the tenth embodiment, and therefore a duplicative explanation will be omitted, with like part denoted by like numerals.

The optical module 410' comprises a filter unit 490 disposed between first and second collimator units 440, 450, which includes an ND filter FL serving as a flat plate like optical element, and a holder 486 for holding the ND filter FL. Since the filter unit 490 is provided, the thickness of the second collimator unit 450 is made smaller by the thickness of the holder 486. The filter unit 490 may be replaced by a blank unit 488 having no ND filter FL, whereby the distance between the collimator units 440, 450 is kept unchanged, even if no filter unit 490 is inserted between these collimator units.

In the following, an operation of the optical module 410' will be explained.

Laser light beam LB1 is emitted, with divergency, from the end E1 of the optical fiber F1, which is collimated by the first lens L1 to enter the ND filter FL provided in the filter unit 490. The laser light beam is extinguished by the filter to an extent that it hardly passes therethrough. Laser light beam LB2 is emitted from the end E2 of the optical fiber F2, while diverging, and is collimated by the first lens L1 to enter the ND filter FL of the filter unit 490, to be extinguished by the filter so as to be prevented from passing therethrough. On the other hand, when the blank unit 488 is disposed instead of the filter unit 490, laser light beam LB1 from the optical fiber F1 is collimated by the first lens L1, passes through the blank unit 488, and is collimated by the second lens L2 to enter the third optical fiber F3. Laser light beam LB2 from the optical fiber F2 is collimated by the second lens L2 to enter the fourth optical fiber F4. In this manner, by selectively using either the filter unit 490 or the blank unit 488, the module 410' is enabled to have a switch function.

In the optical module 410', the outer end faces 427, 437 and abutting faces 421, 431 of the fiber units and the end faces 443, 445, 453, 455 of the collimator units are parallel to one another, and further the opposite end faces of the filter unit 490 are parallel to each other, so that only vertical urging forces can be applied to them. As a result, upon assemblage of the optical module 410', positional deviations between the units 420, 430, 440, 450, 488 and 490 can be prevented, thereby reducing insertion loss which would otherwise be caused by the coupled units.

The optical modules according to the tenth and eleventh embodiments can be modified variously.

For instance, the filter unit 490 may be adapted to hold a band pass filter instead of the ND filter FL. If the band pass filter is configured to reflect a light beam of wavelength $\lambda 1$ and permit a light beam of wavelength $\lambda 2$ to pass therethrough, then a laser light beam of wavelength $\lambda 1$ transmitting through the optical fiber F1 and a laser light beam of wavelength $\lambda 2$ transmitting through the optical fiber F3 can be multiplexed, so that they are transmitted toward the optical fiber F1. Laser light beams of wavelengths $\lambda 1$ and $\lambda 2$ transmitting through the optical fiber F1 can be branched, so that the laser light beam of wavelength $\lambda 2$ is transmitted toward the optical fiber F4, whereas the laser light beam of wavelength $\lambda 1$ is transmitted toward the optical fiber F2.

Alternatively, the filter unit 490 may be configured to have a mirror instead of the ND filter FL.

As apparent from the explanations on the tenth and eleventh embodiments, the optical module according to this invention can contactlessly achieve optical connection between first optical fibers held by the first fiber unit and second optical fibers held by the second fiber unit. Furthermore, the optical module having first and second fiber units provided with abutting faces that are slanted at a predetermined angle with respect to first and second reference plane perpendicular to the first and second optical fibers makes it possible to prevent a light source from being deteriorated by return light at end faces of the optical fibers and to prevent increased insertion loss. Since the opposite end faces of the lens unit are parallel to each other, only vertical urging forces can be applied to the outer end faces of the first and second fiber units and the opposite end faces of the lens unit which is disposed between the fiber units, making it possible to prevent increased insertion loss that is caused by positional deviations between the units. Since an optical axis section of the lens unit and center sections of the first and second center sections are coincident to one another, the ends of the first and second fiber units can be positioned at conjugate positions with respect to lenses of the lens unit, making it possible to achieve efficient optical coupling between optical fibers.

Preferably, the lens unit comprises a first collimator unit for collimating light beams from the optical fibers of the first fiber unit, and a second collimator unit for collimating light beams from the optical fibers of the second fiber unit. In this case, various processing can be applied to light beams collimated between the first and second fiber units after they are emitted from the ends of the optical fibers of the fiber units.

Preferably, a flat-plate like optical element is detachably inserted between the first and second collimator units. The optical element may be comprised of a mirror, an extinguish filter, a band pass filter, or the like.

Preferably, the fiber ends exposed to the abutting face of the first fiber unit are disposed offset from the optical axis of the lens unit by a predetermined distance in one direction along the abutting face, and the fiber ends exposed to the abutting face of the second fiber unit are disposed offset from the optical axis of the lens unit by a predetermined distance in the opposite direction along the abutting face. In this case, light beams collimated after being emitted from the fiber ends of the fiber units can enter the optical element at a desired angle between the first and second fiber units.

Preferably, light beams from the ends of the optical fibers of the first fiber unit propagate in the direction parallel to a longitudinal transverse section of the optical module and enter the optical element. In this case, the incident angle to and emission angle from the optical element can be adjusted solely by adjusting distances between the optical fibers of the first and second fiber units.

Preferably, the coupling means comprises guide pins adapted to be inserted through guide holes individually formed in the first fiber unit, the lens unit, and the second fiber unit, and urging means for applying depressing forces to the first and second fiber units from both ends, with the lens unit sandwiched between these fiber units. In this case, the fiber units and the lens unit can be fixedly coupled by means of a simplified construction.

Preferably, the coupling means applies substantially vertical depressing force to the abutting faces of the first and second fiber units. In this case, the fiber units and the lens unit are positively prevented from being deviated in the direction perpendicular to the abutting faces of the fiber unit and the opposite end faces of the lens unit.

Preferably, the inclination angle of the abutting fades of the first and second fiber units with respect to the optical fibers is larger than a critical total reflection angle of light beam to be propagated through the optical fibers. This makes it possible to positively reduce return light from the fiber ends.

In the following, an optical module according to a twelfth embodiment of the present invention will be explained.

Figure 34:
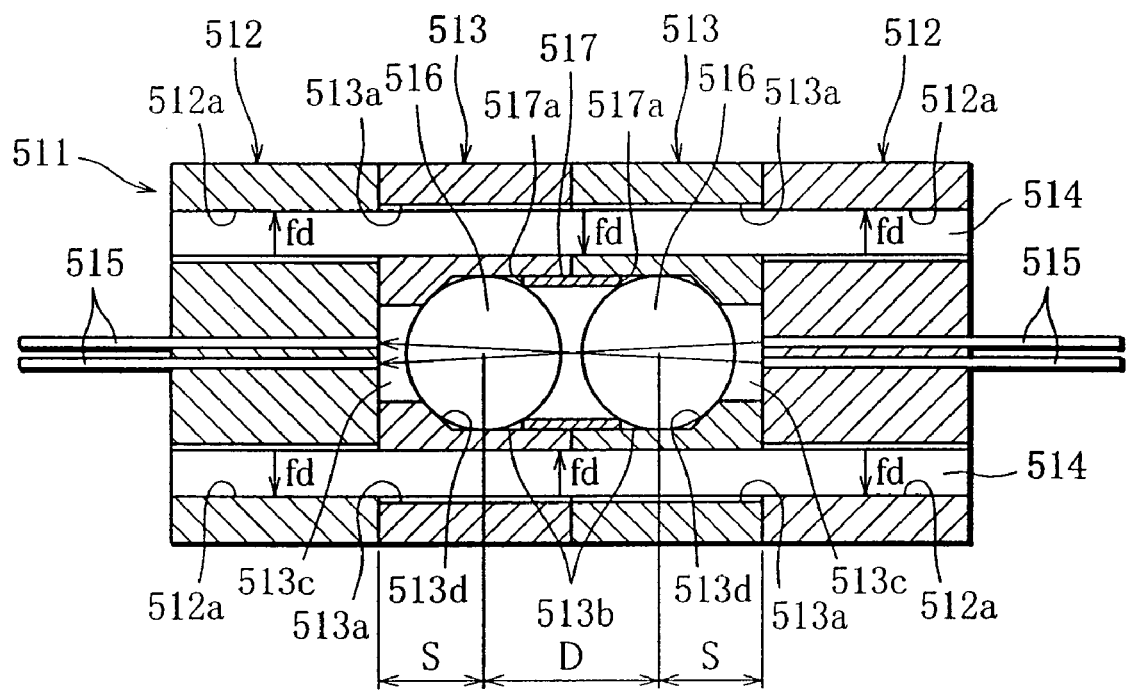
FIG. 34 is a section view showing an optical module according to a twelfth embodiment of the present invention.

As shown in FIG. 34, the optical module 511 of the twelfth embodiment comprises first and second units of the same construction each having an optical fiber housing 512 and a lens housing 513. These two units are positioned by first and second guide pins 514 and joined together, with these units disposed symmetric about their joining faces. Hereinafter, the optical fiber housings and the lens housings of the first and second units will be referred to as the first and second optical fiber housings and the first and second lens housings, respectively. Preferably, these housings 512, 513 are molded from plastic resin materials such as PPS (polyphenylene sulfide) or epoxy-base resin.

The first and second lens housings 513 are disposed between and joined to the first and second optical fiber housings 512, with the lens housings joined together at their inner end faces. The term "inner" indicates the side close to the optical module center (unit joining face) as viewed in the longitudinal direction of the optical module 511. A term "outer" used hereinbelow refers to the side remote from the optical module center.

Each lens housing 513 is formed at its peripheral edge portions with first and second guide pin holes 513a permitting the first and second guide pins 514 to pass therethrough and axially extending through the lens housing.

Each optical fiber housing 512 is formed at its peripheral portions with third and fourth guide pin holes 512a permitting the first and second guide pins 514 to pass therethrough and axially extending through the fiber housing. Distal end portions of optical fibers 515, which are, e.g., two in number, are inserted to and fixed in a central portion of each optical fiber housing 512, with distal end faces of these optical fibers flush with the inner end face of the optical fiber housing 512.

The first and second lens housings 513 accommodate therein first and second spherical lenses 516, respectively.

Basically, the optical module 511 is constructed in the above manner, so that it causes an outgoing light beam from the distal end face of an optical fiber 515 of one of the two units to enter the distal end face of an optical fiber 515 of another unit via the first and second lenses 516, thus achieving light propagation between the optical fibers 515.

The optical module 511 of the twelfth embodiment is featured in that the lenses 516 are accurately positioned and fixed to the lens housings 513 without using adhesive, thereby improving optical coupling characteristics.

More specifically, each lens housing 513 has a central part thereof formed with a lens hole 513b, which preferably has a circular cross section, an optical path hole 513 having the diameter smaller than that of the lens hole, and a taper hole 513d having the diameter smoothly decreasing from the lens hole 513b toward the optical path hole 513c, with the axes of these three holes coincide with one another. The lens hole 513b formed in the inner half of the lens housing 513 opens to the inner end face of the lens housing, whereas the optical path hole 513c formed in the outer half of the lens housing 513 opens to the outer end face of the lens housing and communicates with the lens hole 513b through the taper hole 513d.

The spherical lens 516 is positioned in the lens hole 513b so as not to be movable toward the optical path hole 513c, with a peripheral portion of the outer end face of the lens abutted against the peripheral face of the taper hole 513d, whereby the distance from the center of the spherical lens 516 to the inner end face of the optical fiber housing 512 (i.e., to the distal end faces of the optical fibers 515) is made equal to a predetermined focal distance S. In other words, the portion of the lens housing 513 which is formed with the taper hole 513d constitutes a first positioning member disposed between the optical fiber housing 512 and the lens 516, with its outer end and inner end (tapered face) abutted against the inner end face of the optical fiber housing 512 and the peripheral portion of the spherical outer end face of the lens 516, respectively, thereby positioning the lens 516 so as not to axially movable toward the optical fiber housing 512.

In the first and second lens holes 513b, a positioning member 517, which is preferably comprised of a hollow cylinder, is disposed between the first and second lenses 516. This positioning member 517 constitutes a second positioning member disposed between the lenses 516, with its opposite end faces abutted against peripheral portions of spherical inner end faces of the first and second lenses 516, thereby positioning these lenses 516 so as not to movable axially inward and making the lens-to-lens distance D to be equal to the predetermined value.

The diameter DLH of the lens hole 513 is determined to satisfy the following relationship in which DL denotes the diameter of the spherical lens 516.

$$DL-0.5(\mu m) \leq DLH \leq DL+0.5(\mu m)$$

The diameter DPH of the guide pin holes 512a, 513a is determined to satisfy the following relationship in which DP denotes the diameter of the guide pin 514.

$$DP-0.5(\mu m) \leq DPH \leq DP+0.5(\mu m)$$

It is not inevitably necessary to constitute the first positioning member by means of the taper hole 513d of the lens housing 513. A stepped portion may be formed in the lens housing 513. The stepped portion has an annular face thereof extending radially of the lens housing 513 between the outer end of the lens hole 513b and the inner end of the optical path hole 513c and having a width thereof equal to the difference between the diameter of the lens hole 513b and that of the optical path hole 513c. A peripheral portion of the outer end face of the lens 516 abuts against the annular face. Moreover, it is not inevitably necessary to constitute the first positioning member by means of the taper hole of the lens housing 513 or the just-mentioned annular face. The first positioning member may be constituted by a member fabricated separately from the lens housing 513.

Figure 35:
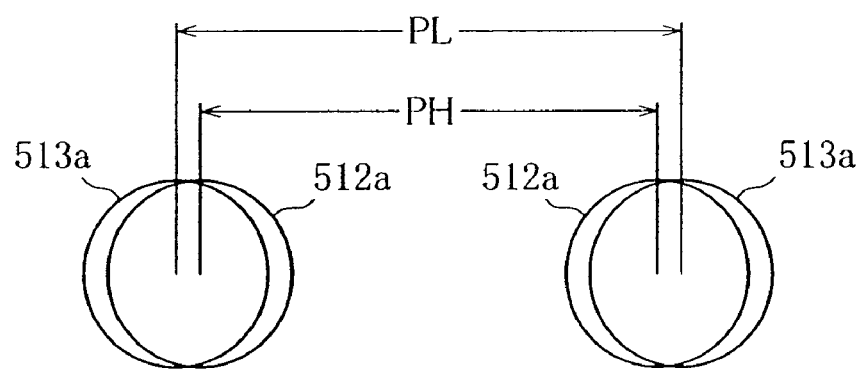
FIG. 35 is a view showing a positional relationship between a guide pin hole of the optical fiber housing and a guide pin hole of the lens housing shown in FIG. 34.
Figure 36:
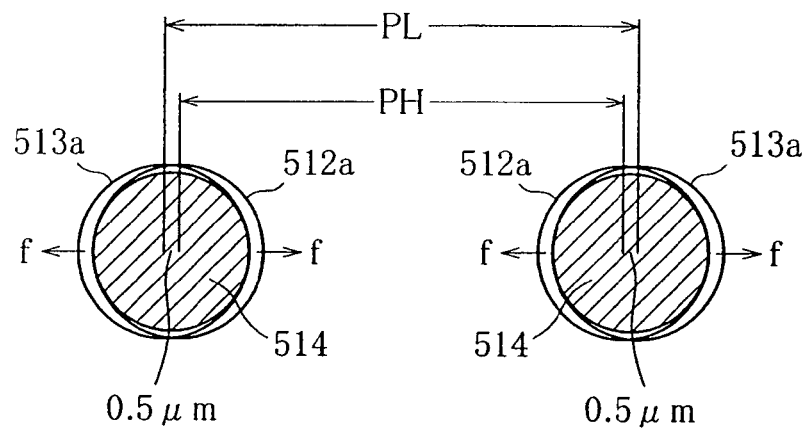
FIG. 36 is a view showing a guide pin in a state where it is inserted into the guide pin hole shown in FIG. 35.

As shown in FIGS. 34 and 35, a dimensional difference is provided between the axis-to-axis distance PL for the first and second guide pin holes 513a of the lens housing 513 and the axis-to-axis distance PH for the third and fourth guide pin holes 512a of the optical fiber housing 512. For instance, the distance PL is larger than the distance PH (PL>PH), and the dimensional difference (PL−PH) is determined within a range of 1 µm to 4 µm. By providing the dimensional difference between the guide pin-to-guide pin distance PH of the optical fiber housing 512 and the guide pin-to-guide pin distance PL of the fiber housing 513, it is possible to apply depressing restraint forces fd from the guide pins 514 to the peripheral faces of the guide pin holes 512a, 513a, thereby achieving highly accurate, stable positional relationships between the optical fibers 515 and the first and second spherical lenses 516 and between these spherical lenses 516. Contrary to the above, the pitch PH may be set to be larger than the pitch PL (PH>PL).

In a case where the inner diameter of the guide pin holes 512a, 513a is 0.5 µm larger than the outer diameter of the guide pins 514, for instance, the dimensional difference is equal to or larger than 1 µm, thus generating restraint forces. Since the optical fiber housing 512 and the lens housing 513 are molded from resin and elastically deformable, the restraint forces fd becomes larger with the increase in the dimensional difference, thereby reducing positioning variation. On the other hand, an excessively large dimensional difference may hinder easy insertion of the guide pins 514 in assemblage, and may cause damages to the guide pin holes 512a, 513a. Thus, the dimensional difference is preferably equal to or less than 4 µm. In this regard, the dimensional difference (PL−PH or PH−PL) is set to be within a range from 1 µm to 4 µm, inclusive.

The second positioning member 517 serves to set the center-to-center distance D between the first and second lenses 516 as mentioned previously, and is constituted by a hollow cylinder having opposite end faces 517a thereof formed into flat annular faces. The positioning member 517 has its outer diameter to permit the positioning member to be fittedly inserted into the lens hole 513b, and has its inner diameter slightly smaller than the outer diameter of the spherical lens 516, thus positioning the lenses, with its annular end faces 517a abutting against peripheral portions of the inner end faces of the first and second lenses 516. The length of the positioning member 517 is accurately determined such that the center-to-center distance between the first and second lenses 516 is equal to the predetermined distance D, with the opposite end faces 517a abutted against these lenses. The positioning member 517 formed by a hollow cylinder does not block the optical path between the two lenses 516.

In consideration of ambient properties, the positioning member 517 is formed by the same resin member as that for the lens housing 513. This achieves a stable coupling characteristic since no substantial difference in contraction is caused between the positioning member and the lens housing when the positioning member contracts with a change in ambient temperature. Hence, the positioning member does not apply undesired stress to the lens 516.

The following is an explanation of assembling procedure of the optical module 511.

As shown in FIG. 34, the first and second lenses 516 are inserted to the lens holes 513b formed in the first and second lens housings 513, and thereafter, the opposite end portions of the second positioning member 517 are inserted to the lens holes 513b, thus causing the opposite end faces 517a of the positioning member 517 to abut against peripheral portions of the inner end faces of the first and second lenses 516. Next, the first and second lens housings 513 are made abutted at their inner end faces, and their first and second guide pin holes 513a are aligned to each other. Subsequently, the inner end faces of the first and second optical fiber housings 512 are abutted against the outer end faces of the first and second lens housings 513, respectively, with the first and second guide pin holes 512a of the lens housings aligned with the third and fourth guide pin holes 512a of the optical fiber housings. Then, the first and second guide pins 514 are inserted into these guide pin holes 512a, 513a, thereby positioning the optical fiber housings 512 and the lens housings 513.

In this state, the respective outer end faces of the lenses 516 are abutted at their peripheral portions against the taper portions 513d (first positioning members) of the lens housings 513, and the respective inner end faces of the lenses are abutted at their peripheral portions against the annular end faces 517a of the second positioning member 517. As a consequence, the first and second lenses 516 are fixedly positioned in the lens holes 513b, whereby the center-to-center distance between the lenses 516 is accurately set to the predetermined distance D, and the distance between the centers of the lenses 516 and the distal end faces of the optical fibers 514 is accurately set to the predetermined focal distance S. In this manner, according to the optical module 511 of the twelfth embodiment, the lenses 516 can be accurately and easily positioned in the lens housings 513, without the need of using adhesive.

Since the dimensional difference is provided between the distance PL between the guide pin holes 513a of the lens housings 513 and the distance PH between the guide pin holes 512a of the optical fiber housings 512, depressing restraint forces are applied from the guide pins 514 to the peripheral faces of the guide pin holes 512a, 513a, exerting holding forces that are applied to the entire of the optical module 511. This makes it possible to achieve highly accurate, stable positional relationships between the optical fibers 515 and the first, second spherical lenses 516 and between these two lenses 516, thus preventing a positional deviation of the lenses 516. As a result, the constant lens-to-lens distance D is always kept maintained between the two lenses 516, with the focal distance S kept unchanged, whereby satisfactory optical coupling characteristics are attained with stability.

In the twelfth embodiment, the tapered holes 513d against which peripheral portions of the lenses 516 are abutted are provided as the first positioning members between the lens holes 513b and the optical path holes 513c smaller in diameter than the lens holes. Alternatively, two cylindrical positioning members of a predetermined length may be fittedly disposed between the optical fiber housings 512 and the lenses 516 in the lens holes 513b that are formed in the lens housings 513 to extend therethrough. In this case, the cylindrical positioning member serves to position the lens 516 and set the distance from the center of the lens 516 to the distal end face of the optical fiber housing 512 to the predetermined focal distance S, with its opposite ends abutted against the inner end face of the optical fiber housing 512 and a peripheral portion of the outer end face of the lens 516, respectively.

Figure 37:
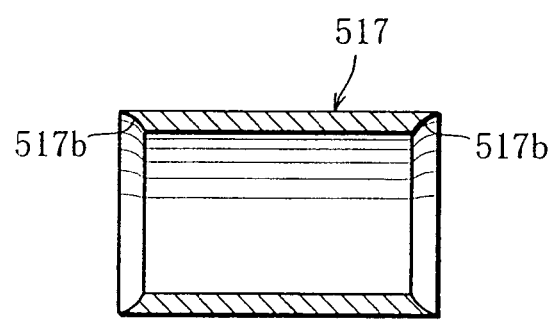
FIG. 37 is a section view showing a modification of a second positioning member shown in FIG. 34.

FIG. 37 shows a modification of the second positioning member which is different from the positioning member 517 of FIG. 34 having a flat annular end face 517b in that its opposite end faces are formed into a spherical face complementary to the spherical face of the lens 516. The positioning member having the spherical end faces 517a makes it possible to firmly position the first and second lenses 516, with its opposite end faces 517b appropriately abutted against peripheral portions of these lenses 516.

Figure 38:
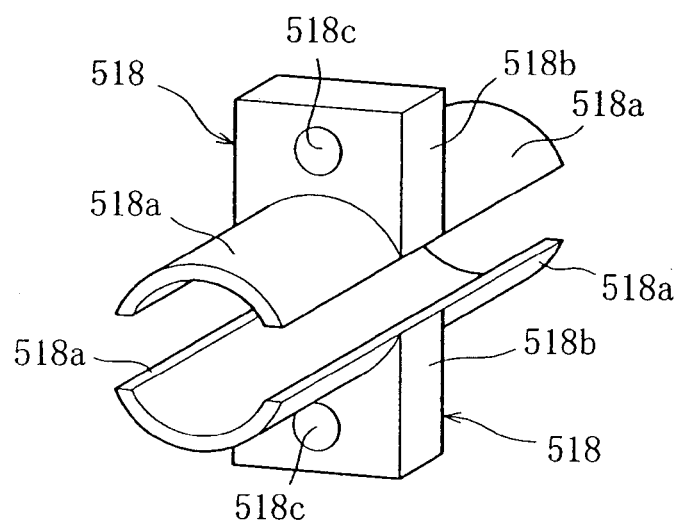
FIG. 38 is a perspective view showing another modification of the second positioning member.
Figure 39:
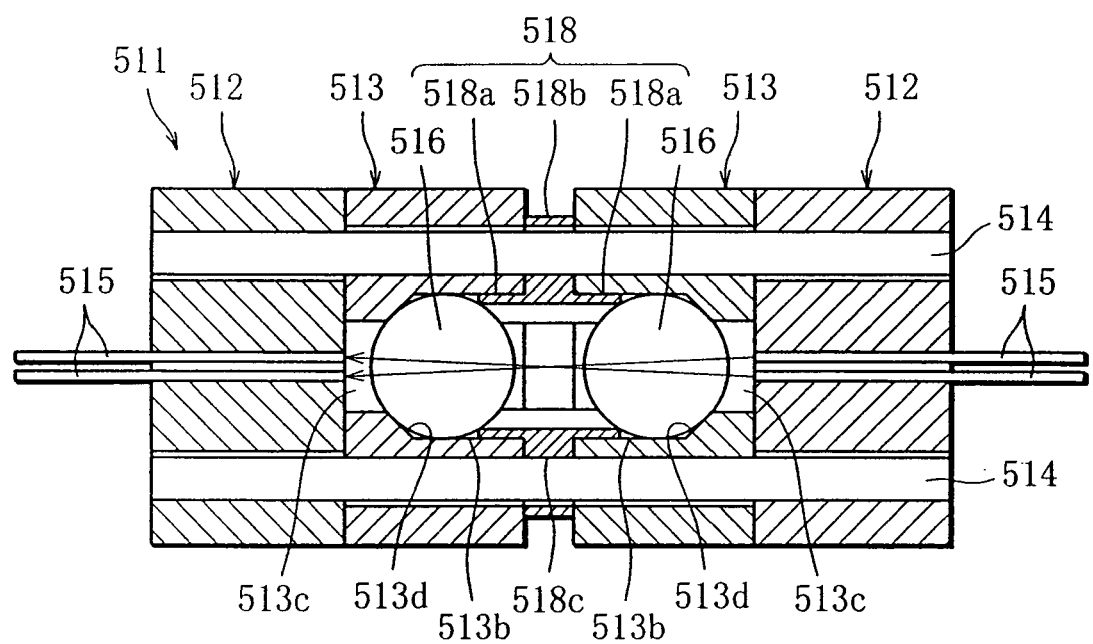
FIG. 39 is a section view of an optical module provided with the second positioning member shown in FIG. 38.

FIG. 38 shows another modification of the second positioning member, which comprises upper and lower positioning members 518. These positioning members 518 each comprises an engaging portion 518a which is arcuate in transverse cross section and which corresponds to an upper or lower peripheral portion of the cylindrical positioning member 517 shown in FIG. 34, and a flange 518b formed integrally with a longitudinal center of an outer peripheral face of the engaging portion 518a, with guide pin holes 518c formed in the flange 518b. As shown in FIG. 39, opposite end portions of the engaging portions 518a of the positioning members 518 are inserted into the lens holes 513b of the first and second lens housings 513 so that opposite end faces of the engaging portion 518a abut against peripheral portions of inner end faces of the first and second lenses 516, whereas the flanges 518 are held between the inner end faces of the first and second lens housings 513. In this state, the guide pins 514 are inserted into the guide pin holes 512a of the optical fiber housings 512, the guide pin holes 513a of the lens housings 513, and the guide pin holes 518c of the positioning members 518, thereby fixedly positioning the optical fiber housing 512, the lens housings 512 and the positioning members 518.

In the following, an optical module according to a thirteenth embodiment of this invention will be explained with reference to FIGS. 40 and 41.

The optical module of the thirteenth embodiment is featured in that it comprises holding means for applying axial forces to outer end faces of first and second optical fiber housings 512, so as to hold the fiber housings 512 and the lens housing 513 in a satisfactorily positioned state. In other respects, the optical module of the thirteenth embodiment is the same as the twelfth embodiment, and accordingly explanations on like parts, will be omitted.

Figure 40:
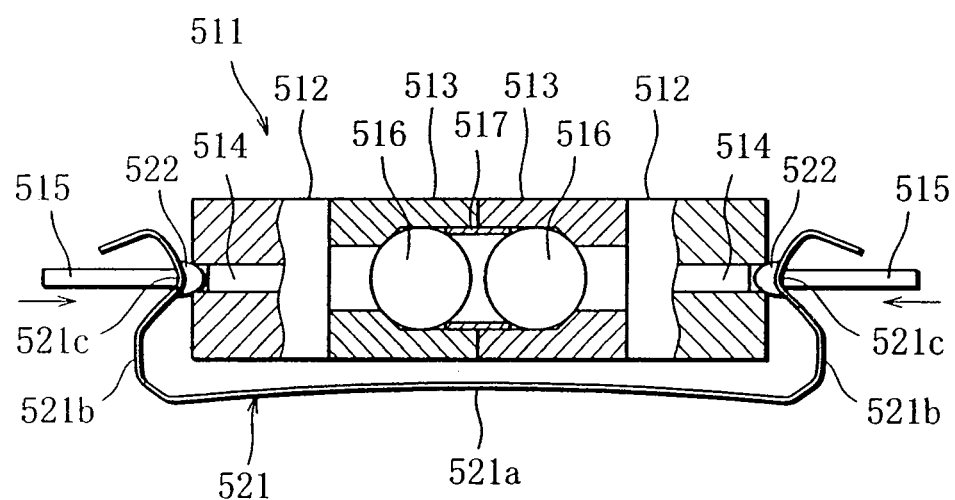
FIG. 40 is a view showing, partly in cross section, an optical module according to a thirteenth embodiment of the present invention.
Figure 41:
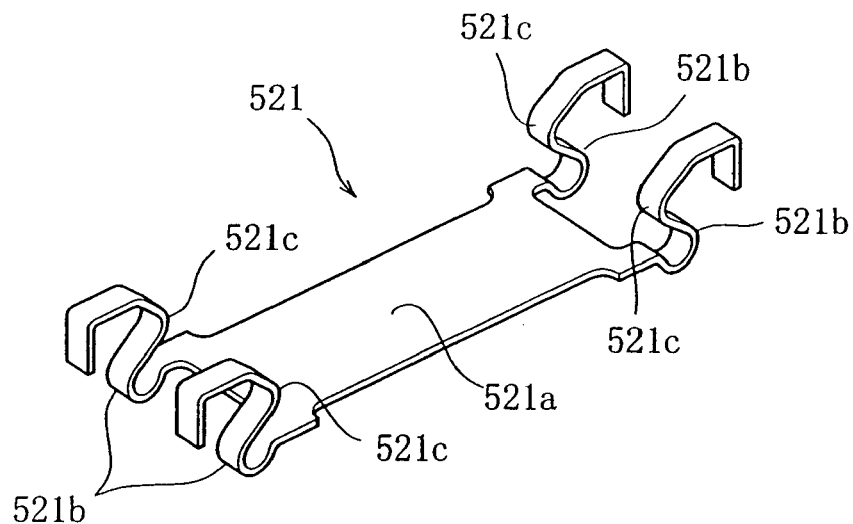
FIG. 41 is a perspective view of a clip shown in FIG. 40.

As shown in FIGS. 40 and 41, the optical modules 511 of the thirteenth embodiment comprises a clip 521 serving as holding means. The clip 521 is made of a metal such as beryllium copper or SUS, and comprises a clip body 521a which is substantially the same in length and width as those of an optical module body which is mainly constituted by the housings 512, 513 joined together, and four clip pieces 521b formed integrally with the clip body. Two clip pieces 521b extend upward from both side edge portions of one end of the clip body 521a in the form of an S-shape along the outer end face of the first optical fiber housing 512. The optical fibers 515 from the first optical fiber housing 512 extend to the outside, passing between these two clip pieces 512b. Similarly, two other clip pieces 512b extend from both side edge portions of another end of the clip body 521a along the outer end face of the second optical fiber housing 512, permitting the optical fibers 515 extending from the second optical fiber housing 512 to pass therethrough.

The clip piece 521b is formed at its intermediate portion with a bent portion 521c. At an inner face of the bent portion 521 (more generally, at an end portion of the clip 521), an emboss shaped elastic member 522 is provided as urging means, which is engaged with an open end of the guide pin hole 512a of the optical fiber housing 512. The elastic member 522 is made of a hard rubber member, for instance. Preferably, a slight recess is formed at the open end of the guide pin hole 512a.

As understood from the foregoing explanation, the elastic members 522 of the four clip pieces 521b are adapted to be engaged with the guide pin holes 512a of the first and second optical fiber housings 512, and accordingly, the guide pins 514 have their length slightly shorter than that of the optical module body.

In the following, an operation of the clip 521 serving as holding means will be explained.

As shown in FIG. 40, the clip pieces 521b of the clip 521 are expanded outward in the longitudinal direction so as to permit the optical module body to be placed therebetween. Then, the elastic members 522 are fitted to the open ends of the guide pin holes 512a, respectively, thereby holding the optical module body with spring forces. The depressing forces generated by the clip 521 and applied to the outer end faces of the first and second optical fiber housings 512 always exert axially inwardly, whereby a positioned state (joined state) of the optical fiber housings 512 and the lens housings 513 is satisfactorily maintained. As a consequence, it is possible to prevent positional deviations between optical module components and deviations of lens-to-lens distance D and focal distance S, which would otherwise be caused when impact is applied to the optical module, thus achieving further stable optical coupling characteristics.

As a result of experiments on depressing forces generated by the clip 521, it is proved that the depressing force less than 5 N can produce variations in lens-to-lens distance D and focal distance S, thus unstabilizing optical coupling characteristics. On the other hand, the depressing force greater than 20 N can cause plastic deformation of the lens housing 513 made of plastic resin, decreasing the lens-to-lens distance D and the focal distance S to values less than designed values and resulting in increased optical coupling loss. It is proved that a clip (more generally holding means) capable of generating a depressing force greater than 20 N is not easy to fabricate. In view of the above, the optical module 511 of the thirteenth embodiment is configured to apply a depressing force ranging from 5 N to 20 N to the optical module body, so as to attain a proper positioned state of the optical module components.

It is not inevitably necessary to provide the clip 512 with the emboss shaped elastic members 522. Alternatively, the bent portions 521c of the clip pieces 521b may be fitted to the open ends of the guide pin holes, so that these bent portions serve as urging means.

In the following, an optical module according to fourteenth embodiment of this invention will be explained with reference to FIGS. 42-44.

The optical module of the fourteenth embodiment is featured in that holding means is constituted by a package 524 which is used instead of the clip 521 of the thirteenth embodiment.

Figure 42:
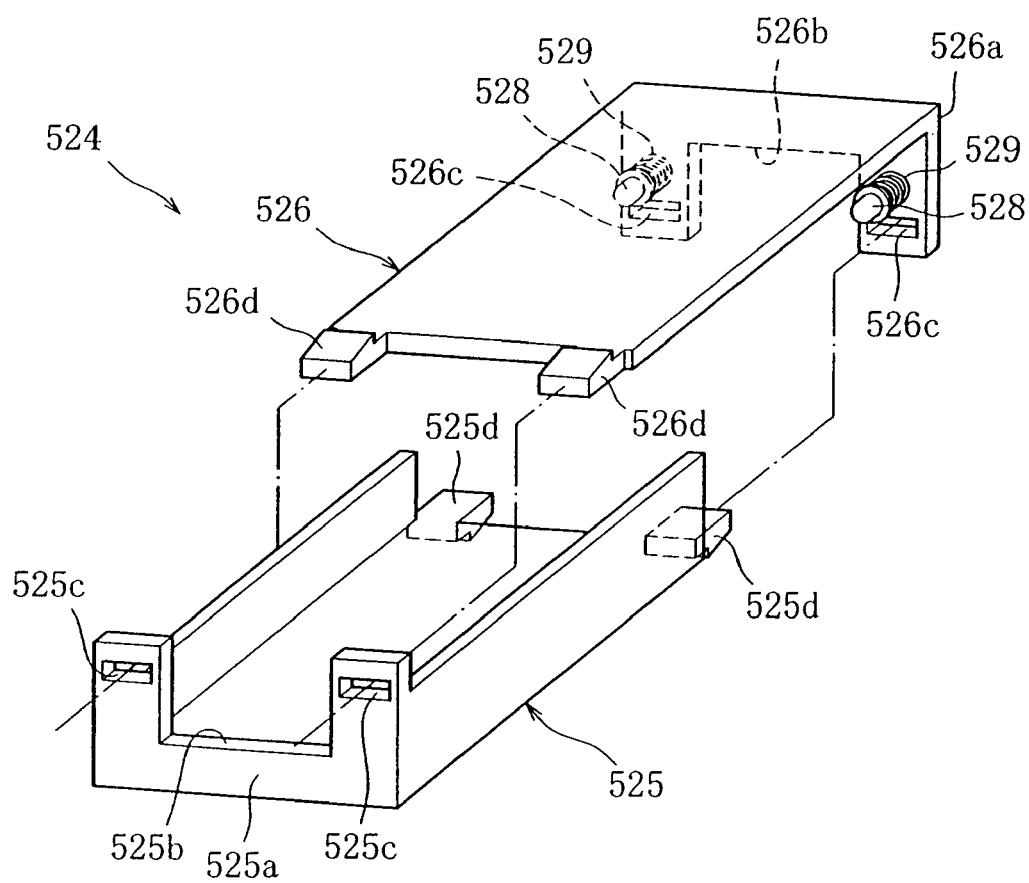
FIG. 42 is an exploded perspective view showing an optical module according to a fourteenth embodiment of the present invention.
Figure 43:
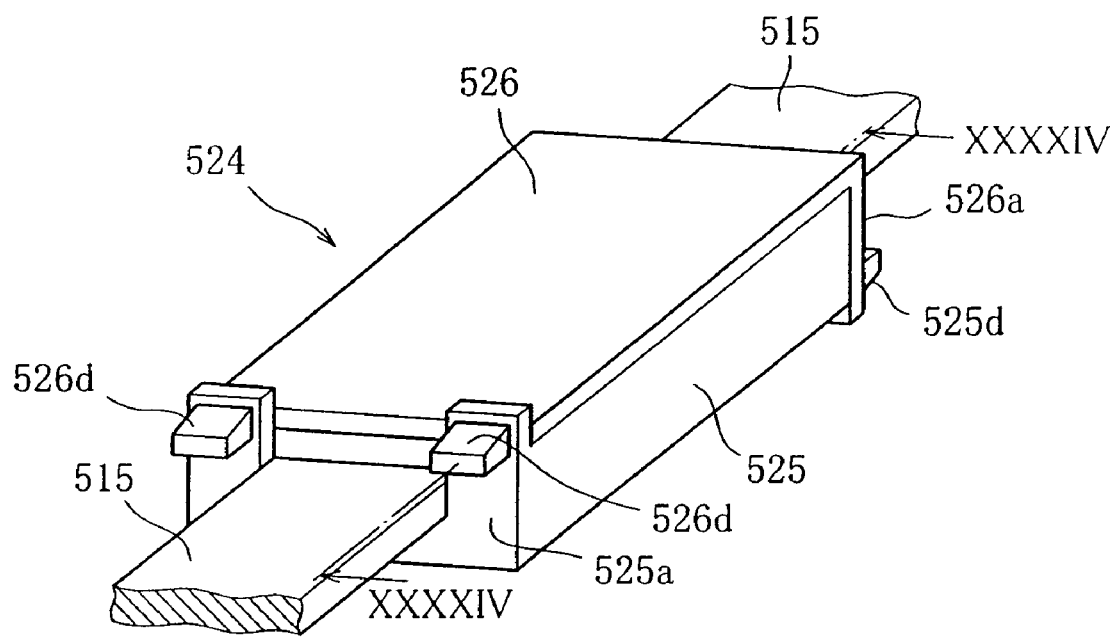
FIG. 43 is a perspective view of the optical module shown in FIG. 42.

As shown in FIG. 42, the package 524 comprises a casing and a lid 526 which are made of metal (such as iron, aluminum) or plastic resin (such as PBT (polybutylene terephthalate) or PP (polypropylene)). As a whole, the package is formed into a box which is a size larger than the optical module body comprised of optical fiber housings 512 and lens housings 513. The casing 525 is comprised of a front wall 525a, bottom wall, and left and right walls, with a rear portion on the side close to the second optical fiber housing 512 being opened. The front wall 525a is formed at its central upper portion with a notch 525b through which optical fibers 515 pass, and is formed at both sides of an upper edge portion thereof with two holes 525c. Two engaging pawls are provided at a rear end of the bottom wall so as to project rearward from the bottom wall.

The lid 526 is comprised of an upper wall and a rear wall 526a which is formed at its central lower portion with a notch 526b permitting optical fibers 515 to pass therethrough. The rear wall 526a is formed with holes 526c to which the engaging pawls of the casing 525 are engaged, and is provided at both sides of a front end thereof with engaging pawls 526d so as to project forward, which pawls are engaged with the holes 525c of the casing 525. The casing 525 and the lid 526 are constituted by resin members.

Figure 44:
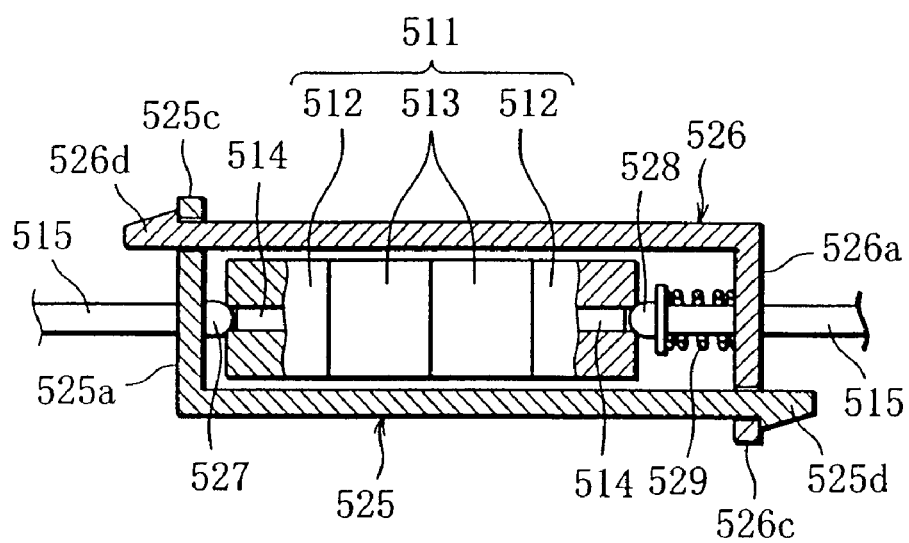
FIG. 44 is a longitudinal section view of the optical module taken along line XXXXIV-XXXXIV shown in FIG. 43.

As shown in FIG. 44, emboss shaped elastic members 527 are provided at both sides of an inner face of the front wall 525a of the casing 525, so as to be aligned with the first and second guide pin holes 512a of the first optical fiber housing 512. As shown in FIG. 42, emboss shaped elastic members 528 are provided at both sides of an inner face of the rear wall 526a of the lid 526 so as to be aligned with the first and second guide pin holes 512a of the second optical fiber housing 512, and an elastic member, e.g., a coil spring 529, is interposed between the elastic member 528 and the rear wall 526a. As in the case of the thirteenth embodiment, the guide pins 514 have their length slightly shorter than the length of the optical module body, and slight recesses are formed at open ends of the guide pin holes 512a of the first and second optical fiber housings 512.

The following is an explanation on assembling procedures of the optical module 511 of the fourteenth embodiment.

First, the optical module body is received in the casing 525, and the elastic members 527 provided in the front wall 525a of the casing 525 are fitted to the open ends of the guide pin holes 512a of the firs optical fiber housing 512. Then, the engaging pawls 526d of the lid 526 are press-fitted to the holes 525c of the casing 525, while the elastic members 528 of the rear wall 526a of the lid 526 are fitted to the open ends of the guide pin holes 512a of the second optical fiber housing 512. Further, the engaging pawls 525d of the casing 525 are press-fitted to the holes 526c formed in the lid 526. As a result, the lid 526 is fitted to the casing 525 in which the optical module body is received. Preferably, the lid 526 is thermally fused to the casing 525, whereby the optical module body is received in the package 524 in a hermetically sealed state.

In the optical module 511, a spring force of the coil spring 529 is applied, as axial pressure, via the elastic members 528 to the outer end face of the second optical fiber housing 512, and hence an axial pressure is applied from the elastic members 527 to the outer end face of the first optical fiber housing 512. As a consequence, the optical module body is supported by the elastic members 527, 528 in a floating state such that it is slightly separated from the walls of the package 524.

The optical module 511 supported in a floating state prevents the optical fiber housings 512 and the lens housings 513 from being directly applied with external forces, even when external forces such as vibration and impact are applied to the package 524. This makes it possible to prevent the optical axis from being deviated, thus maintaining satisfactory optical characteristics. The optical module 511 hermetically sealed by the package 524 further reduces deviations of the optical axis, lens-to-lens distance D and focal distance S, whereby high reliability can be achieved.

Since the optical module 511 can be assembled by simply inserting the optical module body between the casing 525 and the lid 526, the optical fiber housings 512 and the lens housings 513 can be retained in their positioned state (joined state), as the optical module body is accommodated in the package 524, whereby the retention of the positioned state and the accommodation of the optical module body can be realized simultaneously.

In the following, an optical module according to a fifteenth embodiment of the present invention will be explained with reference to FIGS. 45-47.

The optical module of the fifteenth embodiment is featured in that an optical function component is stably held between first and second lens housings, thereby improving optical coupling efficiency, while it is the same in other respects as the module of the thirteenth embodiment.

Figure 45:
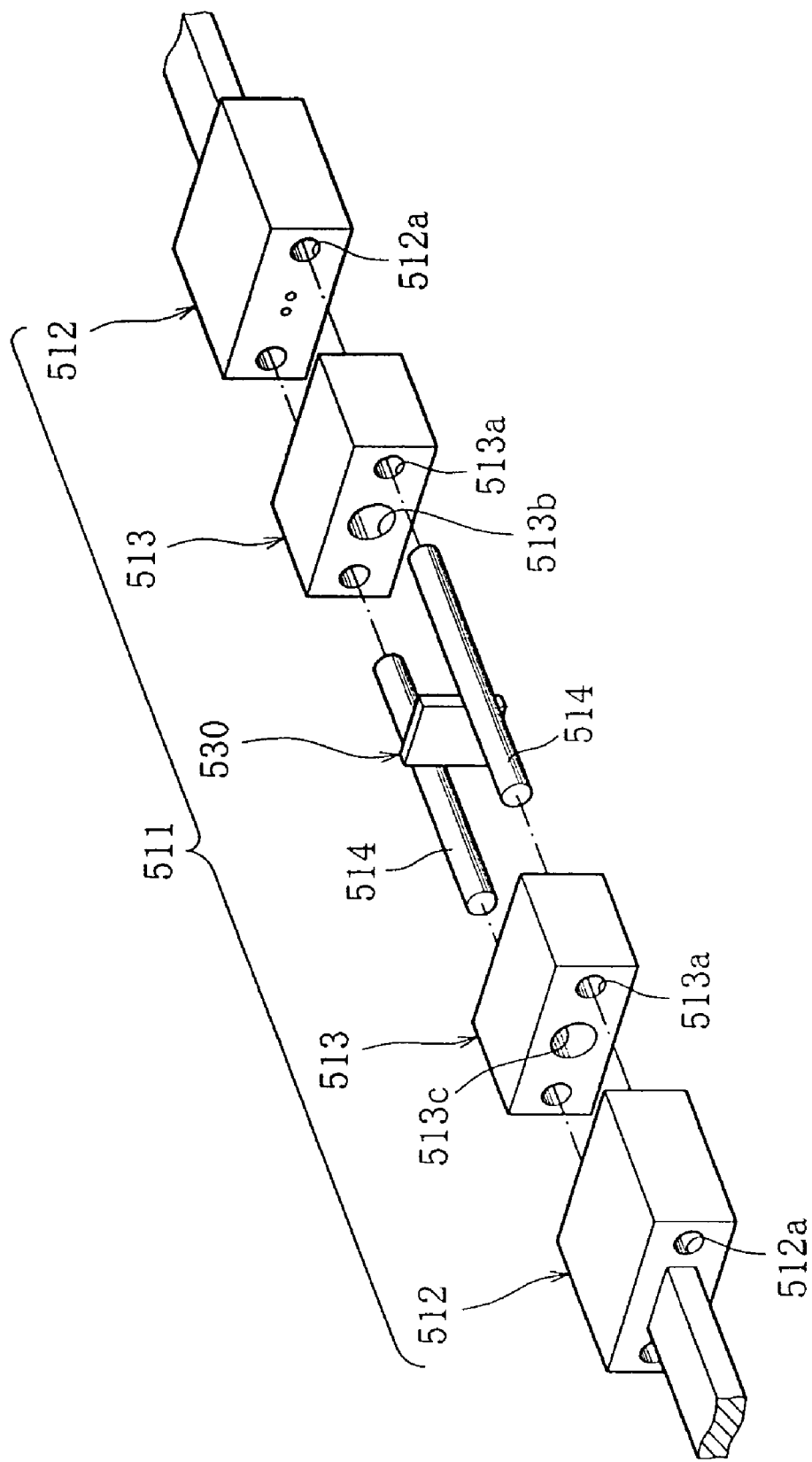
FIG. 45 is an exploded perspective view of an optical module according to a fifteenth embodiment of the present invention.
Figure 46:
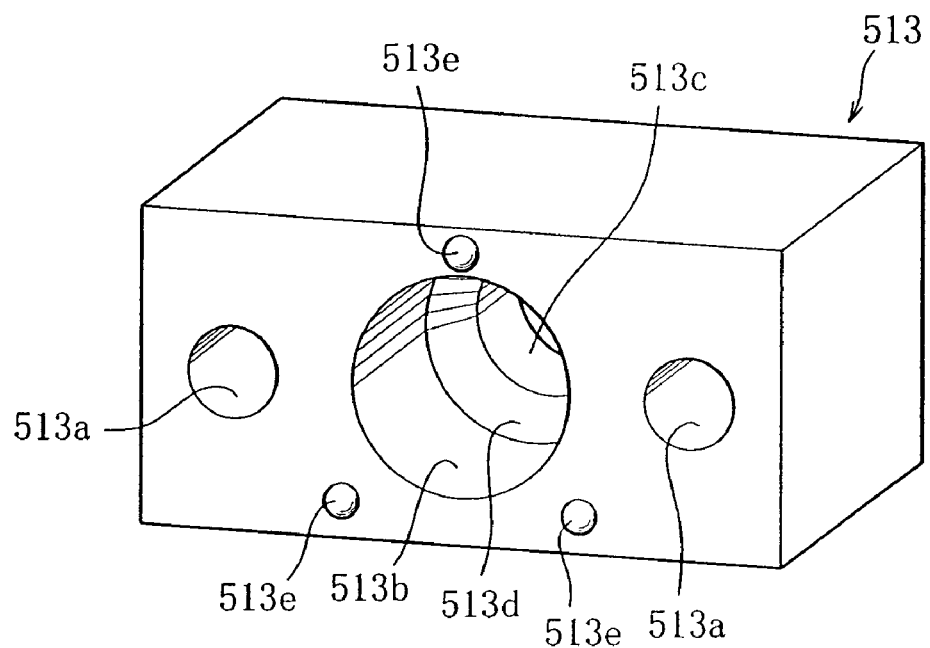
FIG. 46 is an enlarged perspective view of a lens housing shown in FIG. 45.

As shown in FIG. 45, the optical module 511 of the fifteenth embodiment is configured such that the first and second optical fiber housings 512 and the first and second lens housings 513, arranged between the fiber housings 512, are positioned by means of the guide pins 514, and the positioned housings 512, 513 are properly held by holding means corresponding, e.g., to the clips 521 shown in FIGS. 40 and 41. As in the case of the twelfth to fourteenth embodiments, the lenses 516 are disposed in the lens housings 513.

Figure 47:
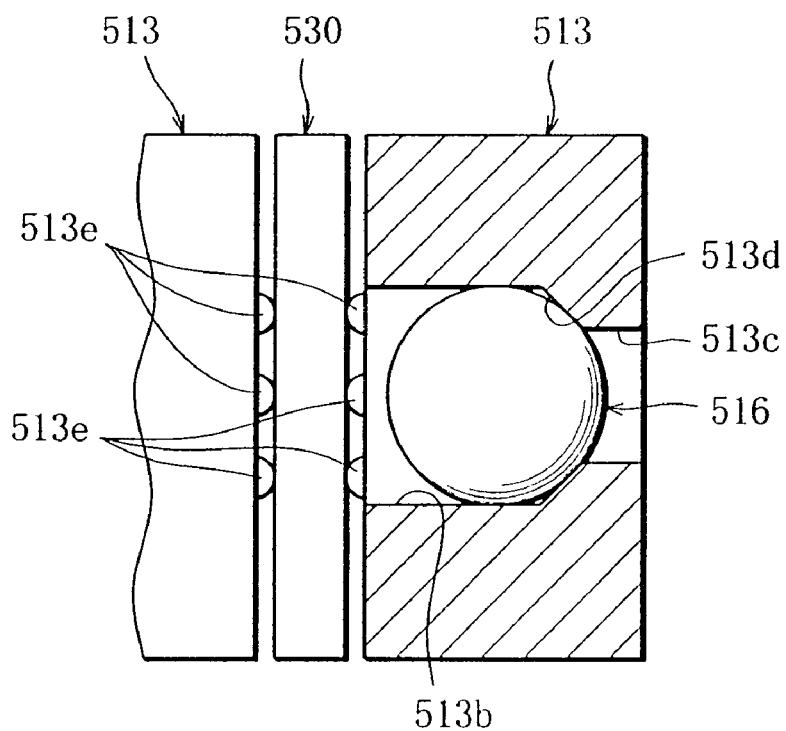
FIG. 47 is a view showing, partly in cross section, an optical function component shown in FIG. 45 in a state where it is held between lens housings.

Reference numeral 530 denotes an optical function component such as a filter, which is held between the first and second lens housings 513 as shown in FIG. 47.

In order to improve accuracy of the position of the optical function component 530 with respect to the lenses 516 and the angle of the optical function component 530 with respect to the optical axis, the lens housings 513 of the fifteenth embodiment are provided at their inner end faces with three support points 513e that are adapted to abut against end faces of the optical function component 530. In this embodiment, the support points 513e are each comprised of a semispherical projection which is in point-contact with the optical function component 530. The three support points 513e are equally spaced at about 120 degrees around the lens hole 513b. More specifically, a first support point 513e is provided at the center of an upper edge portion of the inner end face of the lens housing 513, and second and third support points 513e are provided in a lower edge portion of the inner end face of the lens housing 513. These three support points 513e are at the same distance from the center of the lens hole 513b.

The following is an explanation of operation of the support points 513e.

When the optical function component 530 is held between the inner end faces of the first and second lens housings 513, each end face of the optical function component 530 abuts against the three support points 513e formed in the inner end face of the lens housing 513, whereby the optical function component 530 is stably positioned and supported from both sides by the support points 513e which are totally six in number.

Since the optical function component 530 is supported, at each end face, with the three support points 513e of the lens housing 513 provided at the equal angular interval around the lens hole 513b and placed at the same distance from the center of the lens hole 513b, the optical function component 530 is accurately positioned relative to the lens 516 with an accurate angle relative to the optical axis passing through the center of the lens 516 and extending longitudinally of the optical module body, resulting in improved accuracy of position and angle of the optical function component.

On the contrary, with an arrangement where the optical function component 530 is fixedly positioned by means of the entire inner end faces of the first and second lens housings 513, it is impossible to always position the optical function component 530 in the same position with the same angle, since the end face of the lens housing, microscopically, is not completely flat and has a large number of support points as previously mentioned, resulting in variations in position and angle of the optical function component between individual optical modules.

In this regard, the optical module 511 of the fifteenth embodiment is configured to stably support each end face of the optical function component 530 at three points. This makes it possible to always position the optical function component 530 in the same position with the same angle, permitting optical modules each having a desired optical coupling efficiency to be stably manufactured. In addition, machining costs can be reduced since it is unnecessary to machine the entire end face of the lens housing 512 into a completely flat face.

Figure 48:
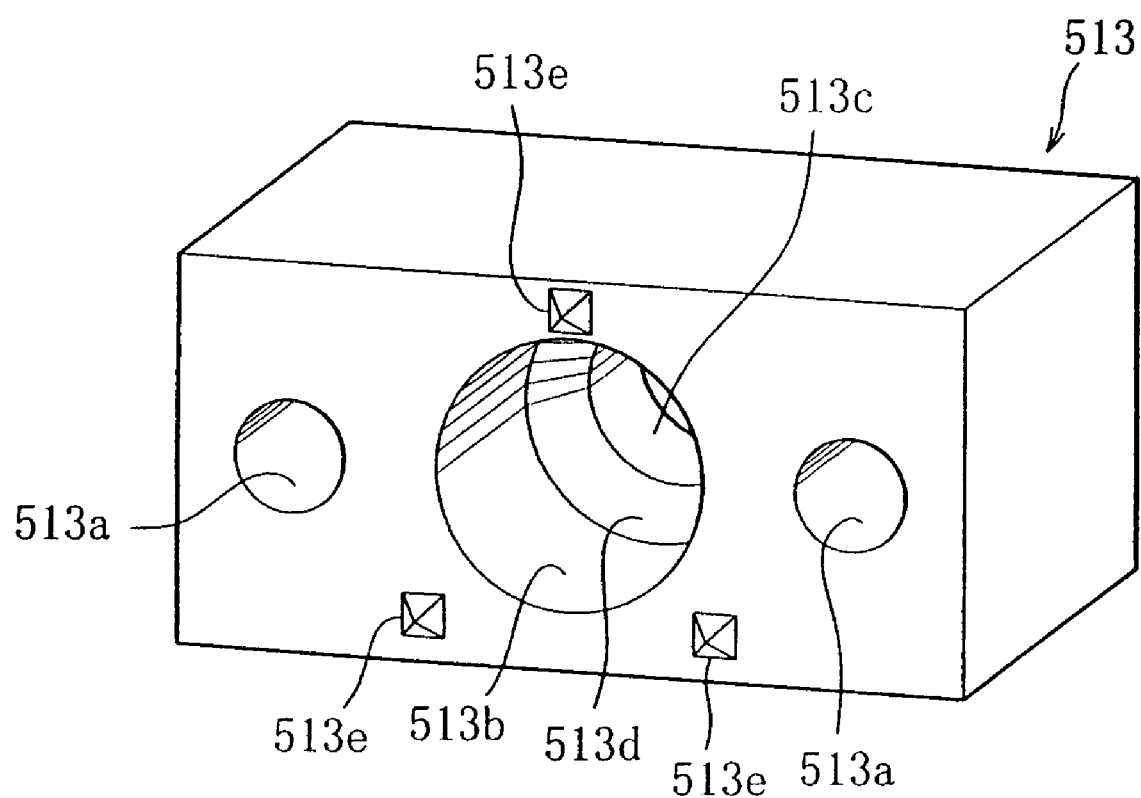
FIG. 48 is an enlarged perspective view showing a modification of the lens housing shown in FIG. 46.

The three support points 513e may be formed only in the inner end face of the first or second lens housing 513 although the three support points 513e are formed in the respective inner end faces of the first and second lens housings 513 in the fifteenth embodiment. It is not inevitably necessary to form the support point 513e into a semispherical shape. For instance, the support point may be formed into a quadrangular pyramid shape as shown in FIG. 48. Also, there is no limitation as to the position at which the support point is formed. Further, the optical function component is not limited to the filter. Positioning means such as a guide for arranging the optical function component 530 in position with respect to the inner end face of the lens housing 513 may be provided, e.g., in the end face of the lens housing.

As understood from the explanations of the twelfth through fifteenth embodiments, according to the present invention, the lenses are fixedly positioned in the lens holes by means of the positioning members without using adhesive. This makes it possible to easily and accurately set the focal distance between optical fiber end face and lens and the lens-to-lens distance between two lenses to desired values, thereby greatly reducing the optical coupling loss of the optical module, and realizing reduced assembling manhours, reduced assembling cost, and improved operation reliability.

In the present invention, preferably, the first and second lens housings are formed with first and second guide pin holes permitting the first and second guide pins to pass therethrough, and the first and second optical fiber housings are formed with third and fourth guide pin holes permitting the first and second guide pins to pass therethrough. Further, a dimensional difference is provided between a distance between axes of the first and second guide pin holes and a distance between axes of the third and fourth guide pin holes. In this case, the guide pins inserted to the guide pin holes formed in the optical fiber housings and the lens housings apply depressing restraint forces to these housings, thereby stably maintaining positional relations between the housings. As a result, positional relations between optical fibers and lenses can be stabilized with high accuracy, thereby improving loss properties of the optical module.

Preferably, the dimensional difference is equal to or larger than 1 µm, whereby the restraint forces can be positively produced between the optical fiber housings, the lens housings and the guide pins. The dimensional difference is equal to or less than 4 µm, thereby making it easy to insert the guide pins into the guide pin holes, while preventing the guide pin holes from being damaged.

Preferably, the optical module further comprises holding means for applying axial forces onto the outer end faces of the first and second optical fiber housings to thereby maintain the first and second optical fiber housings and the first and second lens housings in their positioned state, thus achieving stable optical coupling characteristics.

Preferably, the holding mean is comprised of a clip constituted by a plate spring, and the clip has opposite end portions thereof engaged with the outer end faces of the first and second optical fiber housings. In this case, the holding means is simple in construction.

Preferably, the holding means is comprised of a package which comprises a casing and a lid attached thereto and which is adapted to receive an optical module body. The casing is provided with first urging means for applying an axial force to the outer end face of the first optical fiber housing, and the lid is provided with second urging means for applying an axial force to the outer end face of the second optical fiber housing. In this case, the optical module body can be sealed in the package, thereby reducing influences of environment upon the optical module. For instance, positional deviations in optical module components caused by ambient characteristics can be suppressed, resulting in improved reliability.

Preferably, the axial forces applied by the holding means to the outer end faces of the first and second optical fiber housings vary from 5 N to 20 N. In this case, the optical fiber housings and the lens housing are properly maintained in their positioned state, while these housings are prevented from being deformed, whereby the optical coupling characteristics can be stabilized, and the holding means can be manufactured with ease.

Preferably, the optical module comprises an optical function component disposed between the first and second lens housings, and three support points adapted to abut against an end face of the optical function component are provided in at least one of inner end faces of the first and second lens housings. In this case, it is possible to stably retain the optical function component between the lens housings, resulting in improved optical coupling efficiency.

Preferably, the first and second lens housings are each formed at its inner end face with three support points, so as to stably hold the optical function component between these lens housings.

Preferably, each of the three support points is comprised of a semispherical projection or a quadrangular pyramid shaped projection, so that each support point is in point-contact with the optical function component, whereby the optical function component is properly supported at three points.

In the following, an optical switch module according to a sixteenth embodiment of the present invention will be explained.

Figure 2:
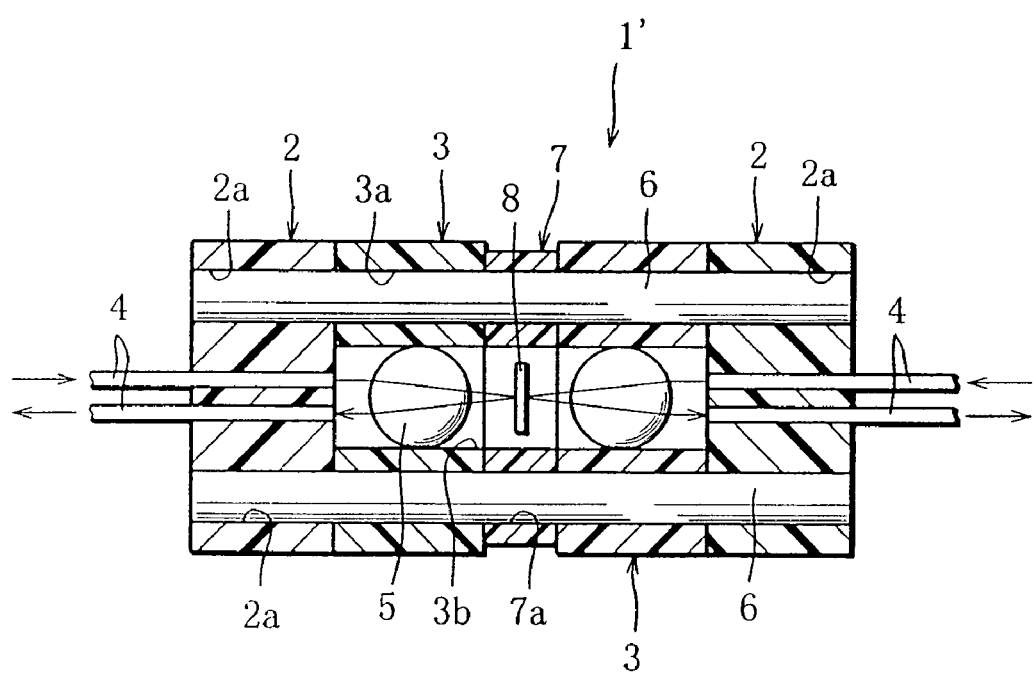
FIG. 2 is a section view showing another example of an MT type optical module.
Figure 49:
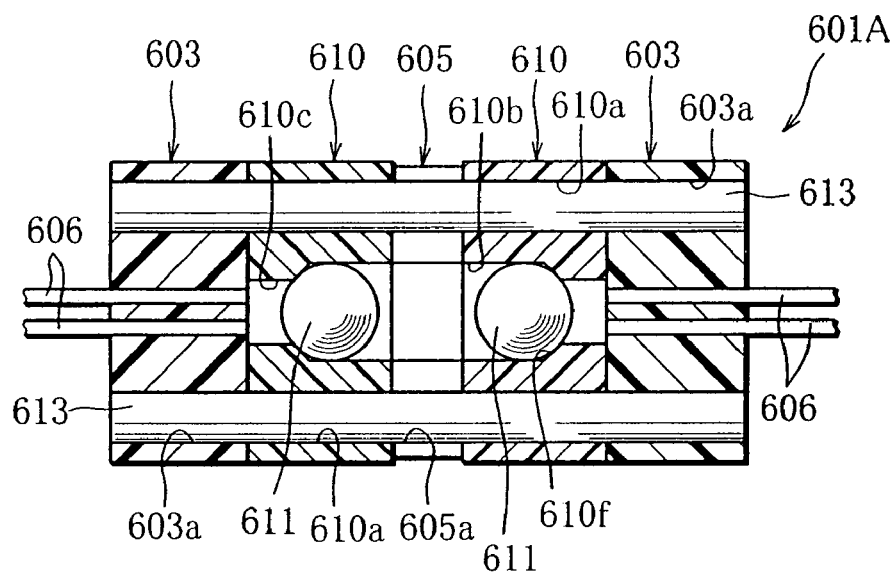
FIG. 49 is a section view of an optical switch module according to a sixteenth embodiment of the present invention.

As shown in FIG. 49, this optical switch module 601A uses lens housings 610 and guide pins 613 instead of the lens housings 4 and the guide pins 2 of the optical switch module 1 shown in FIG. 2.

Figure 50:
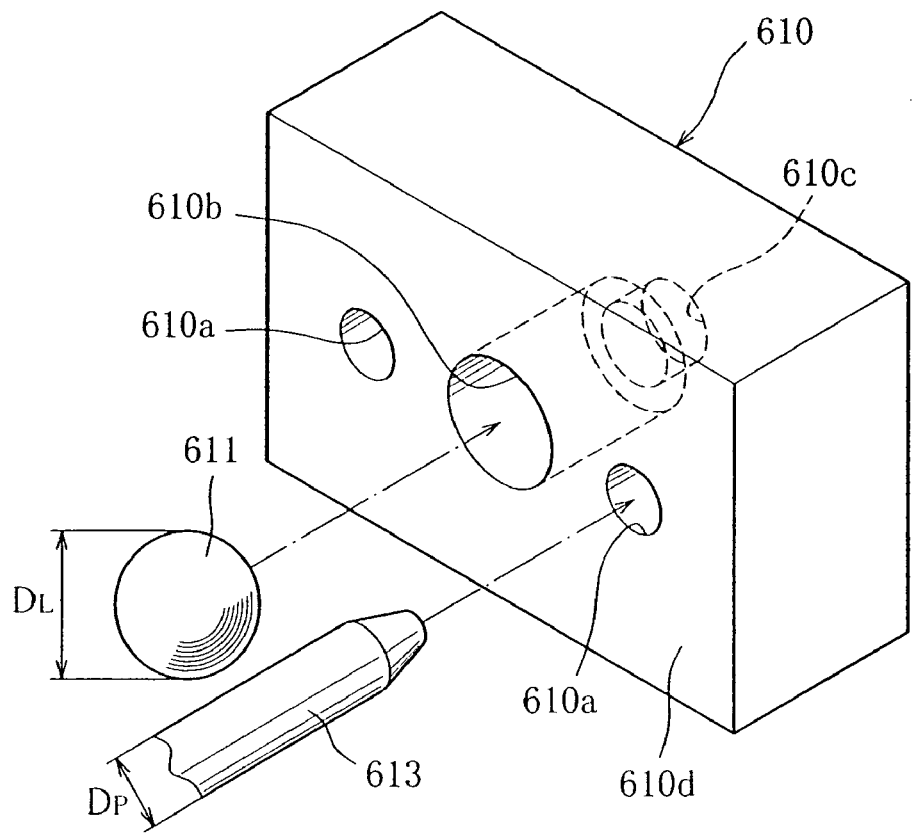
FIG. 50 is a perspective view of a lens housing shown in FIG. 49.
Figure 51A:
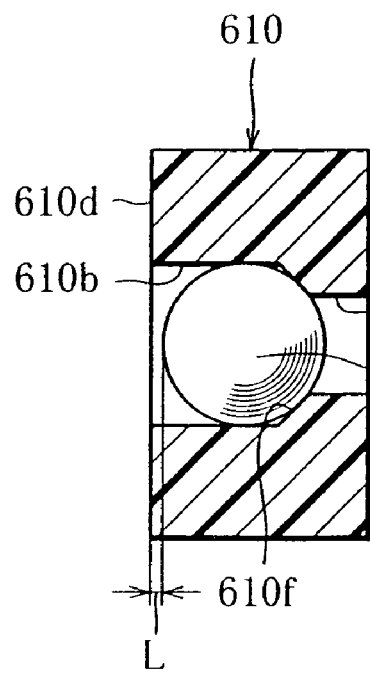
FIG. 51A is a section view showing an example of the shape of a lens hole formed in the lens housing shown in FIG. 49, as viewed along the center of the lens hole.

The lens housing 610 is formed with a pair of pin holes 610a through which the guide pins 613 pass, a lens hole 610b which is formed at a central part of the housing and in which a spherical lens 611 is received, and an optical path hole 610c communicating with the lens hole 610b, as shown in FIG. 50. Referring to FIG. 51A, the lens housing 610 further comprises a first end face (front face) 610d to which the lens hole 610b opens, and a second end face (rear face) 610e to which the optical path hole 610c opens. As shown in FIG. 50, the diameter DL of the spherical lens 611 in the lens housing 610 is determined to satisfy the following relationship in which DLH denotes the diameter of the lens hole 610b.

$$DL-0.5(\mu m) \leq DLH \leq DL+0.5(\mu m)$$

The diameter DP of the guide pin 613 for the lens housing 610 is determined to satisfy the following relationship in which DPH denotes the diameter of the pin hole 610a.

$$DP-0.5(\mu m) \leq DPH \leq DP+0.5(\mu m)$$

Figure 51B:
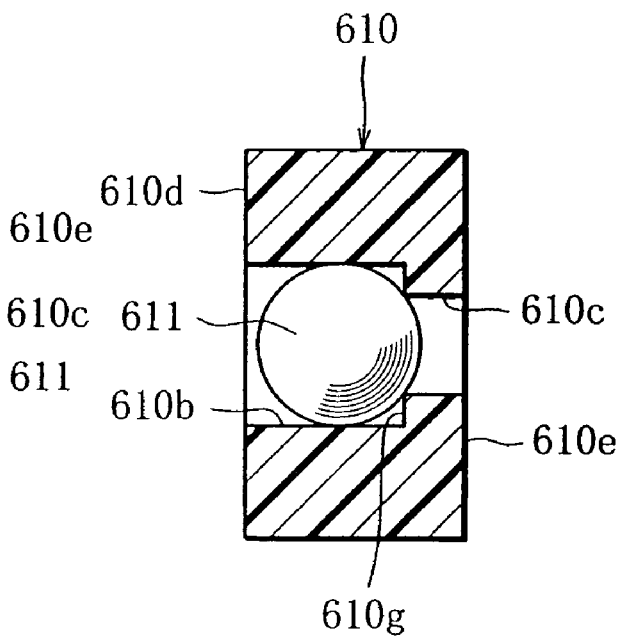
FIG. 51B is a section view showing another shape of the lens hole.

In the lens housing 610, as shown in FIGS. 50 and 51A, the optical path hole 601c is formed to have its diameter DLP smaller than the diameter DLH of the lens hole 610b, and the lens hole 610b is formed to have a taper portion whose diameter continuously decreases and to communicate with the optical path hole 610c. Instead of the taper portion 610f, the lens hole 610b may be provided with a stepped portion 610g, as shown in FIG. 51B, in which the diameter of the lens hole 610b decreases stepwise. In the lens housing 610, the spherical lens 611 is positioned with respect to the optical hole 610c, which is communicated with the lens hole 610b via the taper portion 610f or the stepped portion 610g and which has a smaller diameter than the lens hole 610b, and is inserted in the lens hole 610b, as shown in FIGS. 51A and 51B.

When combined with the optical fiber modules 3 of FIG. 2 with use of the guide pins 613 inserted to the pin holes 610a to form the optical switch module 601A, the lens housings 610 are positioned relative to the optical fiber housings 3 with submicron accuracy. Since the lens housings 601 are formed with the taper portion 610f or the stepped portion 610g, the spherical lens 611 are fixed at predetermined longitudinal positions (at which they are in contact with the taper portion 610f or the stepped portion 610g) with several-micron accuracy in the direction of light propagation, whereby the insertion loss of the assembled optical switch module 610A is suppressed to be low.

As shown in FIGS. 51A and 51B, the spherical lens 611 is received in the lens hole 610b in such a manner that the outermost face of the lens is positioned inwardly by a distance L with respect to the front face 610d of the lens housing 610, thereby preventing the surface of the spherical lens 611 from being damaged during handling of the optical switch module 601A.

In the following, an optical switch module according to a seventeenth embodiment of this invention will be explained.

Figure 52:
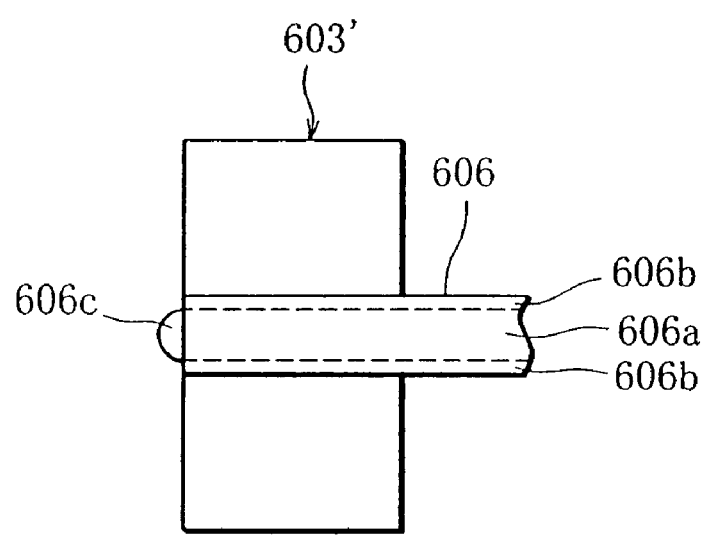
FIG. 52 is a section view showing an optical fiber housing and optical fibers of an optical switch module according to a seventeenth embodiment of the present invention.

This optical switch module uses optical fiber housings 603' and optical fibers 606 shown in FIG. 52 instead of the optical fiber housings 603 and the optical fibers 606 shown in FIG. 49.

The optical fiber 606 inserted in an optical fiber hole formed in the optical fiber housing 603' is comprised of a core 606a of cylindrical medium having a large refractive index, and a clad 606b of cylindrical medium having a small refractive index, with a convex projection 606c formed at a distal end of the core 606a and having a radius of curvature ranging from 5 μm to 400 μm, inclusive.

The convex projection 606c may be formed at the entirety of the end faces of the core 606a and the clad 606b of the optical fiber 606, although it is formed at the end face of the core 606a in the present embodiment.

The convex projection 606c, formed in the end face of the core 606a of the optical fiber 606 in the optical fiber housing 603' and having a radius of curvature of 5-400 μm, serves as a focusing lens to suppress outgoing light beams from diverging, at the time of emitted from the optical fiber toward the spherical lens 611 in the lens housing 615, thus improving the efficiency of optical coupling between the optical fiber 606 and the spherical lens 611.

The following is an explanation of a method for forming the projection 606c at the end face of the core 606a of the optical fiber 606.

End faces of the optical fiber housing 603 and the optical fibers 606 shown in FIG. 49 on the side close to the rear face 610e of the lens housing 610 are subject to surface grinding, with the optical fibers 606 inserted to optical fiber holes formed in the optical fiber housing 603, whereby the end faces of the optical fibers 606 are formed into flat faces.

On the contrary, in the present embodiment, ejection polishing is carried out, with the optical fibers 606 inserted to the optical fiber holes of the optical fiber housing 603', whereby the convex projections 606c are remained in the end faces of the cores 606a of the optical fibers 606 after the end face of the optical fiber housing 603' on the side in contact with the rear face 610e of the lens housing 610 is polished. The projections 606c are thus formed.

For the formation of the projection 606c, instead of the ejection polishing, a method for forming an optical fiber having a spherical distal end may be utilized, for instance, in which method a distal end portion of the optical fiber 606 is fused and formed into a spherical shape.

In the following, an optical switch module according to an eighteenth embodiment of this invention will be explained.

Figure 53:
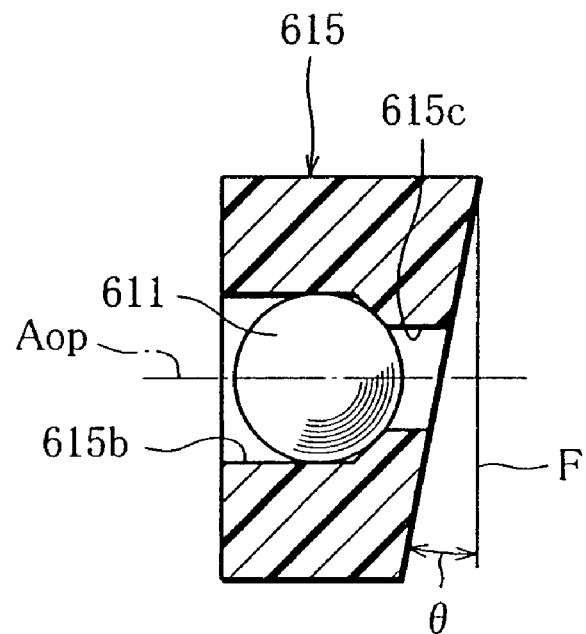
FIG. 53 is a section view showing a lens housing of an optical switch module according to an eighteenth embodiment of the present invention.
Figure 54:
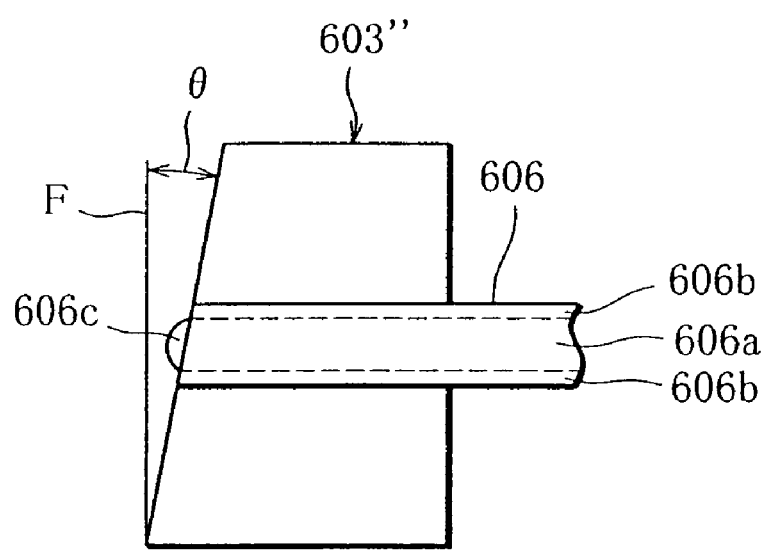
FIG. 54 is a schematic view showing an optical fiber housing of the optical switch module of the eighteenth embodiment.

This optical switch module uses a lens housing 615 shown in FIG. 53 instead of the lens housing 610 of FIG. 49, and uses an optical fiber housing 603" and an optical fiber 606 shown in FIG. 54 instead of the optical fiber housing 603 and the optical fiber 606 shown in FIG. 49.

The lens housing 615 has its rear face 615e formed into a flat face that obliquely extends at an angle θ of 6-13 degrees with respect to a plane F perpendicular to the optical axis AOP passing through the center of the spherical lens 611. The optical fiber housing 603" has a flat face, which is adapted to abut against the rear face 615e of the lens housing 615 and which obliquely extends at the same angle as the inclination angle of the rear face 615e with respect to the plane F perpendicular to the optical axis AOP passing through the center of the core 606a of the optical fiber 606. The optical fiber 606 inserted to the optical fiber hole formed in the optical fiber housing 603" has a core 606a having an end face thereof formed with a convex projection 606c.

The optical switch module comprised of the lens housings 615 and the optical fiber housings 603" can effectively suppress signal light transmitted through the optical fiber 606 from being reflected at the end faces of the housings, whereby influences caused by the reflection can be suppressed as maximum as possible. As in the seventeenth embodiment, the efficiency of optical coupling between the optical fiber 606 and the spherical lens 611 can be improved.

In order to suppress influences of reflection, an antireflection coating may be provided on the surface of the spherical lens 611 in the lens housing 615. Since the spherical lens 611 is small in the order of several millimeters, it is difficult to provide an antireflection coating before the lens is built in the lens housing 615, causing increased costs. For this reason, the antireflection coating may be provided, with ease at low costs, to the spherical lens 611 built in the lens housing 615.

Since the antireflection coating for optical module is required to have a high transmissivity, the antireflection coating provided to the surface of the spherical lens 611 is comprised of a laminated film of tantlum pentoxide ($Ta_2O_5$) and silicon oxide ($SiO_2$) or a laminated film of tantanium dioxide ($TiO_2$) and silicon oxide ($SiO_2$). Such an antireflection coating makes it possible to greatly suppress reflection loss, i.e., light reflection at the surface of the spherical lens 611 in the lens housing 615.

In the following, an optical switch module according to a nineteenth embodiment of this invention will be explained.

Figure 55:
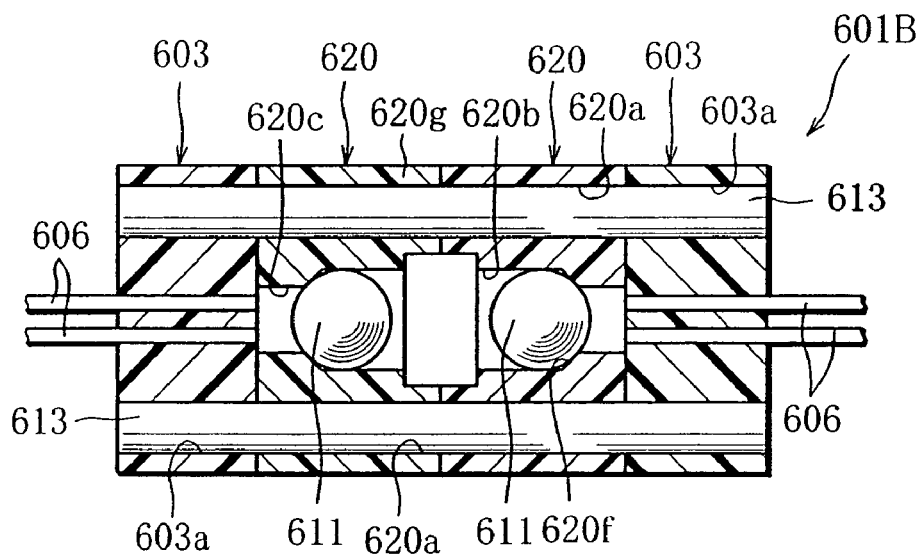
FIG. 55 is a section view of an optical switch module according to a nineteenth embodiment of the present invention.

As shown in FIG. 55, this optical switch module 601B uses a lens housing 620 instead of the lens housing 610 and the spacer 605 shown in FIG. 49.

Figure 56:
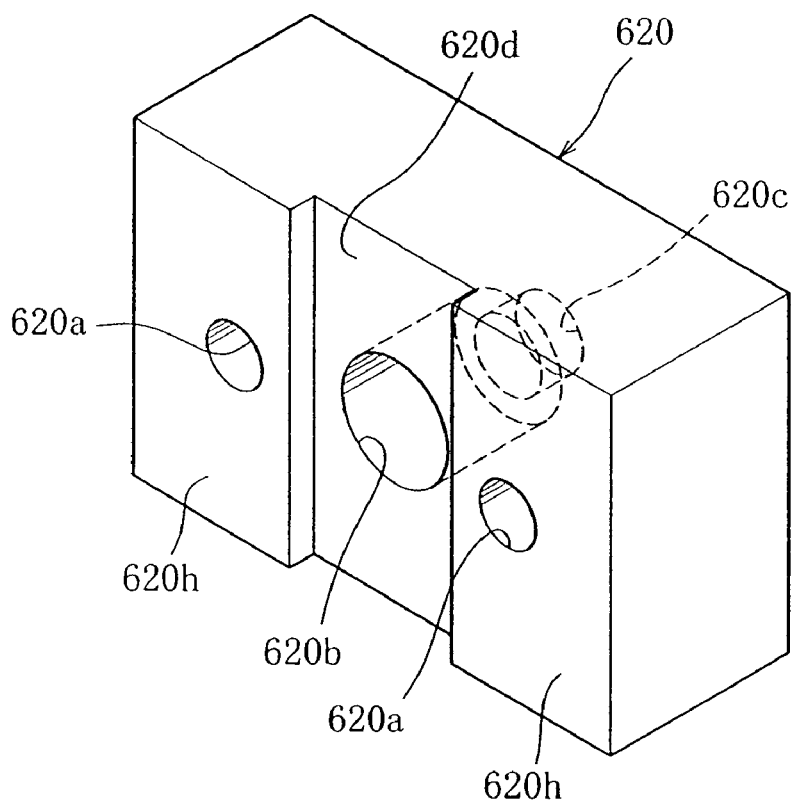
FIG. 56 is a perspective view of a lens housing shown in FIG. 55.

As shown in FIG. 56, the lens housing 620 is formed at both sides of a front face 620d, to which a lens hole 620b opens, with projections 620h having a predetermined height.

In the optical switch module 601B comprised of the lens housings 620 and the optical fiber housings 603 which are coupled together by means of guide pins 613 inserted into pin holes 620a and 603a, a space is defined between the two adjacent lens housings 620, as shown in FIG. 55. Accordingly, the distance between the two spherical lenses 511 received in these lens housings 620 can be adjusted to a desired value by adjusting the height of the projections 620h.

The optical switch module 601B (lens housing 620), which does not require the spacer 605 unlike the optical switch module 601A of FIG. 49, makes it possible to reduce the number of component parts and manufacturing costs, and improve the efficiency of assembling the optical module.

The optical fiber housing which is combined with the lens housing 620 to form the optical switch module 601B is not limited to the optical fiber housing 603 shown in FIG. 55 and may be another type of optical fiber housing. For instance, although the optical fiber housing of FIG. 55 is provided with two optical fibers 606 juxtaposed between a pair of guide pins 613 in the direction in which the guide pins 613 are spaced, an optical fiber housing may be used that has two optical fibers juxtaposed in the direction perpendicular to the direction in which the guide pins 613 are spaced.

The optical fiber housing 603' may also be employed, which is provided with the optical fiber 606 of FIG. 52 having a core 606a formed at its end face with the projection 606c, and which can improve the efficiency of optical coupling between optical fiber and lens.

In the following, an optical switch module according to a twentieth embodiment of this invention will be explained.

Figure 57:
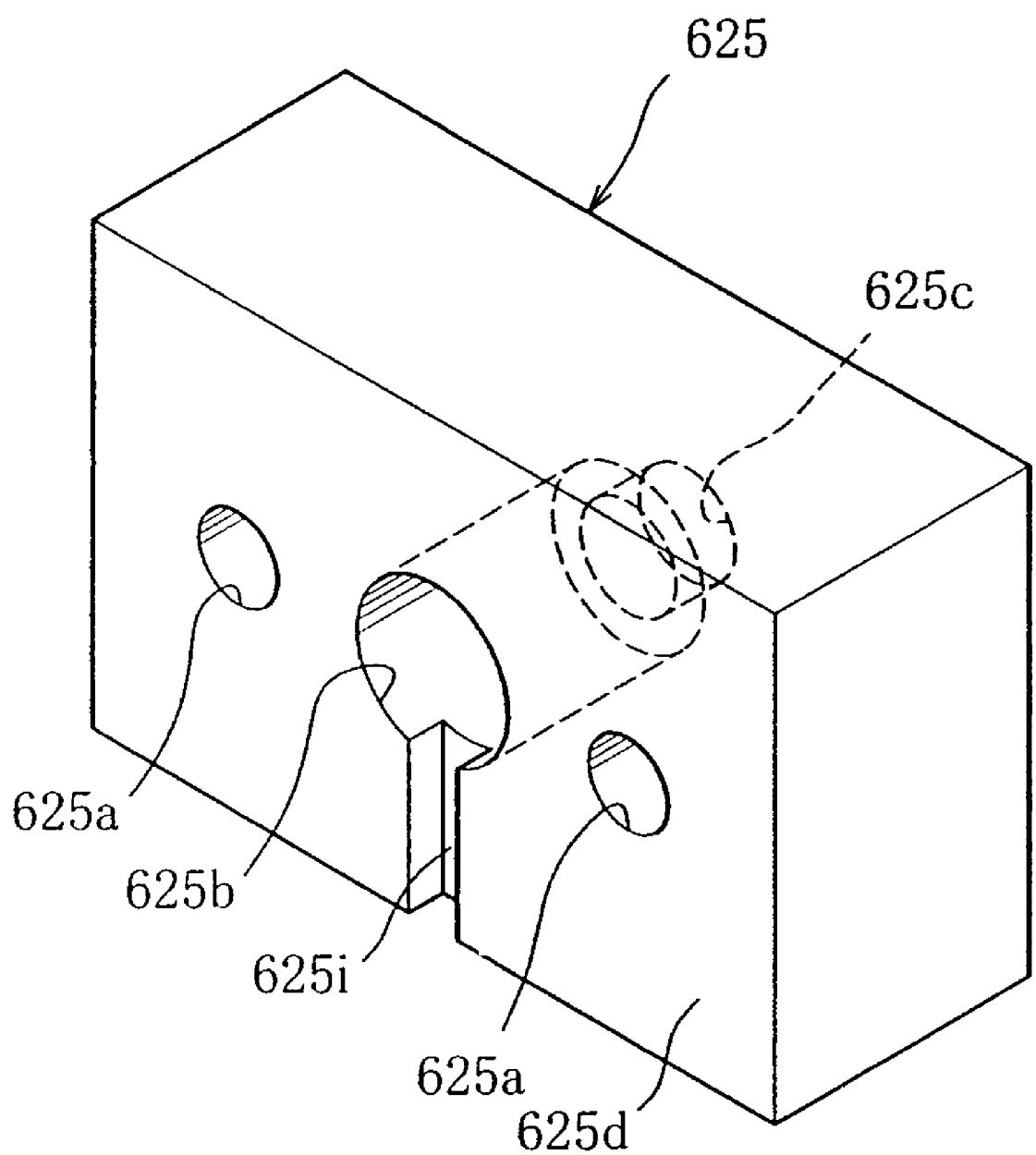
FIG. 57 is a perspective view of a lens housing of an optical switch module according to a twentieth embodiment of the present invention.

This optical switch module uses a lens housing 625 shown in FIG. 57 instead of the lens housing 610 of FIG. 49.

The lens housing 625 is formed at its front face 625d, to which the lens hole 625b opens, with a filling groove 625i for adhesive. The filling groove 625i is utilized for fixing the spherical lens 611 in the lens hole 625b with adhesive Ad serving as optimum fixing means.

Figure 58A:
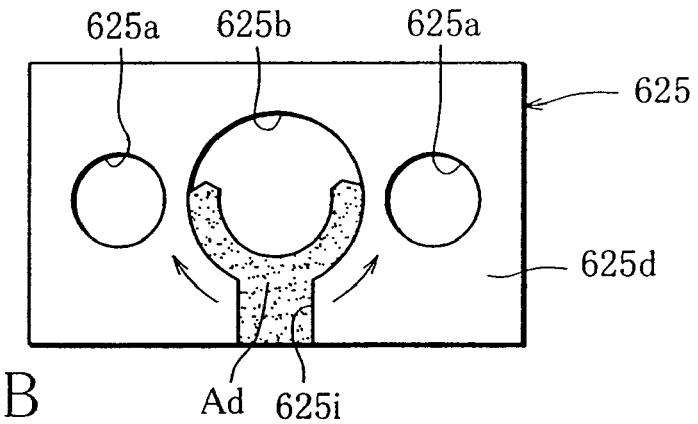
FIG. 58A is a front view showing a manner of filling adhesive into a lens hole with the aid of a filling portion of the lens housing shown in FIG. 57.
Figure 58B:
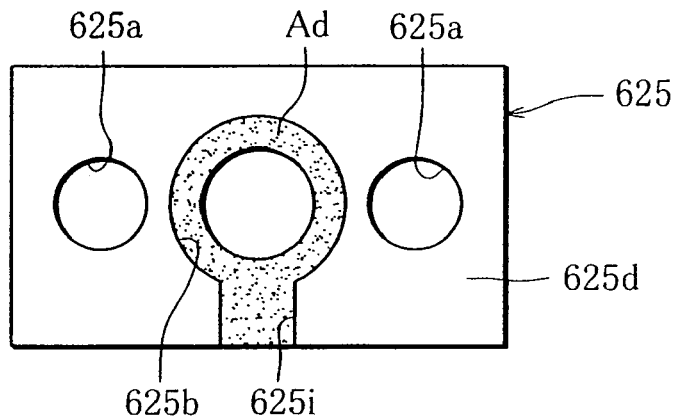
FIG. 58B is a view similar to FIG. 58A.
Figure 59:
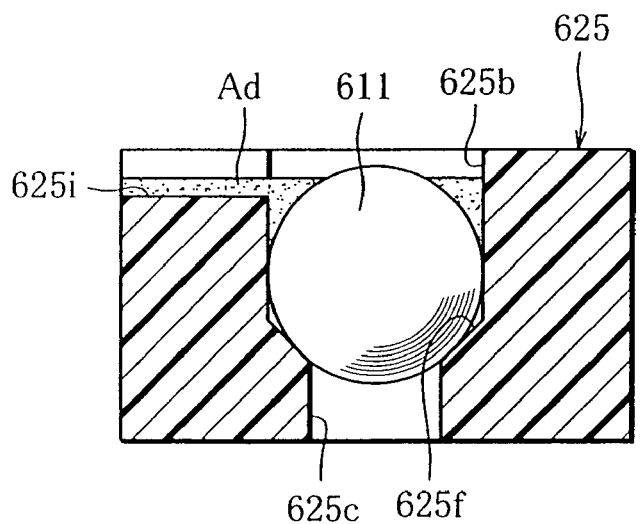
FIG. 59 is a section view-showing a state where the adhesive has been filled into the lens hole with the aid of the filling portion of the lens housing shown in FIG. 57.

As shown in FIG. 58A for instance, a proper amount of adhesive Ad is caused to flow, with the aid of the filling groove 625i, into the lens hole 625b in which the spherical lens 611 is inserted. The adhesive Ad flows along the periphery of the spherical lens 611 and defines a light passing portion at a central portion of the lens, whereby the spherical lens 611 is fixed to the inner face of the lens hole 625b with adhesive Ad.

The filling portion 625i has its width W and depth DPT which satisfy the following relationships, wherein symbol DLH denotes the diameter of the lens hole 625b.

0.2 mm≦W≦DLH and 0.2 mm≦DPT≦0.9DLH

Using the filling groove having the width and depth given above, it is easy to fix the spherical lens 611 in the lens hole 625b of the lens housing 625 with adhesive Ad, without the central light passing portion of the spherical lens 611 being blocked.

By using adhesive having viscosity that varies in a range of 1000-6000 mPa·sec, it is easy to carry out an operation of dripping the adhesive to the filling groove 625i and an operation of causing the adhesive to flow in the filling groove. Epoxy adhesive of two-liquid type for optical component can be used as the adhesive having the aforementioned viscosity.

The lens housing 625 formed at its front face 625d with the filling groove 625i for adhesive is capable of achieving easy assemblage of the lens housing 625 for receiving the spherical lens 611 and of the optical switch module.

In the present embodiment, the optical fiber housing 603' which receives optical fibers 606 of FIG. 52 each having a core 606a formed at its end face with a projection 606c may be employed instead of the optical fiber housing 603 shown in FIG. 49, so as to improve the efficiency of optical coupling between optical fiber and lens.

In the following, a collimator array serving as an optical module according to a twenty-first embodiment of this invention will be explained.

Figure 60:
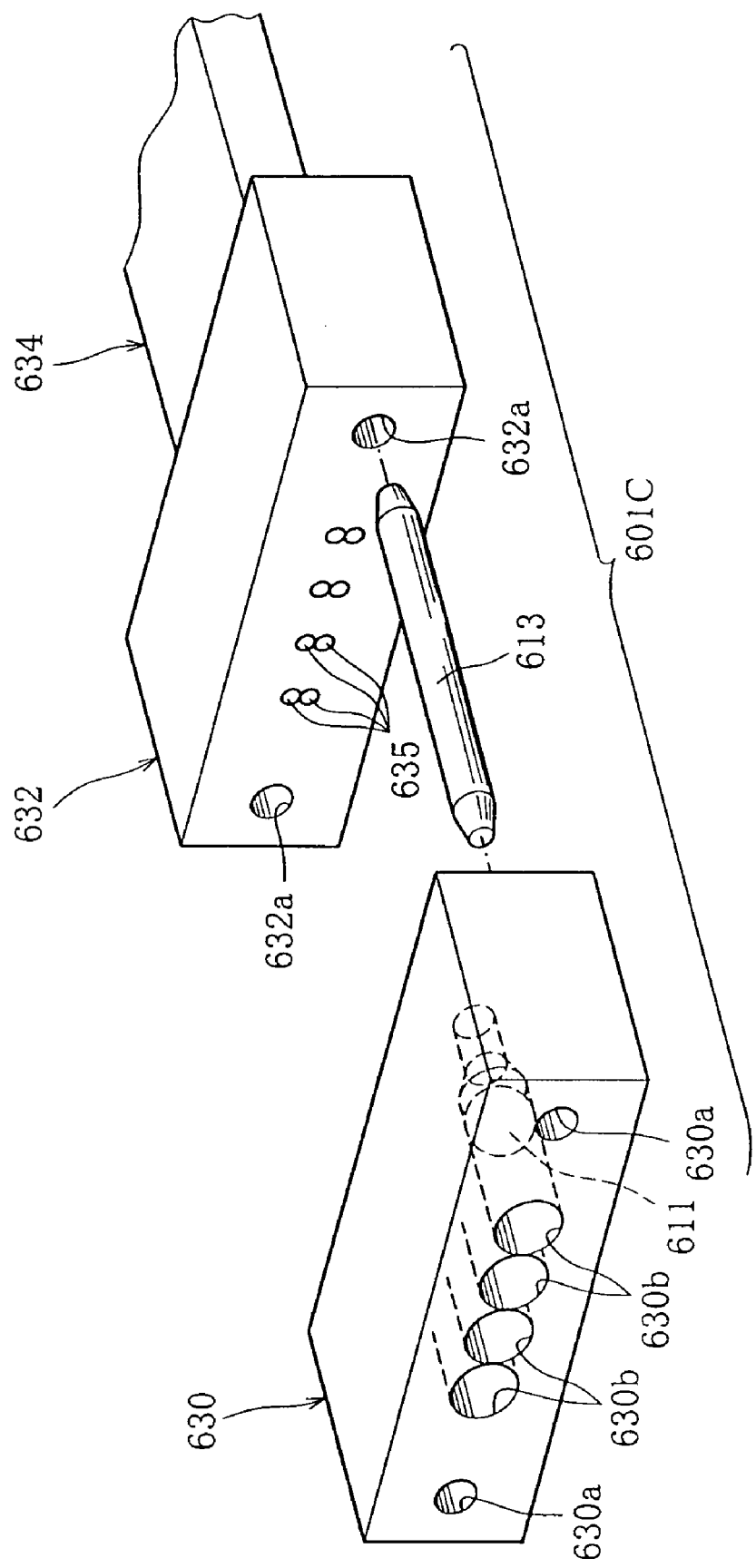
FIG. 60 is an exploded perspective view of a collimator array according to a twenty-first embodiment of the present invention.

As shown in FIG. 60, this collimator array 601C uses a lens housing 630 and an optical fiber housing 632 instead of the lens housing 610 and the optical fiber housing 603 shown in FIG. 49.

The lens housing 630 is formed with a plurality of, e.g., four lens holes 630b in which spherical lenses 611 are fittedly received. The lens housing 630, the lens hole 630b and the pin hole 630a can be formed in the same manner as in the sixteenth to twentieth embodiments.

In association with the lens housing 630 formed with the lens hole 630b, the optical fiber housing 632 is configured to be connected in the same manner as a multi-stage MT connector. More specifically, the optical fiber housing 632 receives a flat cable 634 comprised of optical fibers 635 disposed to face the spherical lenses 611. Reference numerals 630a, 632a denote a pair of pin holes into which guide pins 613 are inserted for automatic alignment and simultaneous positioning. This eliminates the need of an aligning operation in combining the lens housing 630 and the optical fiber housing 632 together to assemble the collimator array 601C, and realizes simultaneous positioning of these units.

In the optical fiber housing 632 shown in FIG. 60, four pairs of optical fibers 635, each pair comprised of two upper and lower optical fibers, are provided between the pin holes 632a. Alternatively, an optical fiber housing 632' may be employed, in which four pairs of optical fibers 635 each comprised of paired optical fibers that are juxtaposed horizontally are provided between the pin holes 632a.

In this embodiment, the optical fiber 635 may include a core having end face thereof formed with a projection as in the case of FIG. 52, to improve the efficiency of optical coupling between optical fiber and lens.

Next, an optical module according to a twenty-second embodiment will be explained.

In the eighteenth embodiment, explanations have been given to the effect that the slanted rear face 615e of the lens housing 615 and the slanted face of the optical fiber housing 603" on the side close to the rear face 615e make it possible to suppress influences caused by reflection, at a housing end face, of signal light transmitted through the optical fiber 606 and that the antireflection coating provided on the surface of the spherical lens 611 further suppresses influences caused by reflection.

Figure 62:
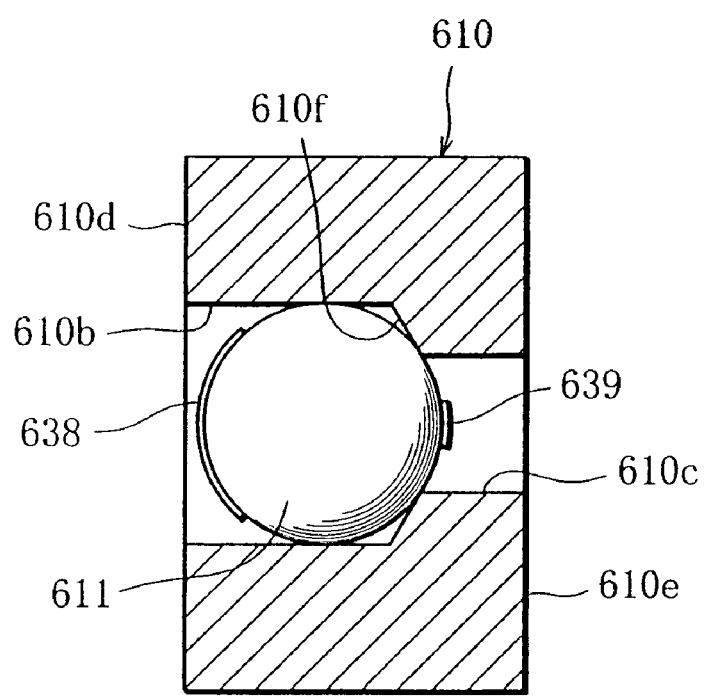
FIG. 62 is a section view showing a spherical lens of FIG. 49 in a state where it is applied at its surface with an anti-reflection coating.

Such an antireflection coating on the surface of the spherical lens 611 may, of course, be provided for embodiments other than the eighteenth embodiment. For instance, for the lens housing 610 of the sixteenth embodiment, antireflection coating films 638, 639 are coated, as shown in FIG. 62, on the surfaces of the spherical lens 611 which are on the side close to the open end of the lens hole 610b in which the lens 611 is received and on the side close to the open end of the optical path hole 610c, respectively.

The antireflection coating films are formed by ion vapor deposition, after the spherical lens 611 is received in the lens housing 610 as previously mentioned. More specifically, one of the surfaces of the spherical lens 611, which is exposed through the lens hole 610b, is subject to vapor deposition from the side of the front face 610d of the lens housing 610, thereby forming the antireflection film 638, whereas another surface of the spherical lens 611, which is exposed through the optical path hole 610c, is subject to vapor deposition from the side of the rear face 610e of the housing 610, whereby the antireflection film 639 is formed.

The lens hole 610b has its diameter DLH which is substantially the same as the diameter DL of the spherical lens 611 and hence relatively large in size, whereas the distance L from the front face 610d of the housing to the outermost face of the spherical lens 611 is determined to be enough to avoid the surface of the spherical lens 611 from being damaged during handling of the housing and is hence relatively short. For this reason, the antireflection coating from the front face 610d side is relatively easy, and the antireflection film 638 formed on the surface of the spherical lens 611 has a desired thickness, with sufficient expanse and uniformity.

On the contrary, the diameter of the optical path hole 610c is smaller than that of the lens hole 610b. In order to ensure proper optical coupling between the spherical lens 611 and the optical fiber 606 in the optical module 601A comprised of the lens housing 610 and the optical fiber housing 603, the distance between the rear face 610e of the lens housing 610 to the outermost face of the spherical lens 611 is determined to be relatively long. For antireflection coating from the side of the rear face 601e, vapor deposition is performed through the optical path hole 610c which is small in diameter toward the surface of the spherical lens 611 at a relatively long distance. As a result, vaporant becomes poor in an ability to reach, and hence the antireflection film 639 formed on the surface of the spherical lens 611 can have insufficient thickness, poor expanse, and ununiform thickness. This may impair reflection characteristics of signal light in the optical switch module 601A.

Figure 63:
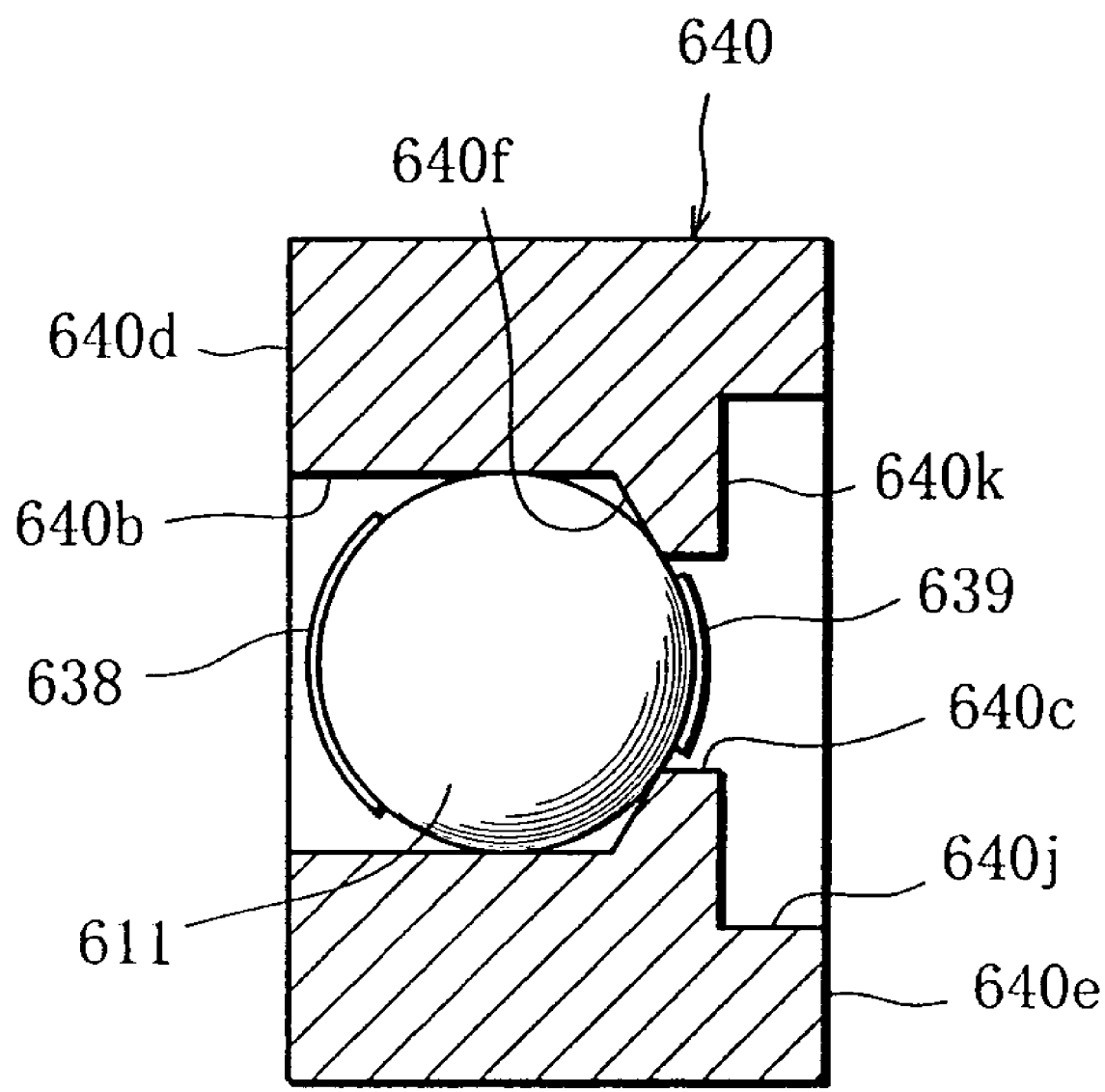
FIG. 63 is a section view showing a lens housing of an optical switch module according to a twenty-second embodiment of the present invention.

In this regard, the present embodiment uses a lens housing 640 shown in FIG. 63 instead of the lens housing 610 of FIG. 49.

The lens housing 640 is formed at its rear face 610e with a recess 640j of a predetermined depth for enlarging the area of an open end of the optical path hole 610c, to make it possible to advantageously decrease the distance between a bottom face 640k of the recess 640j and the outermost face of the spherical lens 611 by adjusting the depth of the recess 640j. As a result, vaporant has an improved ability to reach even when the antireflection coating is done from the side of the rear face 610e, whereby the antireflection film 639 having a desired thickness can be uniformly formed on the surface of the spherical lens 611, with adequate expanse, whereby the optical switch module exhibits satisfactory signal light reflection characteristics.

Figure 64A:
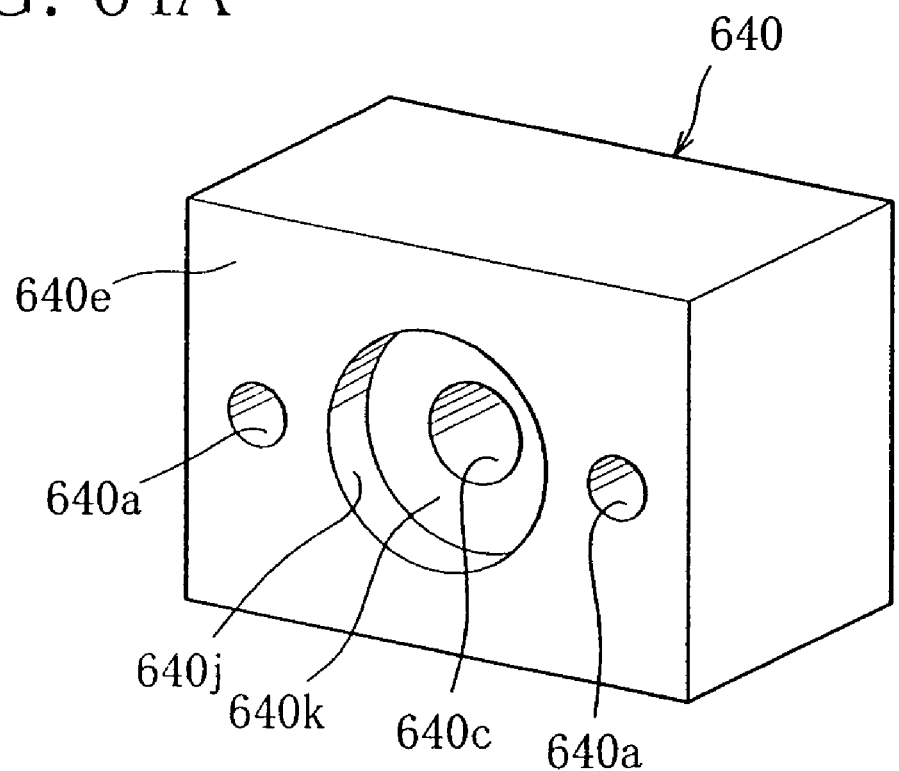
FIG. 64A is a perspective view showing an example of the shape of a recess formed in the lens housing shown in FIG. 63.
Figure 64B:
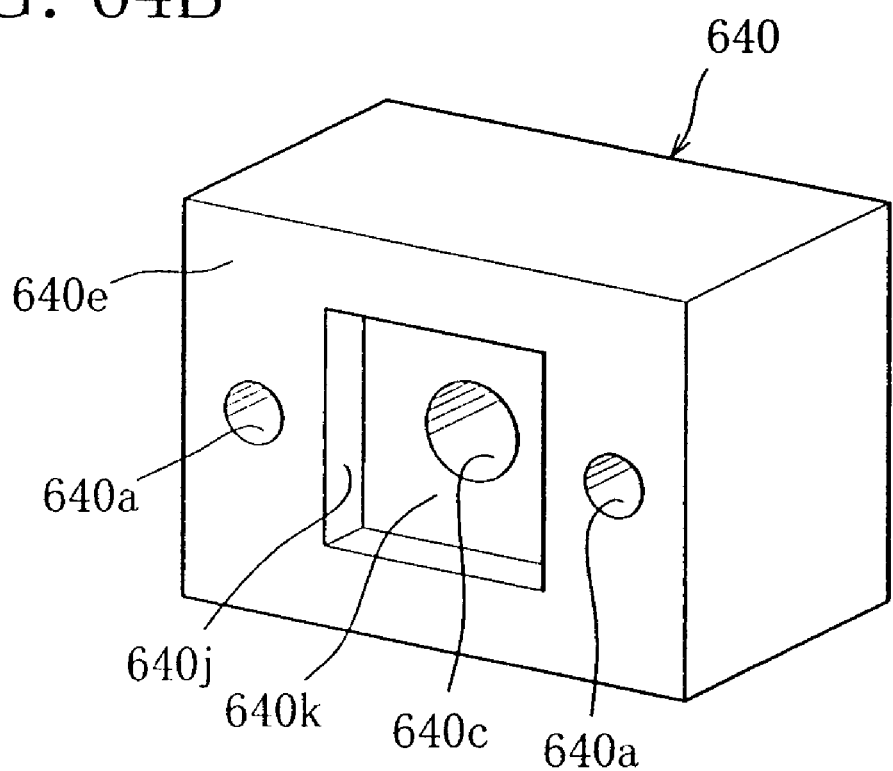
FIG. 64B is a perspective view showing another example of the shape of the recess.

The recess 640j may be formed into a circular shape or a square shape as shown in FIGS. 64A and 64B, and further may be formed into various other shapes (not shown).

In the present embodiment, an optical fiber housing 603″ accommodating an optical fiber 606 having a core 606a formed at its end face with the projection 606c shown in FIG. 52 may be used instead of the optical fiber housing 603 shown in FIG. 49 so as to improve the efficiency of optical coupling between optical fiber and lens.

In the following, a collimator array serving as an optical module according to a twenty-third embodiment of this invention will be explained.

As shown in FIG. 65, this collimator array 601D uses a lens housing 645 instead of the lens housing 630 shown in FIG. 60.

The lens housing 645 is formed with a plurality of, e.g., four optical path holes 645c, and a rectangular recess 645j of a predetermined depth is formed in the rear face 645e of the lens housing 645. Thus, the lens housing 645 corresponds to a combination of the lens housings 630, 640 according to the twenty-first and twenty-second embodiments, and accordingly, the collimator array 601D of the present embodiment comprised of a combination of the lens housing 645 and the optical fiber housing 632 can achieve effects of both the twenty-first and twenty-second embodiments.

Figure 61:
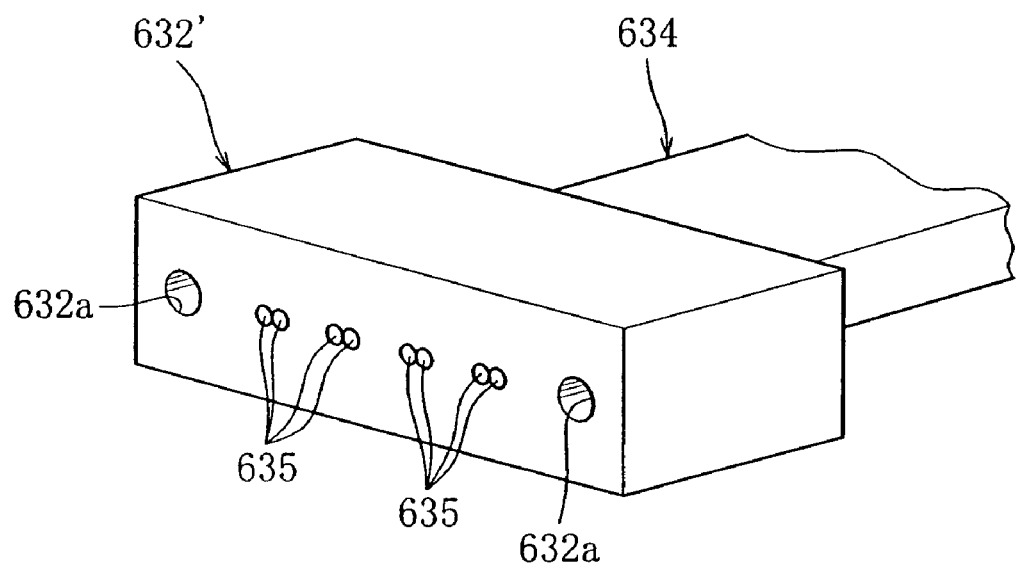
FIG. 61 is a perspective view showing a modification of an optical fiber housing of the collimator array shown in FIG. 60.

The collimator unit may be constituted by combining the lens housing 645 with the optical fiber housing 632′ shown in FIG. 61, instead of the optical fiber housing 632 of FIG. 65.

In order to improve the efficiency of optical coupling between optical fiber and lens, the optical fiber 635 may have a core formed at its end face with a projection, as in the case shown in FIG. 52.

In the sixteenth to twenty-third embodiments, the lens housings 610, 615, 620, 630, 640 and 645 can be fabricated at minimum cost by means of resin die-molding. On the other hand, synthetic resin belongs to elastic materials that are large in elongation and liable to be deformed when applied with external forces. For this reason, synthetic resin to be used preferably has its elastic modulus E that satisfies the following relationship:

$$10000 \text{ Mpa} \leq E \leq 30000 \text{ MPa}.$$

To suppress positional deviations between the lens housing and the spherical lens caused by a difference in dimensional change between the lens housing and the spherical lens when expanding and contracting with a change in ambient temperature, thereby reducing a variation in optical characteristic of the lens housing, it is preferable to fabricate the lens housing and the spherical lens from materials having the following characteristics.

More specifically, materials from which the lens housings 610, 615, - - -, 645 and the spherical lens 611 are fabricated should have grass transition temperature Tg, linear expansion coefficient $\alpha 1$ at a temperature equal to or below the glass transition temperature Tg, and linear expansion coefficient $\alpha 2$ that satisfy the following relationship:

$$90° \text{ C.} \leq Tg,$$

$$5 \times 10^{-6}/° \text{ C.} \leq \alpha 1 \leq 25 \times 10^{-6}/° \text{ C., and}$$

$$3 \times 10^{-6}/° \text{ C.} \leq \alpha 2 \leq 25 \times 10^{-6}/° \text{ C.}$$

More specifically, for the lens housings 610, 615, 645, synthetic resin should be used, such as thermosetting epoxy resin (having Tg equal to or higher than 120° C. and $\alpha 1$ varying from $6 \times 10^{-6}/°$ C. to $15 \times 10^{-6}/°$ C.) with filler filling rate of 75% or more, or thermoplastic polyphenylene sulfide (PPS) (having Tg equal to or higher than 90° C. and $\alpha 1$ equal to about $20 \times 10^{-6}/°$ C.) with filler filling rate of 75% or more. For the spherical lens 611, borosilicate glass (having $\alpha 2$ equal to about $7 \times 10^{-6}/°$ C.) is used.

Usage of the above-mentioned materials extremely reduces a difference in dimensional change between components that expand or contract with a change in ambient temperature at or below the proof temperature of 85° C. (Telcordia standard for optical coupling components, i.e., old Bellcore standard) for ordinary ambient temperature range. As a result, the lens housing 610, 615, - - -, 645 can suppress influences of temperature change on optical characteristics to a minimum.

As understood from the explanations for the sixteenth to twenty-third embodiments, the lens housing of this invention is formed with a pin hole, a lens hole opening to one end of the lens housing and adapted to receive a lens, and an optical path hole communicating with the lens hole whose diameter varies from a value obtained by subtracting 0.5 μm from the diameter of the lens to a value obtained by adding 0.5 μm to the diameter of the lens. Thus, the lens housing is low in insertion loss, and prevents lens surfaces from being damaged during handling.

As understood from the explanations for the sixteenth to twenty-third embodiments, the present invention provides an optical module which comprises the above-mentioned lens housing, and which is low in insertion loss and prevents lens surfaces from being damaged during handling.

In the lens housing and the optical module of this invention, preferably, the first and second pin holes each have a diameter which varies from a value obtained by subtracting 0.5 μm from the diameter of the pin inserted to the pin hole to a value obtained by adding 0.5 μm to the diameter of the pin, and the optical path hole has its diameter smaller than the diameter of the lens hole. The lens hole communicates with the optical path hole and decreases in diameter continuously or stepwise toward the optical path hole. The lens is received in the lens hole, with its outermost face placed inward with respect to one end face of the lens housing. In this case, it is possible to positively realize, in the lens housing or the optical module, a reduction in insertion loss and prevention of damage to lens surfaces.

Preferably, the end face of the lens housing to which the optical path hole opens is formed into a flat face obliquely extending at an angle, ranging from 6 degrees to 13 degrees, inclusive, relative to the optical axis, and the end face to which the optical path hole opens is formed with a recess of a predetermined depth for enlarging an area of an open end of the optical path hole. In this case, influences of reflection can be suppressed to a minimum.

Preferably, an end face of the lens housing to which the lens hole opens is formed with a projection. In this case, it is possible to reduce the number of components and fabrication costs, and improve the ease of assembly of the optical module.

Preferably, the end face to which the lens hole opens is formed with a filling portion for adhesive. In this case, the ease of assembly of the optical module can be improved.

Preferably, the optical fiber has its core whose end face on the side close to the lens is formed into a convex shape, and the radius of curvature of the convex shape varies from 5 μm to 400 μm, inclusive. In this case, the efficiency of optical coupling between the optical fiber and the lens can be improved.

The present invention is not limited to the first to twenty-third embodiments, and may be modified in various manner, e.g., by combining features of these embodiments. For instance, although the lenses L1, L2 are fixed by adhesive in the lens holes 41, 51 in the first embodiment, these lenses may be fixed by using positioning members as in the case of the twelfth embodiment.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An optical module comprising:
   first and second lens housings that individually receive first and second lenses;
   first and second optical fiber housings that individually receive end portions of optical fibers;
   first and second guide pins for positioning said first and second lens housings and said first and second optical fiber housings, with said first and second lens housings abutted against each other at their inner end faces and disposed between said first and second optical fiber units so as to be abutted thereto;
   two first positioning members provided between said first optical fiber housing and said first lens and between said second optical fiber housing and said second lens, respectively, said first positioning members having their outer ends and their inner ends individually abutted against inner end faces of said first and second optical fiber housings and peripheral portions of outer end faces of said first and second lenses; and
   a second positioning member disposed between said first and second lenses, said second positioning member having its opposite ends individually abutted against peripheral portions of inner end faces of said first and second lenses.

2. The optical module according to claim 1, wherein said first and second lens housings are formed with first and second guide pin holes permitting the first and second guide pins to pass therethrough, and said first and second optical fiber housings are formed with third and fourth guide pin holes permitting the first and second guide pins to pass therethrough, a dimensional difference being provided between a distance between axes of the first and second guide pin holes and a distance between axes of the third and fourth guide pin holes.

3. The optical module according to claim 2, wherein the dimensional difference varies from a value equal to or larger than 1 μm to a value equal to or less than 4 μm.

4. The optical module according to claim 1, further comprising:
   holding means for applying axial forces onto the outer end faces of said first and second optical fiber housings to thereby maintain said first and second optical fiber housings and said first and second lens housings in their positioned state.

5. The optical module according to claim 4, wherein said holding mean is comprised of a clip constituted by a plate spring, and the clip has opposite end portions thereof engaged with the outer end faces of said first and second optical fiber housings.

6. The optical module according to claim 4, wherein said holding means is comprised of a package which comprises a casing and a lid attached thereto and which is adapted to receive an optical module body, said casing being provided with first urging means for applying an axial force to the outer end face of said first optical fiber housing, and said lid being provided with second urging means for applying an axial force to the outer end face of said second optical fiber housing.

7. The optical module according to claim 5, wherein the axial forces applied by said holding means to the outer end faces of said first and second optical fiber housings vary from 5 N to 20 N.

8. The optical module according to claim 6, wherein the axial forces applied by said holding means to the outer end faces of said first and second optical fiber housings vary from 5 N to 20 N.

* * * * *